US009335017B2

(12) United States Patent
Nakaya

(10) Patent No.: US 9,335,017 B2
(45) Date of Patent: May 10, 2016

(54) LIGHT EMITTING DEVICE THAT CAN REALIZE REDUCTION IN THICKNESS OF VEHICLE LIGHT FITTING, VEHICLE LIGHT FITTING USING THE LIGHT EMITTING DEVICE AND VEHICLE PROVIDED WITH THE VEHICLE LIGHT

(71) Applicant: Stanley Electric Co., Ltd., Tokyo (JP)

(72) Inventor: Yoshiaki Nakaya, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/367,386

(22) PCT Filed: Dec. 18, 2012

(86) PCT No.: PCT/JP2012/082753
§ 371 (c)(1),
(2) Date: Jun. 20, 2014

(87) PCT Pub. No.: WO2013/094590
PCT Pub. Date: Jun. 27, 2013

(65) Prior Publication Data
US 2014/0347874 A1 Nov. 27, 2014

(30) Foreign Application Priority Data

Dec. 20, 2011 (JP) .................................. 2011-278720
Dec. 20, 2011 (JP) .................................. 2011-278721
Dec. 20, 2011 (JP) .................................. 2011-278722

(51) Int. Cl.
*F21S 8/10* (2006.01)
*F21V 8/00* (2006.01)
(52) U.S. Cl.
CPC ......... *F21S 48/1225* (2013.01); *F21S 48/1145* (2013.01); *F21S 48/1241* (2013.01); *F21S 48/13* (2013.01); *F21S 48/1317* (2013.01); *F21S 48/1388* (2013.01); *G02B 6/0008* (2013.01)

(58) Field of Classification Search
CPC .................... F21S 48/10–48/20; G02B 6/005;
G02B 6/008
USPC ........................................................ 362/386
See application file for complete search history.

(56) References Cited

U.S. PATENT DOCUMENTS 7,019,334 B2 * 3/2006 Yatsuda et al. .................. 257/98
7,322,752 B2 * 1/2008 Endou et al. ..................... 385/92
(Continued)

FOREIGN PATENT DOCUMENTS

EP 1795798 A1 6/2007
EP 2346101 A1 7/2011
(Continued)

OTHER PUBLICATIONS

International Preliminary Report on Patentability for PCT/JP2012/082753 dated Jul. 3, 2014 with English language translation thereof.
(Continued)

*Primary Examiner* — Tracie Y Green
(74) *Attorney, Agent, or Firm* — Kenealy Vaidya LLP

(57) ABSTRACT

Provided is a light emitting device used in a vehicle light, the light emitting device can include: an excitation light source that generates excitation light; a wavelength conversion member that absorbs the excitation light and that converts a wavelength of the excitation light to emit light in a predetermined wavelength region that can be different from the wavelength of the excitation light; and a first optical system that directs the excitation light from the excitation light source to the wavelength conversion member, wherein the wavelength conversion member includes at least a first surface, a second surface facing the first surface, and a peripheral end surface arranged between the first surface and the second surface. The first optical system is configured to direct the excitation light from the excitation light source to the first surface. At least part of the second surface is covered by a first light blocking structure.

21 Claims, 37 Drawing Sheets

(56) References Cited

U.S. PATENT DOCUMENTS

| | | | |
|---|---|---|---|
| 7,758,224 B2* | 7/2010 | Hama et al. | 362/555 |
| 8,998,467 B2* | 4/2015 | Dubosc et al. | 362/511 |
| 2003/0198060 A1 | 10/2003 | Ishida et al. | |
| 2009/0086309 A1 | 4/2009 | Moosburger | |
| 2009/0147513 A1 | 6/2009 | Kolodin et al. | |
| 2010/0254153 A1 | 10/2010 | Hama et al. | |
| 2010/0329609 A1 | 12/2010 | Shimotsu | |
| 2011/0141763 A1* | 6/2011 | Kamee et al. | 362/583 |
| 2011/0157865 A1 | 6/2011 | Takahashi et al. | |
| 2011/0216550 A1 | 9/2011 | Koike et al. | |
| 2011/0279007 A1* | 11/2011 | Kishimoto | 313/45 |
| 2012/0057364 A1* | 3/2012 | Kishimoto et al. | 362/538 |
| 2012/0063157 A1* | 3/2012 | Nakazato et al. | 362/517 |
| 2012/0243203 A1 | 9/2012 | Koike et al. | |
| 2013/0003400 A1 | 1/2013 | Kijima et al. | |

FOREIGN PATENT DOCUMENTS

| | | | |
|---|---|---|---|
| EP | 2363896 A1 | 9/2011 | |
| JP | 2000-326786 A | 11/2000 | |
| JP | 4080780 B2 | 4/2008 | |
| JP | 2008205410 A | 9/2008 | |
| JP | 4379531 B2 | 12/2009 | |
| JP | 2011-8014 A | 1/2011 | |
| JP | 2011029432 A | 2/2011 | |
| JP | 2011-142006 A | 7/2011 | |
| JP | 2012-203995 A | 10/2012 | |
| JP | 2013-12358 A | 1/2013 | |
| WO | 2008078235 A2 | 7/2008 | |
| WO | 2009-066207 A1 | 5/2009 | |
| WO | 2011156645 A1 | 12/2011 | |

OTHER PUBLICATIONS

International Search Report for PCT/JP2012/082753 dated Feb. 26, 2013.

Notification of Reasons for Rejection for Japanese Patent App. No. 2011-278721 (Aug. 26, 2015) with partial English language translation thereof.

Nov. 6, 2015 extended European Search Report issued in European Patent Application No. 12860201.8.

Nov. 6, 2015 extended European Search Report issued in European Patent Application No. 14187145.9.

Nov. 6, 2015 extended European Search Report issued in European Patent Application No. 141871513.

* cited by examiner (a)

(b)

HALF BIDIRECTIONAL PATTERN

BIDIRECTIONAL PATTERN

BIDIRECTIONAL PATTERN
(PART OF PERIPHERAL END SURFACE BLOCKED)

ONE-HALF BIDIRECTIONAL PATTERN (TRIANGULAR PRISM)

UNIDIRECTIONAL PATTERN (a)

(b)

(c)

RELATED ART

RELATED ART

RELATED ART

LIGHT EMITTING DEVICE THAT CAN REALIZE REDUCTION IN THICKNESS OF VEHICLE LIGHT FITTING, VEHICLE LIGHT FITTING USING THE LIGHT EMITTING DEVICE AND VEHICLE PROVIDED WITH THE VEHICLE LIGHT

This application is a U.S. national phase filing under 35 U.S.C. §371 of PCT Application No. PCT/JP2012/082753, filed Dec. 18, 2012, and claims priority under 35 U.S.C. §119 to Japanese patent application nos. 2011-278720, 2011-278721, and 2011-278722, all filed on Dec. 20, 2011, the entireties of all of which and their English publications are incorporated by reference herein.

TECHNICAL FIELD

The presently disclosed subject matter relates to a light emitting device, a vehicle light using the light emitting device, and a vehicle provided with the vehicle light, and particularly, to a light emitting device that can realize reduction in a thickness of a vehicle light fitting, a vehicle light fitting using the light emitting device, and a vehicle provided with the vehicle light fitting.

BACKGROUND ART

Conventionally, a vehicle light fitting using a semiconductor light emitting element, such as an LED, is proposed in a field of vehicle light fitting (for example, see PTL 1).

FIG. 35 is an example of a conventional vehicle light fitting 200 using a semiconductor light emitting element such as an LED.

As illustrated in FIG. 35, the vehicle light fitting 200 includes: a projection lens 210; a semiconductor light emitting element 220 such as an LED; a spheroidal first reflection surface 230a, in which a first focal point F1 is set near the semiconductor light emitting element 220, and a second focal point F2 is set near a vehicle backside focal point F of the projection lens 210; a second reflection surface 230b extending forward from a front end of the first reflection surface 230a and inclined downward (toward an optical axis AX); a shade 240; and the like.

FIG. 36 is a diagram for explaining directional characteristics of the semiconductor light emitting element 220. As illustrated in FIG. 36, the directional characteristics of the light emitted from the semiconductor light emitting element 220 are substantially Lambertian. Lambertian denotes a rate of luminous intensity in a direction inclined by a predetermined angle θ relative to the semiconductor light emitting element 220 (light emitting surface), wherein the luminous intensity on an optical axis $AX_{220}$ of the semiconductor light emitting element 220 is 100% ($I_0$) (θ=0), and Lambertian is expressed by $I(\theta)=I_0 \times \cos \theta$. This expresses expansion of light emitted by the semiconductor light emitting element 220. As illustrated in FIG. 36, the luminous intensity right over the optical axis $AX_{220}$ is the largest.

In the vehicle light fitting 200 with the above-described configuration, light RayA incident on the first reflection surface 230a of the light with relatively high luminous intensity emitted from the semiconductor light emitting element 220 (for example, light inside of a half-value angle in which a rate of the luminous intensity is 50%, half-value angle=60° in FIG. 36) is reflected by the first reflection surface 230a and condensed near the vehicle backside focal point F of the projection lens 210, and the light RayA is transmitted through the projection lens 210 and directed forward. Meanwhile, light RayB incident on the second reflection surface 230b is reflected by the second reflection surface 230b to pass over the second focal point F2, and the light RayB is transmitted through the projection lens 210 and directed forward. In this way, a predetermined light distribution pattern is formed on a virtual vertical screen facing the front surface of the vehicle (arranged about 25 m in front of the front surface of the vehicle).

Conventionally proposed is a light emitting device using a wavelength conversion member that absorbs excitation light to convert the wavelength to emit light in a predetermined wavelength region (for example, see PTL 2).

FIG. 37 is an example of a conventional light emitting device 300 for endoscope using a wavelength conversion member.

As illustrated in FIG. 37, the light emitting device 300 includes: a light guide 310 such as an optical fiber for transmitting excitation light emitted from an excitation light source; a wavelength conversion member 320 with reflection films 321 and 322 arranged on an end surface of the light guide 310; and the like.

In the light emitting device 300 with the configuration, the wavelength conversion member 320 absorbs the excitation light emitted from the end surface of the light guide 310 to convert the wavelength to emit light in a predetermined wavelength region.

Conventionally, proposed is a light emitting device using a wavelength conversion member that absorbs excitation light transmitted through a light guide, such as an optical fiber, to convert the wavelength to emit light in a predetermined wavelength region (for example, see PTL 2).

FIG. 37 is an example of a conventional light emitting device 300 using a wavelength conversion member that absorbs excitation light transmitted through a light guide, such as an optical fiber, to convert the wavelength to emit light in a predetermined wavelength region.

As illustrated in FIG. 37, the light emitting device 300 includes: a light guide 310 such as an optical fiber for transmitting excitation light emitted from an excitation light source; a wavelength conversion member 320 with reflection films 321 and 322 arranged on the end surface of the light guide 310; and the like.

In the light emitting device 300 with the configuration, the wavelength conversion member 320 absorbs the excitation light emitted from the end surface of the light guide 310 to convert the wavelength to emit light in a predetermined wavelength region.

CITATION LIST

Patent Literature

{PTL 1} Japanese Patent No. 4080780
{PTL 2} Japanese Patent No. 4379531

SUMMARY

In the vehicle light fitting 200 with the configuration, a light distribution pattern with high illuminance can be formed by condensing the reflected light RayA from the first reflection surface 230a as well as the reflected light RayB from the second reflection surface 230b near the vehicle backside focal point F of the projection lens 210. However, as a result of this, an incident angle of the reflected light RayB from the second reflection surface 230b relative to the vehicle backside focal point F of the projection lens 210 is acute, and there is a problem that the dimension of the projection lens 210 in the vertical direction becomes large (resulting in an increase in the dimension of the vehicle light fitting 200 in the vertical direction).

The presently disclosed subject matter has been made in view of the circumstances, and a first aspect of the presently disclosed subject matter is to provide a light emitting device that can realize reduction in the thickness of a vehicle light in the vertical direction, a vehicle light using the light emitting device, and a vehicle provided with the vehicle light.

In the light emitting device 300 with the above-described configuration, the end surface of the light guide 310 and the wavelength conversion member 320 are closely attached. Therefore, the light density of the excitation light for irradiating the wavelength conversion member 320 increases with an increase in the output of the excitation light, and the temperature of the wavelength conversion member 320 becomes high. There is a problem that the wavelength conversion member 320 is degraded and discolored, and the efficiency is reduced. Particularly, this problem is prominent when the excitation light source is an LD (laser diode).

The presently disclosed subject matter has been made in view of these circumstances, and another possible aspect of the presently disclosed subject matter is to provide a light emitting device that can suppress an increase in the temperature of a wavelength conversion member (therefore, can suppress degradation in the wavelength conversion member and reduction in the efficiency even if the excitation light source is high-powered), a vehicle light fitting using the light emitting device, and a vehicle provided with the vehicle light fitting.

The light emitting device 300 with the above configuration can be a light emitting device for endoscope, and application of this to a vehicle light fitting as well as a light emitting device with a structure of removably fixing a light guide to the vehicle light fitting are not proposed at all.

The presently disclosed subject matter has been made in view of these circumstances, and another possible aspect of the presently disclosed subject matter is to provide a light emitting device with a structure of removably fixing a light guide to a vehicle light fitting, a vehicle light fitting using the light emitting device, and a vehicle provided with the vehicle light fitting.

To solve or attempt to solve the problems, a first aspect of the presently disclosed subject matter provides a light emitting device used in a vehicle light fitting, the light emitting device including: an excitation light source that generates excitation light; a wavelength conversion member that absorbs the excitation light and that converts a wavelength to emit light in a predetermined wavelength region; and a first optical system that directs the excitation light from the excitation light source to the wavelength conversion member, wherein the wavelength conversion member includes at least a first surface, a second surface facing the first surface, and a peripheral end surface arranged between the first surface and the second surface, the first optical system is configured to direct the excitation light from the excitation light source to the first surface, and at least part of the second surface is covered by a first light blocking structure.

According to the first aspect of the presently disclosed subject matter, the operation of the first light blocking structure can form a light source device that emits light with a bidirectional distribution from the peripheral end surface of the wavelength conversion member and that is suitable for reducing the thickness of the vehicle light fitting in the vertical direction.

In a second aspect of the presently disclosed subject matter according to the first aspect, the first light blocking structure is a first reflection structure.

According to the second aspect of the presently disclosed subject matter, extraction efficiency of light can be improved by the operation of the first reflection structure.

In a third aspect of the presently disclosed subject matter according to the first or second aspect, the wavelength conversion member is a disc-shaped wavelength conversion member including the first surface, the second surface, and the peripheral end surface.

According to the third aspect of the presently disclosed subject matter, the operation of the first light blocking structure can form a light source device that emits light with a bidirectional distribution from the peripheral end surface of the disc-shaped wavelength conversion member and that is suitable for reducing the thickness of the vehicle light fitting in the vertical direction.

In a fourth aspect of the presently disclosed subject matter according to any of the first to third aspects, at least part of the peripheral end surface is covered by a second light blocking structure.

According to the fourth aspect of the presently disclosed subject matter, the operation of the second light blocking structure can prevent light that causes glare or the like from being emitted from the peripheral end surface of the wavelength conversion member.

In a fifth aspect of the presently disclosed subject matter according to any of the first to fourth aspects, at least part of the peripheral end surface is cut, and a cross section of the part is covered by a third light blocking structure.

According to the fifth aspect of the presently disclosed subject matter, the operation of the third light blocking structure can prevent light that causes glare or the like from being emitted from the peripheral end surface of the wavelength conversion member.

According to the fifth aspect of the presently disclosed subject matter, a setting range of the third light blocking structure relative to the wavelength conversion member can be easily figured out based on the cut location.

According to the fifth aspect of the presently disclosed subject matter, an attachment direction relative to an attachment partner of the wavelength conversion member can be easily figured out based on the cut location.

In a sixth aspect of the presently disclosed subject matter according to the first or second aspect, the wavelength conversion member is a triangular-prism wavelength conversion member including the first surface, the second surface, and the peripheral end surface.

According to the sixth aspect of the presently disclosed subject matter, the operation of the first light blocking structure can form a light source device that emits light with a bidirectional distribution from the peripheral end surface of the triangular-prism wavelength conversion member and that is suitable for reducing the thickness of the vehicle light fitting in the vertical direction.

In a seventh aspect of the presently disclosed subject matter according to any of the first to sixth aspects, at least part of the first surface is covered by a second reflection structure.

According to the seventh aspect of the presently disclosed subject matter, the extraction efficiency of light can be improved by the operation of the second reflection structure.

In an eighth aspect of the presently disclosed subject matter according to any of the first to seventh aspects, a third reflection structure for reflecting light emitted from the peripheral end surface is arranged around the first surface.

According to the eighth aspect of the presently disclosed subject matter, light with a bidirectional distribution emitted from the peripheral end surface of the wavelength conversion member is reflected by the operation of the third reflection structure. This can form a light source device that emits light with a distribution in a half bidirectional pattern in which a bidirectional pattern is halved and that is suitable for reducing the thickness of the vehicle light fitting in the vertical direction.

A ninth aspect of the presently disclosed subject matter can include a vehicle light fitting as follows.

Provided is a vehicle light fitting including: the light emitting device according to any of the first to eighth aspects; and a second optical system configured to direct the light emitted from the peripheral end surface of the light emitting device forward from a vehicle.

A tenth aspect of the presently disclosed subject matter can include a vehicle as follows.

Provided is a vehicle provided with the vehicle light fitting according to the ninth aspect.

To solve or attempt to solve certain problems, an eleventh aspect of the presently disclosed subject matter provides a light emitting device used in a vehicle light fitting, the light emitting device including: an excitation light source that generates excitation light; a light emitting unit including: a wavelength conversion member that absorbs the excitation light and that converts a wavelength to emit light in a predetermined wavelength region; and a light deflection structure for changing a travelling direction of the excitation light from the excitation light source to irradiate the wavelength conversion member; and a first optical system that directs the excitation light from the excitation light source to the light deflection structure.

According to the eleventh aspect of the presently disclosed subject matter, the wavelength conversion member is irradiated after changing the travelling direction of the excitation light from the excitation light source by the operation of the light deflection structure. The wavelength conversion member is not directly exposed to heat, high-intensity light, and the like of the excitation light source, and increase in the temperature of the wavelength conversion member can be suppressed compared to when the wavelength conversion member is irradiated without changing the travelling direction of the excitation light from the excitation light source. Therefore, degradation of the wavelength conversion member and reduction in the efficiency can be suppressed even if the excitation light source is high-powered.

In a twelfth aspect of the presently disclosed subject matter according to the eleventh aspect, the light deflection structure is a structure for reducing light density of the excitation light from the excitation light source and changing the travelling direction to irradiate the wavelength conversion member.

According to the twelfth aspect of the presently disclosed subject matter, the wavelength conversion member is irradiated after reducing the light density of the excitation light from the excitation light source and changing the travelling direction by the operation of the light deflection structure. The wavelength conversion member is not directly exposed to heat, high-intensity light, and the like of the excitation light source, and increase in the temperature of the wavelength conversion member can be suppressed. Therefore, degradation and discoloring of the wavelength conversion member as well as reduction in the efficiency can be suppressed even if the excitation light source is high-powered.

In a thirteenth aspect of the presently disclosed subject matter according to the eleventh or twelfth aspect, at least part of an upper surface of the light emitting unit is covered by a light blocking structure.

According to the thirteenth aspect of the presently disclosed subject matter, the operation of the light blocking structure can prevent light from being emitted from the upper surface of the light emitting unit.

In a fourteenth aspect of the presently disclosed subject matter according to the thirteenth aspect, the light blocking structure is a first deflection structure.

According to the fourteenth aspect of the presently disclosed subject matter, extraction efficiency of light can be improved by the operation of the first reflection structure.

In a fifteenth aspect of the presently disclosed subject matter according to any of the eleventh to fourteenth aspects, the wavelength conversion member is a ring-shaped wavelength conversion member, and the light deflection structure is arranged inside of a ring of the ring-shaped wavelength conversion member and that is for changing the travelling direction of the excitation light from the excitation light source to irradiate an inner ring surface of the wavelength conversion member.

According to the fifteenth aspect of the presently disclosed subject matter, the wavelength conversion member is irradiated by the excitation light from the excitation light source with reduced light density and with changed travelling direction by the operation of the light deflection structure, and increase in the temperature of the wavelength conversion member can be suppressed compared to when the wavelength conversion member is irradiated without changing the travelling direction of the excitation light from the excitation light source. Therefore, degradation of the wavelength conversion member and reduction in the efficiency can be suppressed even if the excitation light source is high-powered.

In a sixteenth aspect of the presently disclosed subject matter at least part of a lower surface of the light emitting unit is covered by a second reflection structure.

According to the sixteenth aspect of the presently disclosed subject matter, the extraction efficiency of light can be improved by the operation of the second reflection structure.

In a seventeenth aspect of the presently disclosed subject matter according any of the eleventh to sixteenth aspects, a third reflection structure for reflecting light emitted from the light emitting unit is arranged around the lower surface of the light emitting unit.

According to the seventeenth aspect of the presently disclosed subject matter, light with a bidirectional distribution emitted from the peripheral end surface of the wavelength conversion member is reflected by the operation of the third reflection structure. This can form a light source device that emits light with a distribution in a half bidirectional pattern in which a bidirectional pattern is halved and that is suitable for reducing the thickness of the vehicle light fitting in the vertical direction.

An eighteenth aspect of the presently disclosed subject matter can include a vehicle light fitting as follows.

Provided is a vehicle light including: the light emitting device according to any of the eleventh to seventeenth aspects; and a second optical system configured to direct the light emitted from the light emitting unit of the light emitting device forward from a vehicle.

A nineteenth aspect of the presently disclosed subject matter can include a vehicle as follows.

Provided is a vehicle provided with the vehicle light according to the eighteenth aspect.

To solve the problems, a twentieth aspect of the presently disclosed subject matter provides a light emitting device used in a vehicle light, the light emitting device including: a first holding member holding: a first light guide that includes a first light entering surface and a first light emission surface and that guides excitation light guided inside from the first light entering surface to the first light emission surface to emit the excitation light from the first light emission surface; and a wavelength conversion member that absorbs the excitation light emitted from the first light emission surface and that converts a wavelength to emit light in a predetermined wavelength region; a second holding member holding a second light guide that includes a second light entering surface and a second light emission surface and that guides excitation light guided inside from the second light entering surface to the second light emission surface to emit the excitation light from the second light emission surface; an excitation light source that generates the excitation light guided inside of the second light guide from the second light entering surface; and a fixation structure for removably fixing the first holding member and the second holding member in a state that the first light entering surface and the second light emission surface face each other.

According to the twentieth aspect of the presently disclosed subject matter, the operation of the first holding member holding the first light guide and the wavelength conversion member, the second holding member holding the second light guide, and the fixation structure can form a light emitting device that can removably fix the light guide (second light guide) to an attachment partner such as a vehicle light fitting.

In a twenty-first aspect of the presently disclosed subject matter according to the twentieth aspect, an area of the first light entering surface is greater than an area of the second light emission surface.

According to the twenty-first aspect, the excitation light from the second light guide can be guided (propagated) to the first light guide without a loss even if the first light guide and the second light guide are a little dislocated from the same axis due to, for example, manufacturing (for example, dimension errors of the first light guide, the second light guide, and the like). Therefore, wiggle errors or somewhat large tolerances in manufacturing can be absorbed.

In a twenty-second aspect of the presently disclosed subject matter according to the twentieth or twenty-first aspect, the first holding member is a stub, the second holding member is a ferrule, and a diameter of the stub is greater than a diameter of the ferrule.

According to the twenty-second aspect of the presently disclosed subject matter, a reflection structure for reflecting light emitted from a wavelength conversion element can be arranged on an end surface of the stub with a diameter greater than an end surface of the ferrule, that is, the region of the reflection structure can be wider than the end surface of the ferrule. Therefore, the efficiency of the light emitting device can be further improved compared to when the reflection structure is arranged on the end surface of the ferrule.

A twenty-third aspect of the presently disclosed subject matter can include a vehicle light as follows.

Provided is a vehicle light including: the first holding member according to any of the twentieth to twenty-second aspects; an optical system configured to direct the light emitted from the wavelength conversion member held by the first holding member forward from a vehicle.

A twenty-fourth aspect of the presently disclosed subject matter can include a vehicle as follows.

Provided is a vehicle provided with the vehicle light according to the twenty-third aspect.

As described, the presently disclosed subject matter can provide a light emitting device that can realize reduction in the thickness of a vehicle light fitting in the vertical direction, a vehicle light fitting using the light emitting device, and a vehicle provided with the vehicle light fitting.

Furthermore, the presently disclosed subject matter can provide a light emitting device that can suppress increase in the temperature of a wavelength conversion member (therefore, can suppress degradation of the wavelength conversion member and reduction in the efficiency even if the excitation light source is high-powered), a vehicle light fitting using the light emitting device, and a vehicle provided with the vehicle light fitting.

Furthermore, the presently disclosed subject matter can provide a light emitting device with a structure of removably fixing a light guide to a vehicle light fitting, a vehicle light fitting using the light emitting device, and a vehicle provided with the vehicle light fitting.

BRIEF DESCRIPTION OF DRAWINGS

FIG. 3 is a perspective view of the wavelength conversion member of FIG. 2a.

DETAILED DESCRIPTION OF EXEMPLARY EMBODIMENTS

Hereinafter, examples of a vehicle light fitting unit 20 as an embodiment of the presently disclosed subject matter will be described with reference to the drawings.

First, a light emitting device 10 used in the vehicle light fitting unit 20 of the present embodiment will be described.

Figure 1:
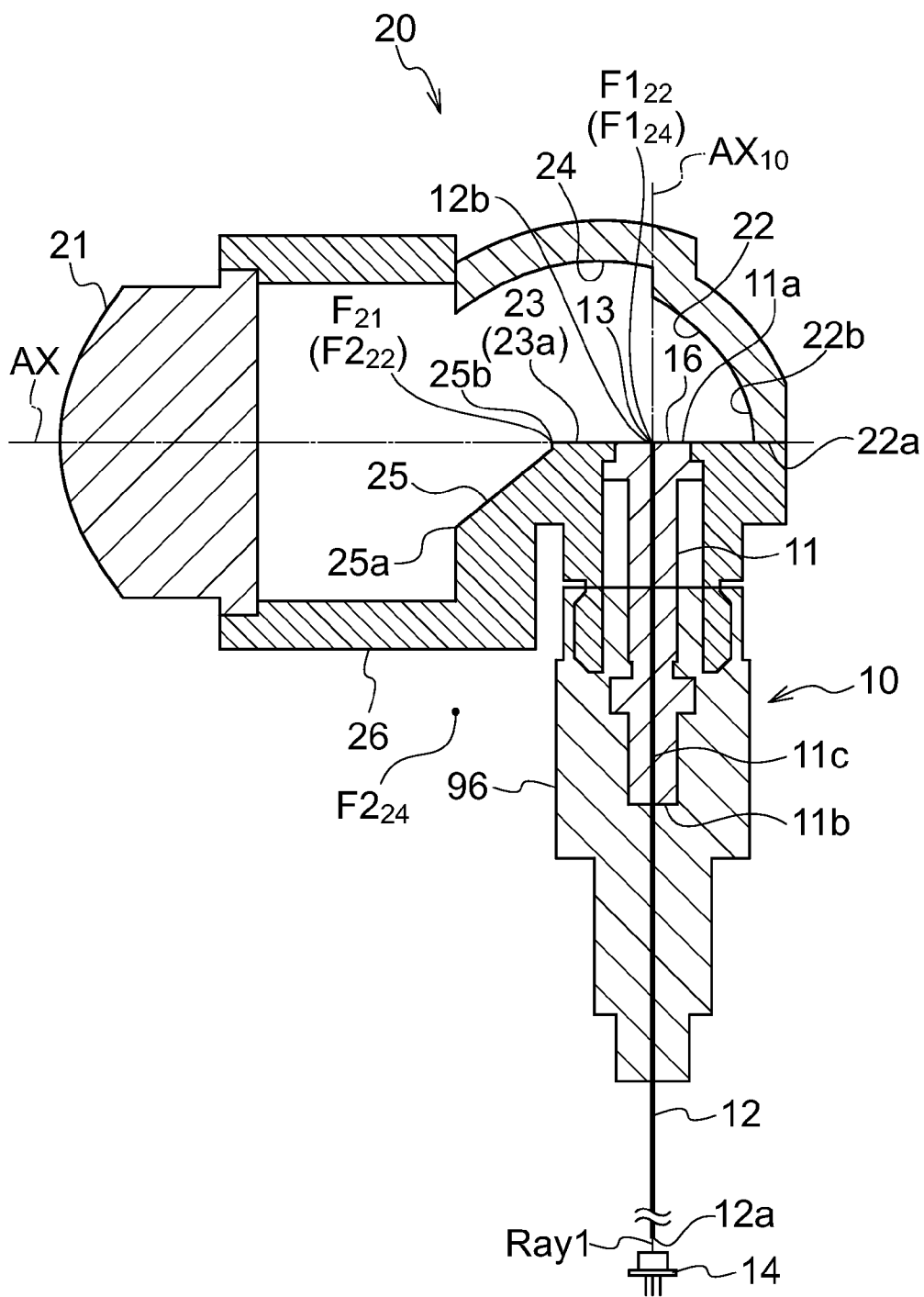
FIG. 1 is a cross-sectional view in which an exemplary embodiment of a vehicle light fitting unit is cut by a vertical plane including an optical axis AX of the vehicle light fitting unit.
Figure 2:
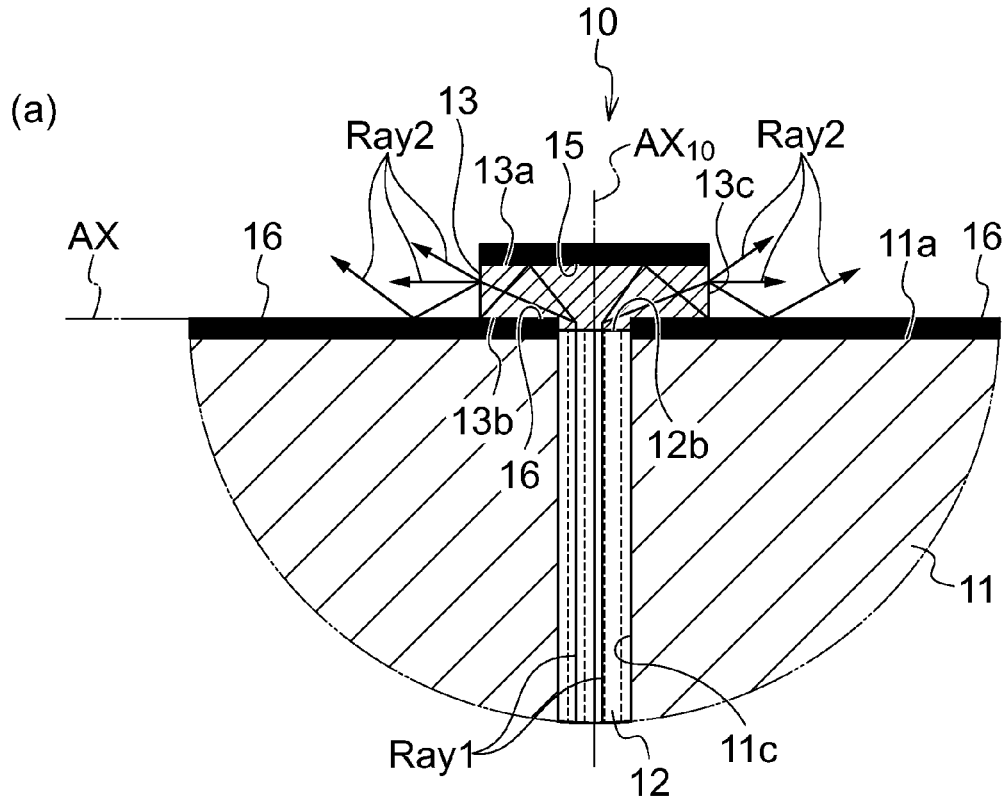
FIG. 2(a) is an enlarged view in which a circumference of a wavelength conversion member of a light emitting device according to the presently disclosed subject matter is enlarged.
FIG. 2(b) is a diagram for explaining directional characteristics of the light emitting device of FIG. 2(a).
Figure 2:
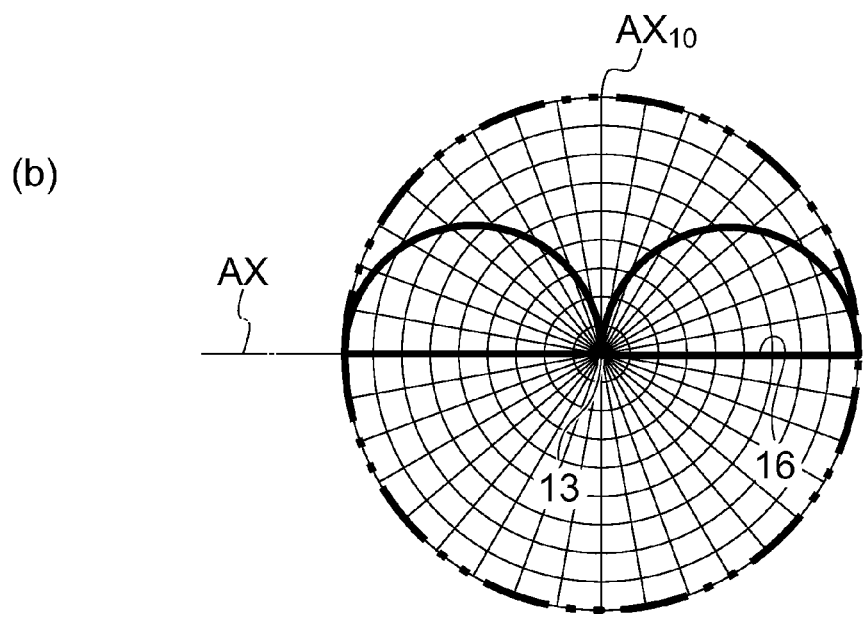

FIG. 1 is a cross-sectional view in which the vehicle light fitting unit 20 of the present embodiment is cut by a vertical plane including an optical axis AX of the vehicle light fitting unit 20, and (a) portion of FIG. 2 is an enlarged view in which the circumference of a wavelength conversion member 13 of the light emitting device 10 is enlarged.

[Light Emitting Device 10]

As illustrated in FIG. 1 and (a) portion of FIG. 2, the light emitting device 10 includes a ferrule 11, a light guide 12, the wavelength conversion member 13, an excitation light source 14, and the like.

The ferrule 11 is a member for holding the light guide 12 and is provided with a through hole 11c for light guide that links a center of an upper surface 11a and a center of a lower surface 11b. An emission end side of the light guide 12 is inserted to the through hole 11c for light guide, and the ferrule 11 holds the light guide 12. The upper surface 11a of the ferrule 11 is polished, and as a result, a light emission surface 12b of the light guide 12 and the upper surface 11a of the ferrule 11 are in the same plane.

The ferrule 11 only needs to be able to hold the light guide 12, and the material is not particularly limited. For example, the ferrule 11 may be made of stainless steel, nickel, or zirconia, or may be made of other metal, resin, or glass.

Figure 4:
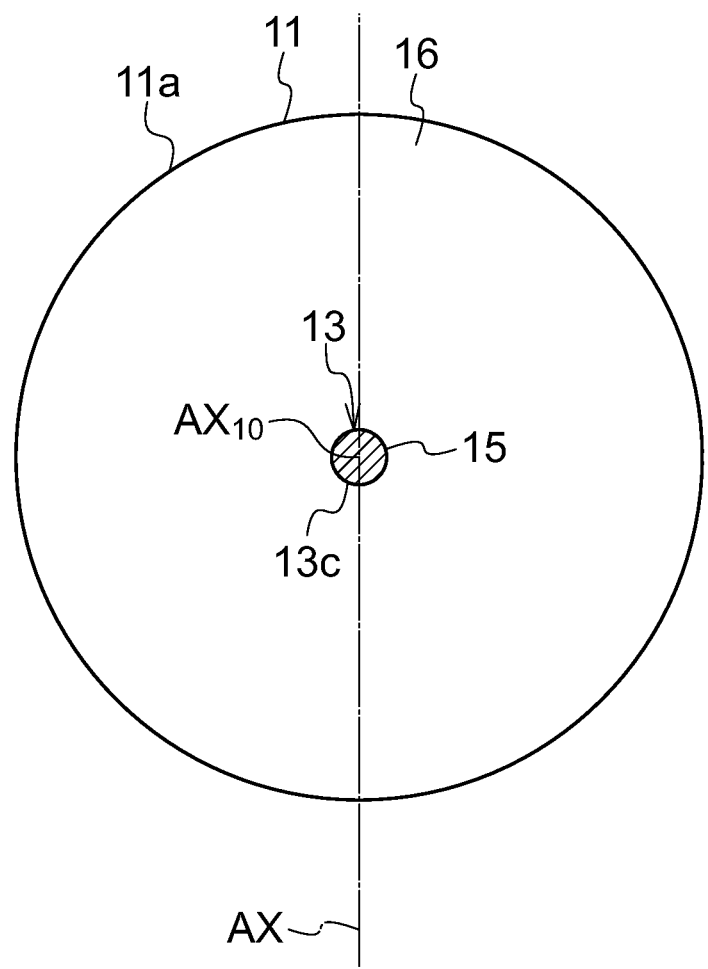
FIG. 4 is a top view of the ferrule.

The upper surface 11a of the ferrule 11 is, for example, round and is covered by a reflection structure 16 as illustrated in (a) portion of FIG. 2 and FIG. 4. The reflection structure 16 only needs to be able to reflect light emitted by the wavelength conversion member 13 toward the wavelength conversion member 13, and for example, the reflection structure 16 may be a reflection layer (or a reflection surface) formed by applying metal deposition of aluminum, silver, or the like to the upper surface 11a of the ferrule 11 or may be a reflection layer (dielectric film) formed by plating the upper surface 11a of the ferrule 11 if the ferrule 11 is conductive. For example, a method described in Japanese Patent Laid-Open No. 2007-121502 can be used as a method of forming the reflection layer (or the reflection surface) on the upper surface 11a of the ferrule 11. Alternatively, the reflection structure 16 may be a thin plate-like reflection member adhered to the upper surface 11a of the ferrule 11 (area of the upper surface 11a other than the light emission surface 12b of the light guide 12) or may be a reflection surface formed by applying mirror surface polishing to the upper surface 11a of the ferrule 11 if the ferrule 11 is metallic.

The light guide 12 is a light guide member (equivalent to a first optical system of the presently disclosed subject matter) that guides (or propagates) excitation light from the excitation light source 14 to irradiate the wavelength conversion member 13. The light guide 12 is, for example, an optical fiber including a core at the center (for example, core diameter: 0.2 mm) and a clad covering around the core (they are not illustrated). The refractive index of the core is higher than that of the clad. Therefore, the excitation light guided into the light guide 12 from an end surface of the light guide 12 (hereinafter, called "light entering surface 12a") is guided to the other end surface (hereinafter, called "light emission surface 12b") by using the total reflection of the boundary between the core and the clad in a state that the light is confined inside of the core, and the light is emitted from the light emission surface 12b.

The light guide 12 only needs to be able to guide the excitation light from the excitation light source 14, and the light guide 12 may be a single-line fiber or a multiple-line fiber. The light guide 12 may be a single-mode fiber or a multiple-mode fiber. The material of the light guide 12 is not particularly limited. For example, the light guide 12 may be made of quartz glass or may be made of plastic. The light guide 12 can be a single-line fiber and a multiple-mode fiber.

The light entering surface 12a of the light guide 12 is arranged, for example, near the front of the excitation light source 14. For efficient entrance of the excitation light from the excitation light source 14, a condensing lens (not illustrated) may be arranged between the light entering surface 12a of the light guide 12 and the excitation light source 14.

Figure 3:
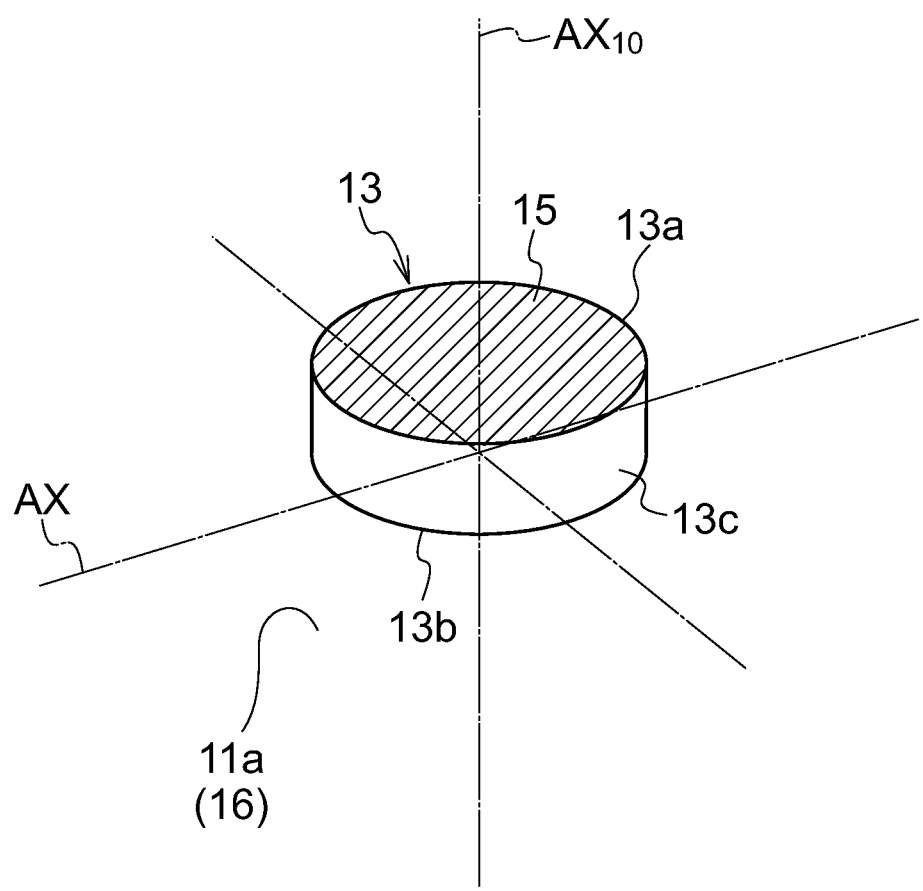

FIG. 3 is a perspective view of the wavelength conversion member 13.

As illustrated in FIG. 3, the wavelength conversion member 13 is a wavelength conversion member that absorbs the excitation light to convert the wavelength to emit light in a predetermined wavelength region and is, for example, a disc-shaped fluorescent body of YAG or the like (fluorescent substance such as Ce:YAG or the like is desirable) formed by extending a round shape in the perpendicular direction of the upper surface 11a of the ferrule 11. The wavelength conversion member 13 includes a round upper surface 13a (equivalent to a second surface of the presently disclosed subject matter), a round lower surface 13b (equivalent to a first surface of the presently disclosed subject matter), and a ring-shaped peripheral end surface 13c (side surface) (for example, thickness: 0.2 mm, diameter: 1.0 mm).

If the disc-shaped fluorescent body of YAG or the like formed by extending a round shape in the perpendicular direction of the upper surface 11a of the ferrule 11 is used as the wavelength conversion member 13, the optical path length from the light emission surface 12b of the light guide 12 to the peripheral end surface 13c of the wavelength conversion member 13 becomes uniform throughout the whole circumference. Therefore, color unevenness and brightness unevenness of the peripheral end surface 13c of the wavelength conversion member 13 can be suppressed.

The wavelength conversion member 13 may be a disc-shaped fluorescent body of YAG or the like formed by extending a polygon, such as a square and a hexagon, or another shape in the perpendicular direction of the upper surface 11a of the ferrule 11. Therefore, the outer shape of the wavelength conversion member 13 is not limited to the round shape, and the wavelength conversion member 13 may be a polygon, such as a square and a hexagon. In the wavelength conversion member 13, the concentration of a yellow fluorescent body (for example, dosage of Ce) is adjusted so that the emission color satisfies a white range in a CIE chromaticity diagram defined by a regulation.

The upper surface 13a of the wavelength conversion member 13 is covered by a light blocking structure 15 (equivalent to a first light blocking structure of the presently disclosed subject matter). The light blocking structure 15 only needs to block light to be emitted from the upper surface 13a of the light emitted by the wavelength conversion member 13. For example, the light blocking structure 15 may be black painting applied to the upper surface 13a of the wavelength conversion member 13, may be a reflection layer (or a reflection surface) formed by applying metal deposition of aluminum, silver, or the like to the upper surface 13a of the wavelength conversion member 13, or may be a diffuse reflection member, such as a thin plate-like reflection member or white resin, adhered to the upper surface 13a of the wavelength conversion member 13. The light blocking structure 15 may also be a dielectric multi-layer film optimally designed at the wavelength of the excitation light source 14.

If a reflection surface, such as a reflection layer and a reflection plate, is used as the light blocking structure 15, the light to be emitted from the upper surface 13a of the wavelength conversion member 13 of the light emitted by the wavelength conversion member 13 is reflected by the light blocking structure 15 and returned toward the wavelength conversion member 13 (see (a) portion of FIG. 2). Therefore, the extraction efficiency of the light emitted from the peripheral end surface 13c of the wavelength conversion member 13 can be improved.

As illustrated in (a) portion of FIG. 2, the lower surface 13b of the wavelength conversion member 13 is adhered to an area around the through hole 11c for light guide on the upper surface 11a (reflection structure 16) of the ferrule 11 to cover the through hole 11c for light guide (light emission surface 12b of the light guide 12).

FIG. 4 is a top view of the ferrule 11. As illustrated in FIG. 4, the wavelength conversion member 13 is arranged at the center of the upper surface 11a of the ferrule 11. As illustrated in (a) portion of FIG. 2, the center of the lower surface 13b of the wavelength conversion member 13 coincides with the center of the through hole 11c for light guide (center of the light emission surface 12b of the light guide 12). Therefore, the lower surface 13b of the wavelength conversion member 13 is covered by the reflection structure 16 (equivalent to a second reflection structure and a fifth reflection structure of the presently disclosed subject matter), except for the area where the through hole 11c for light guide (light emission surface 12b of the light guide 12) faces the lower surface 13b (see (a) portion of FIG. 2). Therefore, the light to be emitted from the lower surface 13b of the wavelength conversion member 13 of the light emitted by the wavelength conversion member 13 is reflected by the reflection structure 16 and returned toward the wavelength conversion member 13. This improves the extraction efficiency of light.

The light emission surface 12b of the light guide 12 is on the same plane as the upper surface 11a of the ferrule 11. Therefore, the lower surface 13b of the wavelength conversion member 13 and the light emission surface 12b of the light guide 12 are closely attached. A little gap may exist between the lower surface 13b of the wavelength conversion member 13 and the light emission surface 12b of the light guide 12.

The reflection structure 16 (upper surface 11a of the ferrule 11) has a greater diameter than the wavelength conversion member 13, and the reflection structure 16 extends outside of the outside diameter of the lower surface 13b of the wavelength conversion member 13 (see (a) portion of FIG. 2 and FIG. 4). More specifically, the reflection structure 16 is also arranged around the lower surface 13b of the wavelength conversion member 13 (equivalent to a third reflection structure and a six reflection structure of the presently disclosed subject matter). Therefore, the reflection structure 16 reflects and turns back the light emitted downward from the whole circumference of the peripheral end surface 13c of the wavelength conversion member 13, and the light is directed upward (see (a) portion of FIG. 2). This forms a light emitting device 10 that emits light with a distribution in a half bidirectional pattern in which a bidirectional pattern is halved (see (b) portion of FIG. 2).

The excitation light source 14 is an excitation light source that generates excitation light and is desirably a semiconductor light emitting element, such as a light emitting diode (LED), a laser diode (LD) or the like. Particularly, an LD (laser diode) is desirable from the viewpoint of light use efficiency. In the present embodiment, an LD with the emission wavelength of about 400 to 450 nm is used as the excitation light source 14. The excitation light source 14 is fixed to an appropriate location other than the vehicle light fitting unit 20 (for example, a vehicle body frame or a housing fixed to the vehicle body frame) by known means such as a screw.

According to the light emitting device 10 with the configuration, excitation light Ray1 from the excitation light source 14 is guided into the light guide 12 from the light entering surface 12a of the light guide 12 and guided to the light emission surface 12b, and the light Ray1 is emitted from the light emission surface 12b to irradiate the wavelength conversion member 13 as illustrated in FIG. 1 and (a) portion of FIG. 2.

The wavelength conversion member 13 that has received the excitation light from the excitation light source 14 emits white light Ray2 based on a mixed color of the light excited by the excitation light from the excitation light source 14 and the excitation light from the excitation light source 14 transmitted through the wavelength conversion member 13.

The white light Ray2 emitted by the wavelength conversion member 13 is reflected by the light blocking structure 15 and/or the reflection structure 16 (or directly, without being reflected by the light blocking structure 15 or the reflection structure 16) and emitted from the whole circumference of the peripheral end surface 13c of the wavelength conversion member 13.

Figure 5:
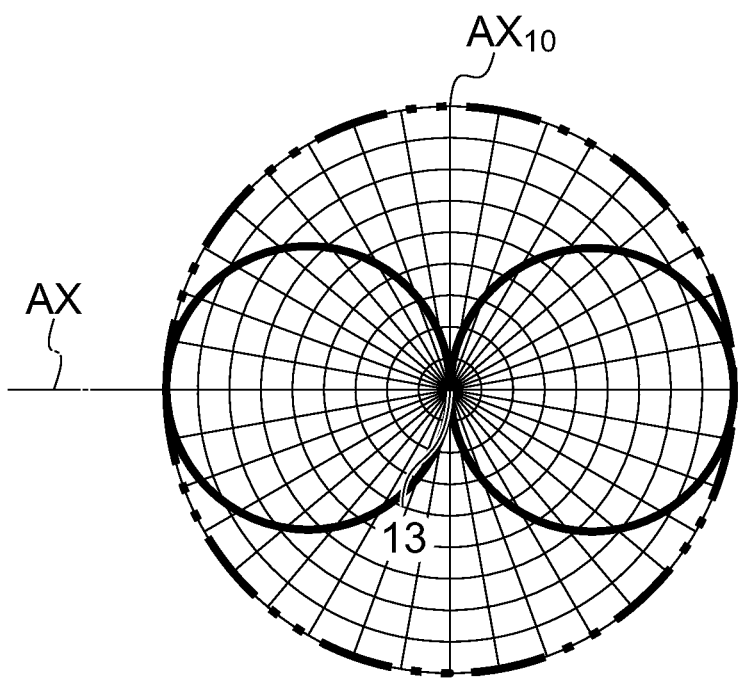
FIG. 5 is a diagram for explaining directional characteristics of the wavelength conversion member.

FIG. 5 is a diagram for explaining the directional characteristics of the wavelength conversion member 13. In FIG. 5, a solid line indicates directional characteristics (bidirectional pattern) of the wavelength conversion member 13 in a cross section (cross section of the peripheral end surface 13c of the wavelength conversion member 13) cut by a vertical plane including an optical axis $AX_{10}$ (central axis of the through hole 11c for light guide), and an alternate long and two short dashes line indicates directional characteristics viewed from the upper surface 13a of the wavelength conversion member 13.

Since the upper surface 13a of the wavelength conversion member 13 is covered by the light blocking structure 15, the directional characteristics of the wavelength conversion member 13 in the cross section (cross section of the peripheral end surface 13c of the wavelength conversion member 13) cut by the vertical plane including the optical axis $AX_{10}$ (central axis of the through hole 11c for light guide) indicate a vertically symmetric bidirectional distribution (intensity in the horizontal plane including the optical axis AX is the largest) as illustrated by the solid line in FIG. 5.

Meanwhile, since the peripheral end surface 13c of the wavelength conversion member 13 is a ring-shaped surface, the directional characteristics viewed from the upper surface 13a of the wavelength conversion member 13 indicate a distribution spread in a radial fashion around the wavelength conversion member 13 as illustrated by the alternate long and two short dashes line in FIG. 5.

The white light Ray2 emitted downward from the whole circumference of the peripheral end surface 13c of the wavelength conversion member 13 is reflected and turned back by the reflection structure 16 arranged around the lower surface 13b of the wavelength conversion member 13, and the white light Ray2 is directed upward (see (a) portion of FIG. 2).

As a result, the directional characteristics of the light emitting device 10 in a cross section cut by a vertical plane including the optical axis $AX_{10}$ indicate a distribution in a half bidirectional pattern including an upper half of the bidirectional pattern (intensity in the horizontal plane including the optical axis AX is the largest) as illustrated by a solid line in (b) portion of FIG. 2.

Meanwhile, since the peripheral end surface 13c of the wavelength conversion member 13 is a ring-shaped surface, the directional characteristics viewed from the upper surface of the light emitting device 10 indicate a distribution spread in a radial fashion around the wavelength conversion member 13 as illustrated by an alternate long and two short dashes line in (b) portion of FIG. 2.

(b) portion of FIG. 2 is a diagram for explaining the directional characteristics of the light emitting device 10. In (b) portion of FIG. 2, the solid line indicates the directional characteristics (half bidirectional pattern) of the light emitting device 10 in the cross section cut by the vertical plane including the optical axis $AX_{10}$, and the alternate long and two short dashes line indicates the directional characteristics viewed from the upper surface of the light emitting device 10.

As described, the directional characteristics of the light emitting device 10 indicate a three-dimensional distribution substantially coinciding with a three-dimensional distribution in which an arc indicated by the solid line in (b) portion of FIG. 2 is rotated 360° around the optical axis $AX_{10}$, that is, a distribution in a light distribution pattern in which the intensity in the horizontal plane including the optical axis AX is the largest, and the intensity decreases with an increase in the distance from the horizontal plane (for example, light distribution pattern for low beam).

As described, according to the light emitting device 10 of the present embodiment, the light with a bidirectional distribution emitted from the peripheral end surface 13c of the wavelength conversion member 13 is reflected by the operation of the light blocking structure 15 and the reflection structure 16 arranged around the lower surface 13b of the wavelength conversion member 13. This can form a light emitting device 10 that emits light with a distribution in a half bidirectional pattern in which the bidirectional pattern is halved and that is suitable for reducing the thickness of the vehicle light fitting in the vertical direction.

[Light Emitting Device 10A]

Next, a light emitting device 10A that emits light with a bidirectional distribution will be described as a modified example of the light emitting device 10.

Figure 6:
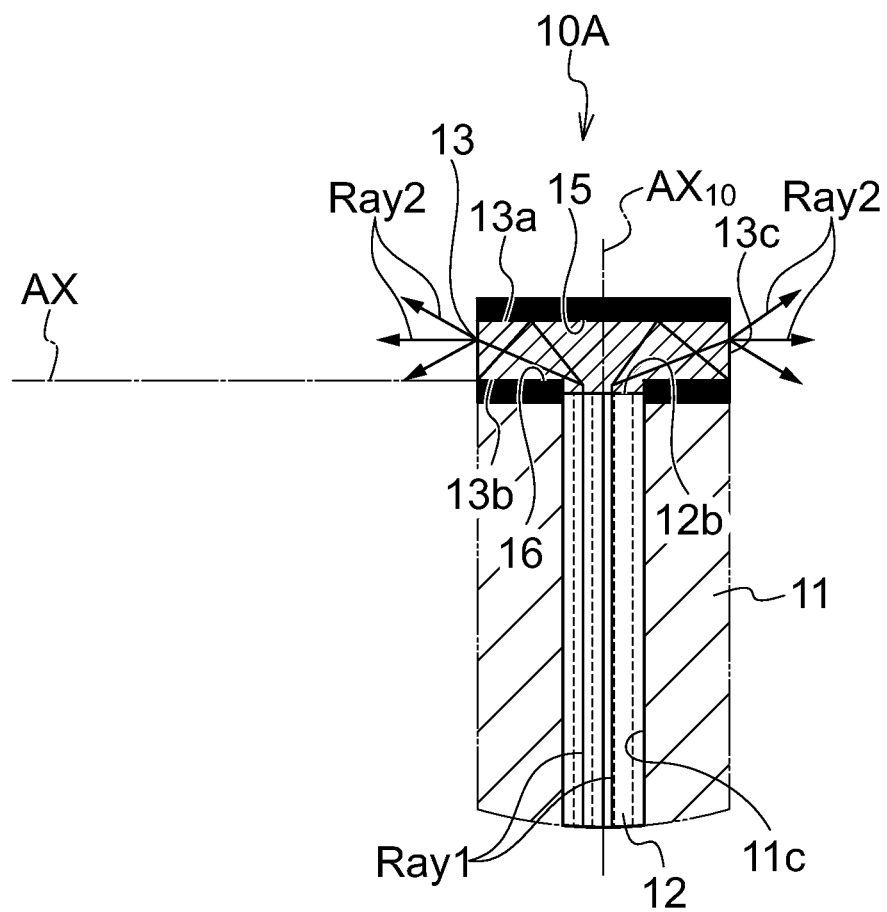
FIG. 6 is an enlarged view in which a circumference of the wavelength conversion member of the light emitting device is enlarged.

FIG. 6 is an enlarged view in which the circumference of the wavelength conversion member 13 of the light emitting device 10A is enlarged.

The light emitting device 10A is different from the light emitting device 10 in that the reflection structure 16 (upper surface 11a of the ferrule 11) has the same diameter (or substantially the same diameter) as the wavelength conversion member 13 and is arranged only on the lower surface 13b of the wavelength conversion member 13 (therefore, the reflection structure 16 is not extending outside of the outside diameter of the lower surface 13b of the wavelength conversion member 13). Other than that, the configuration is the same as the light emitting device 10. Hereinafter, the difference from the light emitting device 10 will be mainly described. The same reference numerals are provided to the same components as the light emitting device 10, and the description will not be repeated.

Since the upper surface 13a of the wavelength conversion member 13 is covered by the light blocking structure 15, the directional characteristics of the wavelength conversion member 13 in the cross section cut by the vertical plane including the optical axis $AX_{10}$ (cross section of the peripheral end surface 13c of the wavelength conversion member 13) indicate a vertically symmetric bidirectional distribution (intensity in the horizontal plane including the optical axis AX is the largest) as illustrated by the solid line in FIG. 5.

Meanwhile, since the peripheral end surface 13c of the wavelength conversion member 13 is a ring-shaped surface, the directional characteristics viewed from the upper surface 13a of the wavelength conversion member 13 indicate a distribution spread in a radial fashion around the wavelength conversion member 13 as illustrated by the alternate long and two short dashes line in FIG. 5.

As described, the directional characteristics of the light emitting device 10A indicate a three-dimensional distribution substantially coinciding with a three-dimensional distribution in which the circle indicated by the solid line in FIG. 5 is rotated 360° around the optical axis $AX_{10}$, that is, a distribution of a light distribution pattern in which the intensity in the horizontal plane including the optical axis $AX_{10}$ is the largest, and the intensity decreases with an increase in the distance from the horizontal plane (for example, light distribution pattern for low beam).

According to the light emitting device 10A of the present modified example, the operation of the light blocking structure 15 (equivalent to the first light blocking structure of the presently disclosed subject matter) can form a light emitting device 10A that emits light with a bidirectional distribution and that is suitable for reducing the thickness of the vehicle light fitting in the vertical direction.

[Light Emitting Device 10B]

Conventionally, proposed is a light emitting device using a wavelength conversion member that absorbs excitation light to convert the wavelength to emit light in a predetermined wavelength region (for example, see Japanese Patent No. 4379531).

Figure 37:
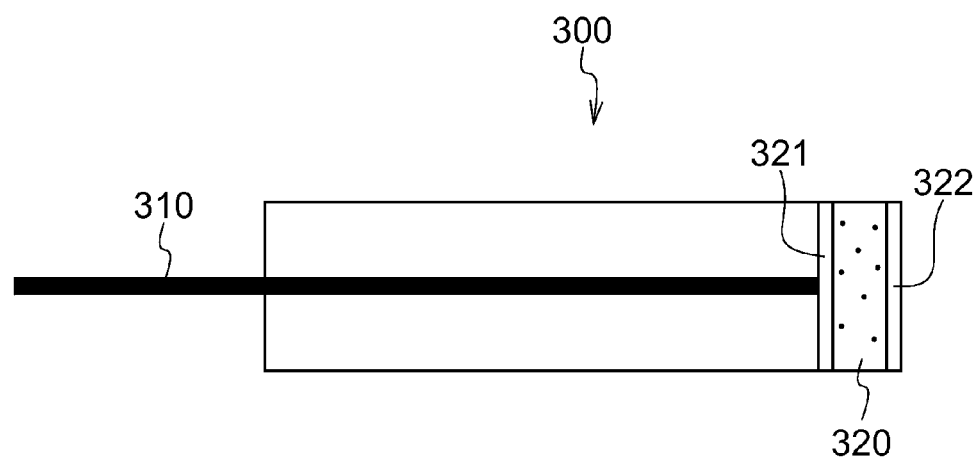
FIG. 37 is an example of a conventional light emitting device for endoscope using a wavelength conversion member.

FIG. 37 is an example of a conventional light emitting device 300 for endoscope using a wavelength conversion member.

As illustrated in FIG. 37, the light emitting device 300 includes: a light guide 310 such as an optical fiber for transmitting excitation light emitted from an excitation light source; a wavelength conversion member 320 with reflection films 321 and 322 arranged on the end surface of the light guide 310; and the like.

In the light emitting device 300 with the configuration, the wavelength conversion member 320 absorbs the excitation light emitted from the end surface of the light guide 310 to convert the wavelength to emit light in a predetermined wavelength region.

However, in the light emitting device 300 with the configuration, the end surface of the light guide 310 and the wavelength conversion member 320 are closely attached. Therefore, the light density of the excitation light for irradiating the wavelength conversion member 320 increases with an increase in the output of the excitation light, and the temperature of the wavelength conversion member 320 becomes high. There is a problem that the wavelength conversion member 320 is degraded and discolored, and the efficiency is reduced. Particularly, this problem is prominent when the excitation light source is an LD (laser diode).

Hereinafter, a light emitting device 10B that can suppress increase in the temperature of the wavelength conversion member (therefore, can suppress degradation in the wavelength conversion member and reduction in the efficiency even if the excitation light source is high-powered) will be described as a modified example of the light emitting device 10.

Figure 7:
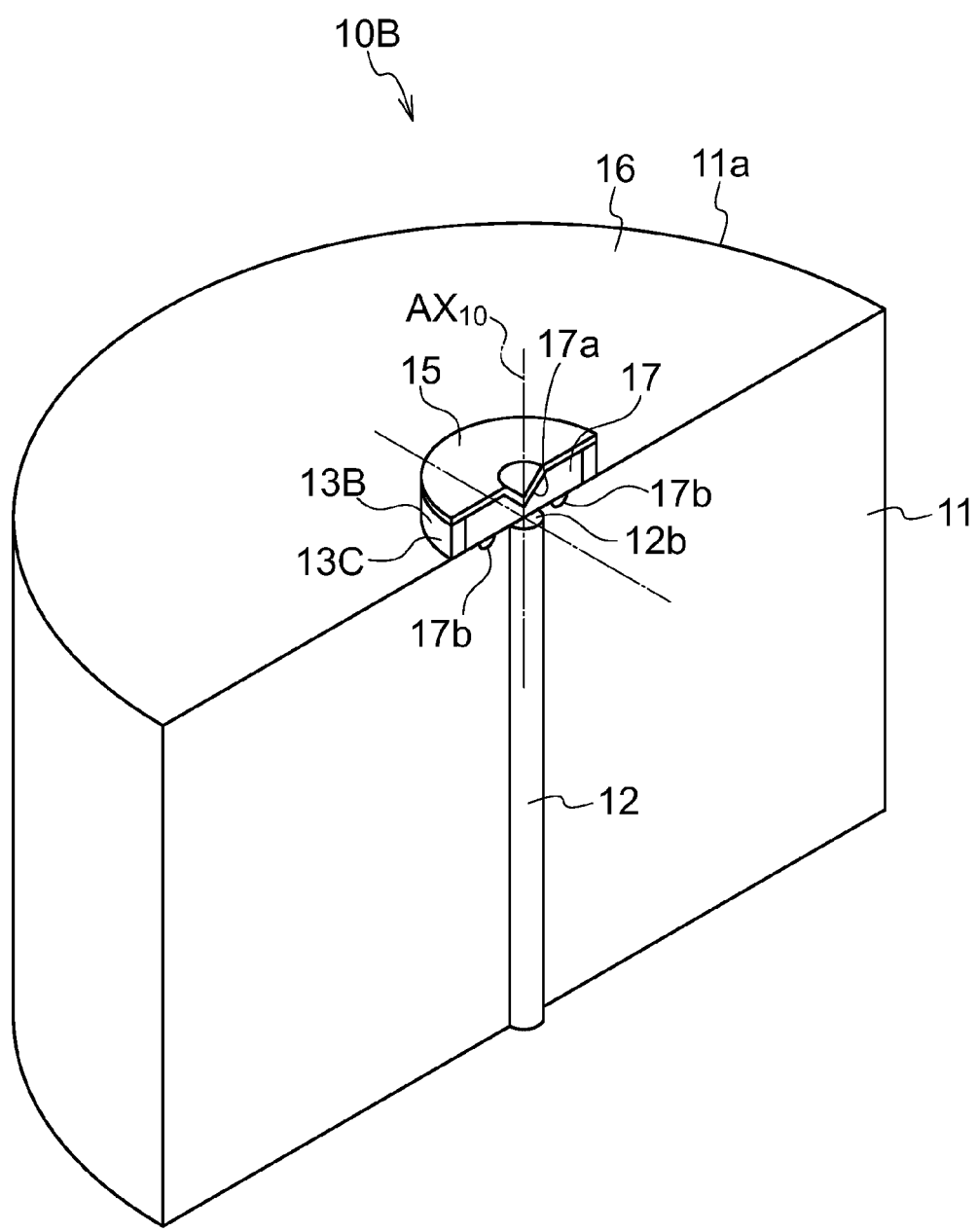
FIG. 7 is a cross-sectional perspective view in which an exemplary embodiment of a light emitting device is cut by a vertical plane including an optical axis $AX_{10}$ of the light emitting device.
Figure 8:
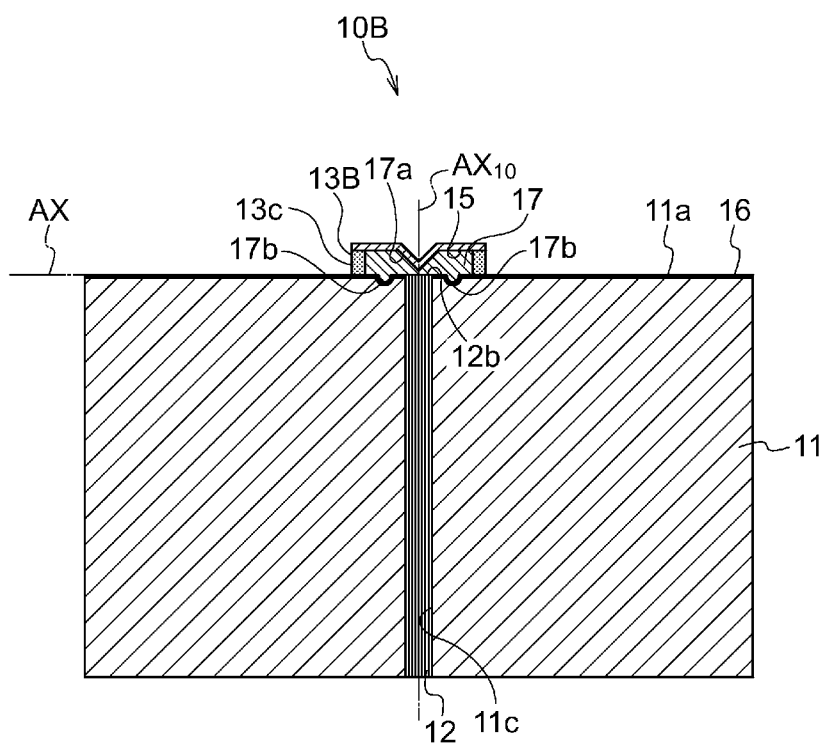
FIG. 8 is a cross-sectional view in which the light emitting device of FIG. 7 is cut by a vertical plane including the optical axis $AX_{10}$ of the light emitting device.

FIG. 7 is a cross-sectional perspective view in which the light emitting device 10B is cut by a vertical plane including the optical axis $AX_{10}$ of the light emitting device 10B. FIG. 8 is a cross-sectional view in which the light emitting device 10B is cut by a vertical plane including the optical axis $AX_{10}$ of the light emitting device 10B.

The light emitting device 10B is different from the light emitting device 10 in that a ring-shaped wavelength conversion member 13B is used in place of the disc-shaped wavelength conversion member 13. Other than that, the configuration is the same as the light emitting device 10. Hereinafter, the difference from the light emitting device 10 will be mainly described. The same reference numerals are provided to the same components as the light emitting device 10, and the description will not be repeated.

As illustrated in FIG. 7, the wavelength conversion member 13B is a ring-shaped fluorescent body of YAG or the like (fluorescent substance such as Ce:YAG or the like is desirable) (for example, axial direction thickness: 0.2 mm, radial direction thickness: 0.05 to 0.2 mm, and diameter: 1.0 mm) and includes a light deflection structure 17a and the like arranged inside of the ring.

A composite material with a mixture of a resin and the like with the fluorescent substance may be used for the wavelength conversion member 13B to improve the adhesiveness to a transparent body 17 provided with the light deflection structure 17a, or a compound of alumina and the like may be used to improve the thermal conductivity. As disclosed in Japanese Patent No. 4730227, different types of fluorescent substances may be formed by a plurality of areas and layers. In the wavelength conversion member 13B, the concentration of a yellow fluorescent body (for example, dosage of Ce) is adjusted so that the emission color satisfies a white range in a CIE chromaticity diagram defined by a regulation.

The light deflection structure 17a is configured to change the travelling direction of the excitation light from the excitation light source 14 emitted from the light emission surface 12b of the light guide 12 to irradiate the wavelength conversion member 13B.

The light deflection structure 17a only needs to be able to change the travelling direction of the excitation light from the excitation light source 14 emitted from the light emission surface 12b of the light guide 12 to irradiate the wavelength conversion member 13B. For example, as illustrated in FIGS. 7 and 8, a conical concave portion may be formed at the center (on the optical axis $AX_{10}$) of the upper surface of the transparent body 17 made of glass or transparent resin arranged inside of the ring of the wavelength conversion member 13B, and the light deflection structure 17a may be a conical reflection surface covering the conical concave portion by the light blocking structure 15.

If a reflection surface, such as a reflection layer and a reflection plate, is used as the light blocking structure 15, the light to be emitted from the upper surface of the light emitting unit (transparent body 17) is reflected by the light blocking structure 15 and returned toward the transparent body 17. Therefore, the extraction efficiency of the light emitted from the peripheral end surface 13c of the wavelength conversion member 13B can be improved.

The transparent body 17 is, for example, a transparent disc formed by extending a round shape (or a polygon, such as a square and a hexagon, or another shape) in the perpendicular direction of the upper surface 11a of the ferrule 11. The outer shape of the transparent body 17 is not limited to the round shape, and the transparent body 17 may be a polygon such as a square and a hexagon. The transparent body 17 includes a round upper surface and a round lower surface. A conical concave portion formed at the center (on the optical axis $AX_{10}$) of the upper surface of the transparent body 17 has an apex over the optical axis $AX_{10}$ and has a bottom surface on the upper surface of the transparent body 17. The conical concave portion is arranged on the optical path of the excitation light (on the same axis as the optical axis of the excitation light) emitted from the light emission surface 12b of the light guide 12 (see FIG. 8). A convex portion 17b for positioning arranged on the lower surface of the transparent body 17 is inserted to the concave portion formed on the upper surface 11a of the ferrule 11, and the wavelength conversion member 13B with the light deflection structure 17a is positioned and adhered to the upper surface 11a of the ferrule 11.

The material of the transparent body 17 is not particularly limited as long as the permeability is high with respect to the wavelength of the excitation light source 14. For example, the transparent body 17 may be transparent ceramics, such as quartz, transparent resin, single crystal sapphire, and non-doped YAG. It is desirable that the transparent body 17 not include a scattering source, such as pores and impurities, to prevent unnecessary scattering of the excitation light.

The wavelength conversion member with the light deflection structure 17a is manufactured, for example, as follows.

First, fluorescent powder of YAG or the like is put into a metal mold, and this is pressed and sintered to manufacture the ring-shaped wavelength conversion member 13B.

Next, a dispenser or the like is used to fill about 80% of the inside of the ring of the ring-shaped wavelength conversion member 13B with a transparent resin (for example, a silicon resin). Subsequently, a conical prism is inserted from above into the center of the filled transparent resin. As a result, the transparent resin (for example, silicon resin) is filled close to the upper edge of the inside of the ring of the ring-shaped wavelength conversion member 13B. After the transparent resin is hardened, the conical prism is removed. As a result, the light deflection structure 17a made of the trace of the conical prism is formed at the center of the upper surface of the hardened transparent resin (transparent body 17). The upper surface of the light emitting unit (wavelength conversion member 13B and transparent body 17) is covered by the light blocking member 15.

In this way, the wavelength conversion member 13B provided with the light deflection structure 17a inside of the ring is manufactured.

The manufacturing method of the wavelength conversion member 13B with the light deflection structure 17a is not limited to the method described above. For example, the disc-shaped transparent body 17 provided with a conical concave portion at the center (on the optical axis $AX_{10}$) of the upper surface may be manufactured first, and a wavelength conversion member may be thinly applied to the peripheral end surface of the transparent body 17 to manufacture the wavelength conversion member 13B with the light deflection structure 17a.

Figure 9:
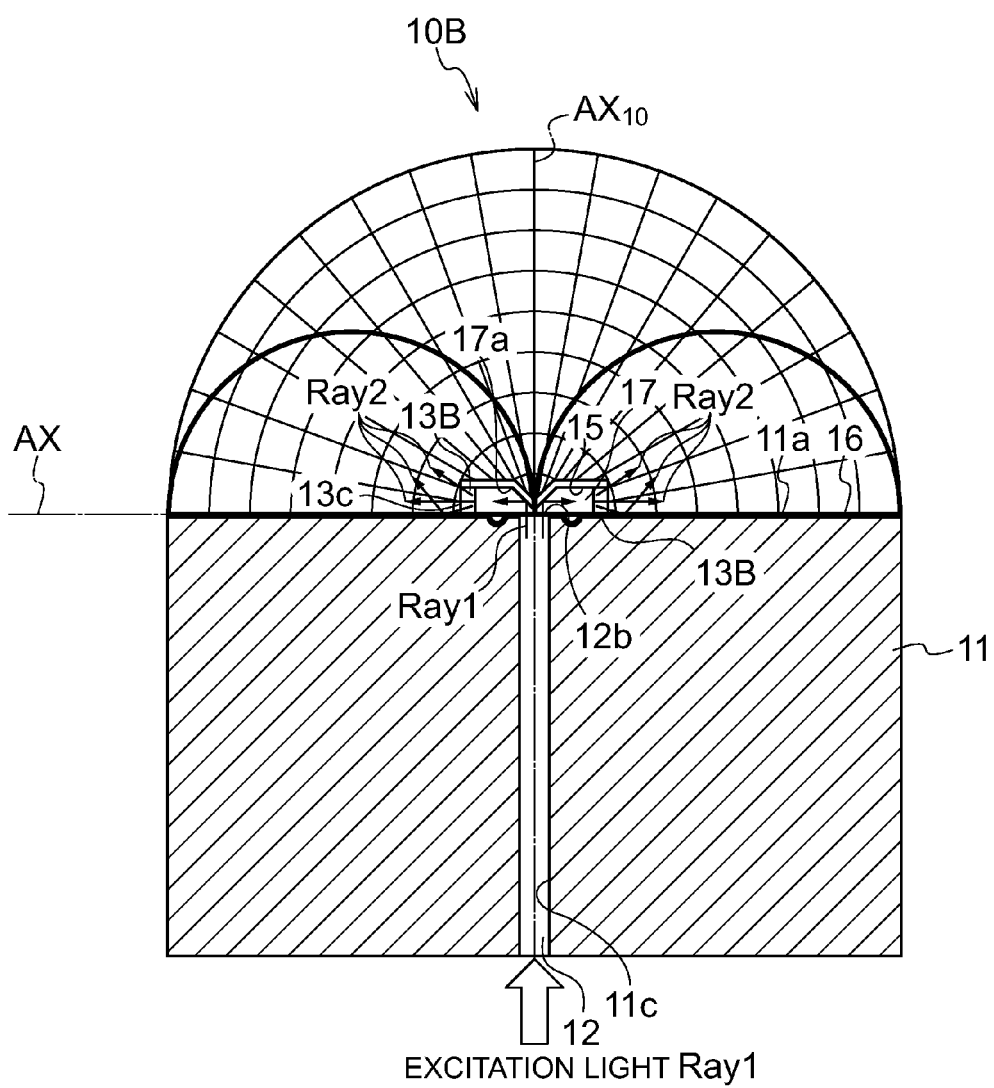
FIG. 9 is a diagram for explaining the directional characteristics of the light emitting device of FIG. 7.

According to the light emitting device 10B of the present modified example, as illustrated in FIG. 9, the excitation light Ray1 from the excitation light source 14 is guided into the light guide 12 from the light entering surface 12a of the light guide 12 and guided to the light emission surface 12b. The excitation light Ray1 is emitted from the light emission surface 12b and guided into the transparent body 17 to irradiate the light deflection structure 17a.

The light deflection structure 17a changes the travelling direction of the excitation light Ray1 incident on the light deflection structure 17a to a direction substantially perpendicular to the optical axis $AX_{10}$ to irradiate the ring-shaped wavelength conversion member 13B (inner ring surface of the ring-shaped wavelength conversion member 13B). Since the light deflection structure 17a is a trace of a conical prism, the excitation light Ray1 with the travelling direction changed by the light deflection structure 17a travels in a radial fashion around the optical axis $AX_{10}$. Therefore, the light density of the excitation light Ray1 with the travelling direction changed by the light deflection structure 17a is smaller than before the change in the travelling direction.

The ring-shaped wavelength conversion member 13B, which has received the excitation light Ray1 from the excitation light source 14 with the light density reduced and the travelling direction changed by the light deflection structure 17a, emits the white light Ray2 based on a mixed color of the light excited by the excitation light from the excitation light source 14 and the excitation light from the excitation light source 14 transmitted through the wavelength conversion member 13B.

The white light Ray2 emitted by the wavelength conversion member 13B is reflected by the light blocking structure 15 and/or the reflection structure 16 (or directly, without being reflected by the light blocking structure 15 or the reflection structure 16) and emitted from the whole circumference of the peripheral end surface 13c of the wavelength conversion member 13B.

More specifically, the excitation light deflected by the light deflection structure 17a enters the wavelength conversion member 13B. Part of the light is absorbed by the fluorescent substance, and wavelength-converted light is emitted to the outside. The wavelength of other part of the light is not converted, and the light is scattered and emitted to the outside. As a result, white light based on a mixed color of the light is emitted to the outside as illumination light.

Since the upper surface of the light emitting unit (wavelength conversion member 13B and transparent body 17) is covered by the light blocking structure 15, the directional characteristics of the light emitting unit (wavelength conversion member 13B and transparent body 17) in the cross section cut by the vertical plane including the optical axis $AX_{10}$ (cross section of the peripheral end surface 13c of the wavelength conversion member 13B) indicate a vertically symmetric bidirectional distribution (intensity in the horizontal plane including the optical axis AX is the largest) as illustrated by the solid line in FIG. 5.

Meanwhile, since the peripheral end surface 13c of the wavelength conversion member 13B is a ring-shaped surface, the directional characteristics viewed from the upper surface of the light emitting unit (wavelength conversion member 13B and transparent body 17) indicate a distribution spread in a radial fashion around the wavelength conversion member 13B as illustrated by the alternate long and two short dashes line in FIG. 5.

The white light Ray2 emitted downward from the whole circumference of the peripheral end surface 13c of the wavelength conversion member 13B is reflected and turned back by the reflection structure 16 arranged around the lower surface 13b of the wavelength conversion member 13B, and the white light Ray2 is directed upward (see FIG. 9).

As a result, the directional characteristics of the light emitting device 10B in the cross section cut by the vertical plane including the optical axis $AX_{10}$ indicate a distribution in a half bidirectional pattern including the upper half of the bidirectional pattern (intensity in the horizontal plane including the optical axis AX is the largest) as illustrated in FIG. 9.

Meanwhile, since the peripheral end surface 13c of the wavelength conversion member 13B is a ring-shaped surface, the directional characteristics viewed from the upper surface of the light emitting device 10B indicate a distribution spread in a radial fashion around the wavelength conversion member 13B as illustrated by the alternate long and two short dashes line in (b) portion of FIG. 2.

As described, the directional characteristics of the light emitting device 10B indicate a three-dimensional distribution substantially coinciding with a three-dimensional distribution in which the arc indicated by a solid line in FIG. 9 is rotated 360° around the optical axis $AX_{10}$, that is, a distribution of a light distribution pattern in which the intensity in the horizontal plane including the optical axis AX is the largest, and the intensity decreases with an increase in the distance from the horizontal plane (for example, light distribution pattern for low beam).

As described, according to the light emitting device 10B of the present modified example, the light with a bidirectional distribution emitted from the peripheral end surface 13c of the wavelength conversion member 13B is reflected by the operation of the light blocking structure 15 and the reflection structure 16 arranged around the lower surface of the light emitting unit (wavelength conversion member 13B and transparent body 17). This can form a light emitting device 10B that emits light with a distribution in a half bidirectional pattern in which the bidirectional pattern is halved and that is suitable for reducing the thickness of the vehicle light fitting in the vertical direction.

According to the light emitting device 10B of the present modified example, the following effects are further attained.

First, reduction in the efficiency caused by a rise in the temperature of the wavelength conversion member 13B can be suppressed.

More specifically, in the light emitting device 10 (see (a) portion of FIG. 2) and the conventional light emitting device 300 (see FIG. 37), the end surface of the light guide and the wavelength conversion member are closely attached. Therefore, the light density of the excitation light for irradiating the wavelength conversion member increases with an increase in the output of the excitation light, and the temperature of the wavelength conversion member becomes high. There is a problem that the wavelength conversion member is degraded and discolored, and the efficiency is reduced. Particularly, this problem is prominent when the excitation light source is an LD (laser diode).

On the other hand, according to the light emitting device 10B of the present modified example of the present modified example, the wavelength conversion member 13B is irradiated after reducing the light density of the excitation light from the excitation light source 14 and changing the travelling direction by the operation of the light deflection structure 17a. The wavelength conversion member 13B is not directly exposed to the heat, high-intensity light, and the like of the excitation light source 14, and the increase in the temperature of the wavelength conversion member 13B can be suppressed.

For example, assuming that the area of the light emission surface 12b of the light guide $12=\pi \times 0.1^2=\pi \times 10^{-2}$ and the area of the peripheral end surface 13c of the wavelength conversion member $13B=2 \times \pi \times 0.5 \times 0.2=20\pi \times 10^{-2}$ in the light emitting device 10B of the present modified example, the light density irradiated on the wavelength conversion member 13B can be suppressed to ½0 of that of light emitting device 10.

Therefore, the light emitting device 10B of the present modified example can suppress degradation and discoloring of the wavelength conversion member 13B as well as reduction in the efficiency even if the excitation light source 14 is high-powered. Furthermore, light emission with excellent light emission characteristics that do not cause color unevenness and brightness unevenness can be realized.

Second, reduction in the efficiency caused by repetition of scattering inside of the wavelength conversion member 13 can be suppressed.

More specifically, a disc-shaped wavelength conversion member that is dense from the center to the peripheral end surface is used in the light emitting device 10 (see (a) portion of FIG. 2). Therefore, scattering is repeated inside of the wavelength conversion member from the center to the peripheral end surface of the wavelength conversion member (light is confined inside), and there is a problem that the light extraction efficiency is reduced.

On the other hand, according to the light emitting device 10B of the present modified example, the hollow ring-shaped wavelength conversion member 13B is used instead of the disc-shaped wavelength conversion member 13 that is dense from the center to the peripheral end surface 13c. Therefore, the distance of repeating the scattering inside of the wavelength conversion member 13 is the thickness (for example, 0.05 to 0.2 mm) of the ring-shaped wavelength conversion member 13B in the radial direction, and the distance of repeating the scattering is shorter than that of the disc-shaped wavelength conversion member 13.

Therefore, according to the light emitting device 10B of the present modified example, the reduction in the efficiency caused by the repetition of the scattering inside of the wavelength conversion member 13 can be suppressed.

Third, reduction in the efficiency caused by the reflection of the excitation light, which is guided in the light guide 12, in the interface between the light guide 12 and the wavelength conversion member 13 can be suppressed.

More specifically, in the light emitting device 10 (see (a) portion of FIG. 2) and the conventional light emitting device 300 (see FIG. 37), the end surface of the light guide and the wavelength conversion member with different refractive indices are closely attached. Therefore, the excitation light guided in the light guide is reflected in the interface between the light guide and the wavelength conversion member without being emitted from the end surface of the light guide. The excitation light passes through the light guide in the opposite direction and is guided to the excitation light source. There is a problem that the excitation light source is adversely affected, and the efficiency is reduced.

On the other hand, according to the light emitting device 10B of the present modified example, the end surface (light emission surface 12b) of the light guide 12 and the wavelength conversion member 13B are not closely attached, and the wavelength conversion member 13B is irradiated after changing the travelling direction of the excitation light from the excitation light source 14 to a direction perpendicular to the optical axis $AX_{10}$ by the operation of the light deflection structure 17a. This can suppress the reduction in the efficiency caused by the reflection of the excitation light, which is guided in the light guide 12, in the interface between the light guide 12 and the wavelength conversion member 13.

Next, a modified example of the light deflection structure 17a will be described.

Figure 10:
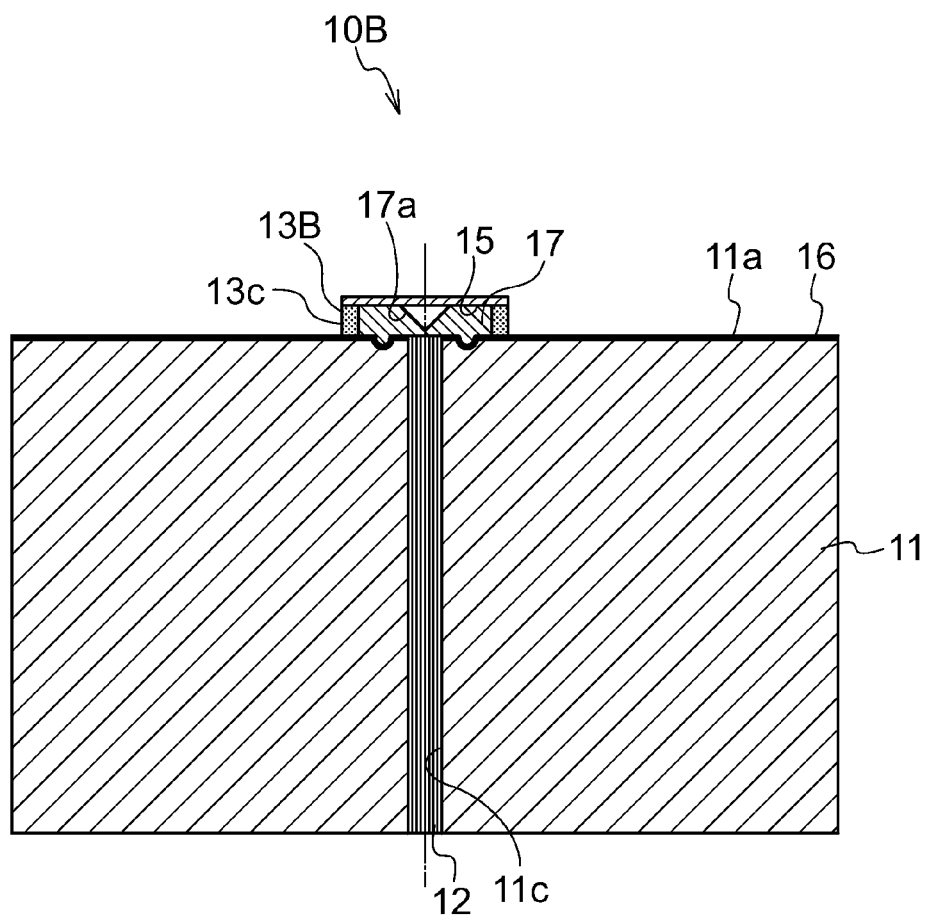
FIG. 10 is a diagram for explaining a modified example of light deflection structure.
Figure 11:
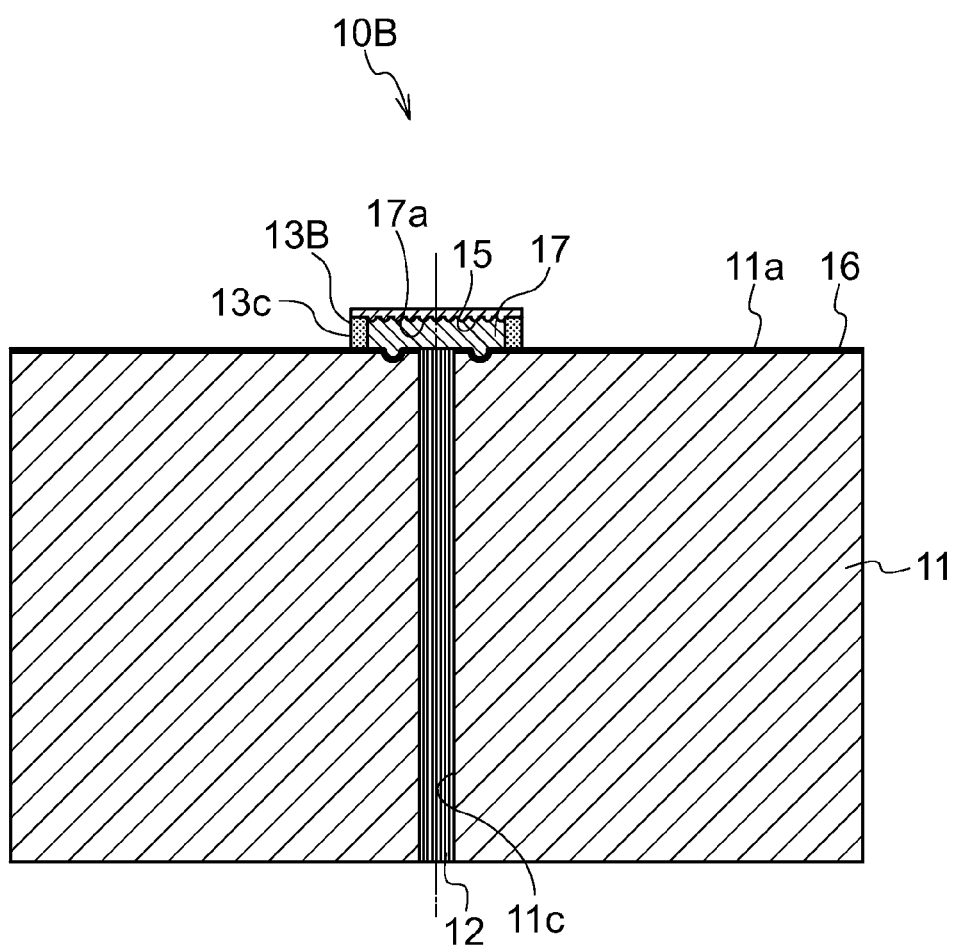
FIG. 11 is a diagram for explaining a modified example of the light deflection structure.

FIGS. 10 and 11 are diagrams for explaining the modified example of the light deflection structure 17a.

As illustrated in FIG. 10, the light deflection structure 17a may be a conical reflection surface in which a conical concave portion formed at the center (on the optical axis $AX_{10}$) of the upper surface of the transparent body 17 is not covered by the light blocking structure 15. In this example, it is desirable that a material with a high refractive index (for example, sapphire) be used as the material of the transparent body 17 so that the excitation light emitted from the light emission surface 12b of the light guide 12 is totally reflected by the conical reflection surface. It is desirable that the light blocking structure 15 cover the area other than the conical concave portion at the center (on the optical axis $AX_{10}$) of the upper surface of the transparent body 17 and cover the upper surface of the wavelength conversion member 13B.

Alternatively, as illustrated in FIG. 11, the light deflection structure 17a may be provided with a scattering surface (such as a plurality of minute irregularities) on the upper surface of the transparent body 17 without being provided with the conical concave portion at the center (on the optical axis $AX_{10}$) of the upper surface of the transparent body 17, and the light blocking structure 15 may cover the upper surface of the transparent body 17 and the upper surface of the wavelength conversion member 13B.

Alternatively, the light deflection structure 17a may be provided with a plurality of V-groove or conical prism cuts on the upper surface of the transparent body 17 without being provided with the conical concave portion at the center (on the optical axis $AX_{10}$) on the upper surface of the transparent body 17, or a diffuse reflection member, such as a white resin, may be separately adhered to the upper surface of the transparent body 17.

The modified examples can also attain the same effects as the light emitting device 10B.

[Light Emitting Device 10C]

Next, a light emitting device 10C using a wavelength conversion member 13C in which part of the peripheral end surface 13c is covered by a light blocking structure will be described as a modified example of the light emitting device 10.

Figure 12:
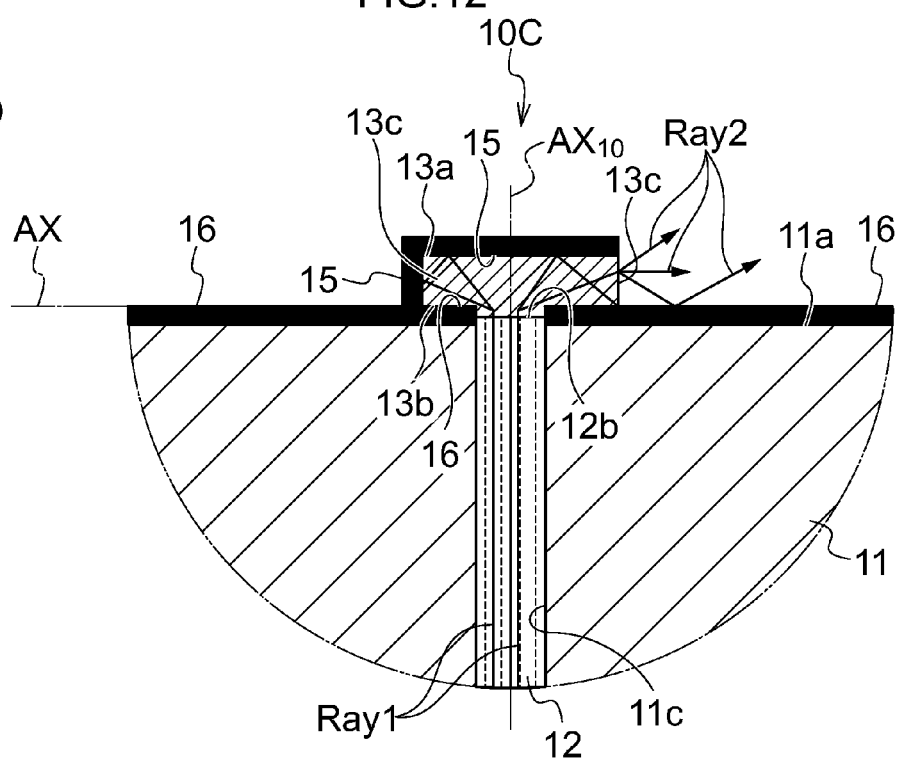
FIG. 12(a) is an enlarged view in which a circumference of a wavelength conversion member of an exemplary light emitting device is enlarged.
FIG. 12(b) is a diagram for explaining directional characteristics of the light emitting device.
Figure 12:
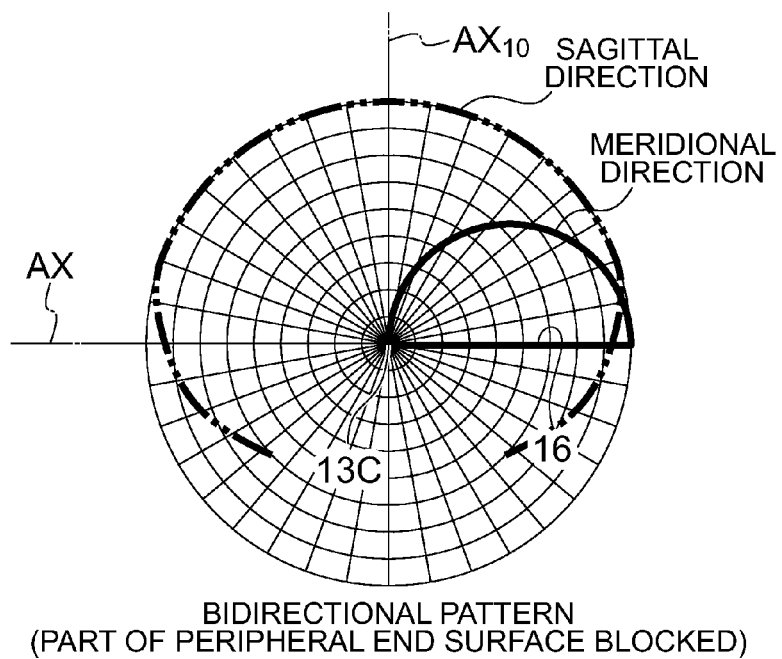
Figure 13:
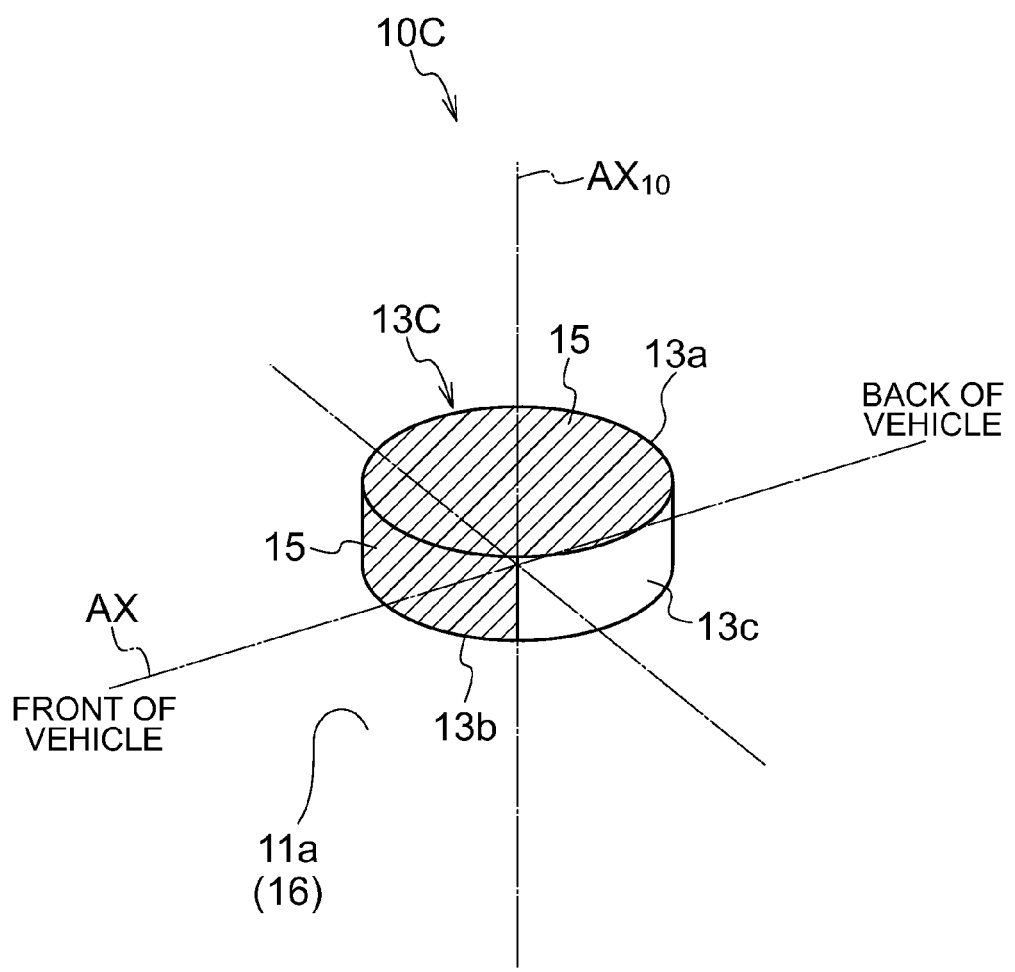
FIG. 13 is a perspective view of the wavelength conversion member of FIG. 12.

(a) portion of FIG. 12 is an enlarged view in which the circumference of the wavelength conversion member 13C of the light emitting device 10C is enlarged. FIG. 13 is a perspective view of the wavelength conversion member 13C.

The light emitting device 10C is different from the light emitting device 10 in that the wavelength conversion member 13C in which a partial range of the peripheral end surface 13c is covered by the light blocking structure 15 is used in place of the wavelength conversion member 13. Other than that, the configuration is the same as the light emitting device 10. Hereinafter, the difference from the light emitting device 10 will be mainly described. The same reference numerals are provided to the same components as the light emitting device 10, and the description will not be repeated.

As illustrated in (a) portion of FIG. 12 and FIG. 13, the wavelength conversion member 13C is an example in which a partial range of the peripheral end surface 13c, such as a range other than a range for emitting light to be incident on a main reflection surface 22 described later (for example, a range of 120° to the left and right of the optical axis AX (240° in total)), is covered by the light blocking structure 15 (equivalent to a second light blocking structure of the presently disclosed subject matter). If a reflection surface, such as a reflection layer and a reflection plate, is used as the light blocking structure 15 that covers the partial range of the peripheral end surface 13c, light to be emitted from the peripheral end surface 13c of the wavelength conversion member 13C of the light emitted by the wavelength conversion member 13C is reflected by the light blocking structure 15 and returned toward the wavelength conversion member 13C. Therefore, the extraction efficiency of the light emitted from the peripheral end surface 13c of the wavelength conversion member 13C can be improved.

Since the upper surface 13a and the partial range of the peripheral end surface 13c of the wavelength conversion member 13C are covered by the light blocking structure 15, the directional characteristics of the light emitting device 10C in the cross section cut by the vertical plane including the optical axis $AX_{10}$ indicate a distribution in one-half bidirectional pattern including an upper half of the bidirectional pattern (intensity in the horizontal plane including the optical axis AX is the largest) as illustrated by a solid line in (b) portion of FIG. 12.

Meanwhile, since the peripheral end surface 13c of the wavelength conversion member 13C is a ring-shaped surface, the directional characteristics viewed from the upper surface of the light emitting device 10C indicate a distribution spread in a radial fashion around the wavelength conversion member 13C as illustrated by an alternate long and two short dashes line in (b) portion of FIG. 12.

As described, the directional characteristics of the light emitting device 10C indicate a three-dimensional distribution substantially coinciding with a three-dimensional distribution in which the arc indicated by the solid line in (b) portion of FIG. 12 is rotated 120° to the left and right of the optical axis AX (240° in total) extending backward of the vehicle around the optical axis $AX_{10}$, that is, a distribution of a light distribution pattern in which the intensity in the horizontal plane including the optical axis AX is the largest, and the intensity decreases with an increase in the distance from the horizontal plane (for example, light distribution pattern for low beam).

(b) portion of FIG. 12 is a diagram for explaining the directional characteristics of the light emitting device 10C. In (b) portion of FIG. 12, the solid line indicates directional characteristics (half bidirectional pattern) of the light emitting device 10C in the cross section cut by the vertical plane including the optical axis $AX_{10}$, and the alternate long and two short dashes line indicates directional characteristics viewed from the upper surface of the light emitting device 10C.

As described, according to the light emitting device 10C of the present modified example, the light with a bidirectional distribution emitted from the peripheral end surface 13c of the wavelength conversion member 13C is reflected by the operation of the light blocking structure 15 and the reflection structure 16 arranged around the lower surface 13b of the wavelength conversion member 13C. This can form a light emitting device 10C that emits light with a distribution in one-half bidirectional pattern in which the bidirectional pattern is halved and that is suitable for reducing the thickness of the vehicle light fitting in the vertical direction.

Furthermore, according to the light emitting device 10C of the present modified example, the operation of the light blocking structure 15 (equivalent to the second light blocking structure of the presently disclosed subject matter) that covers the partial range of the peripheral end surface 13c of the wavelength conversion member 13C can prevent emission of light causing glare or the like from the peripheral end surface 13c of the wavelength conversion member 13C.

Although the example of forming the light emitting device 10C by using the wavelength conversion member 13C, in which the partial range of the peripheral end surface 13c is covered by the light blocking structure 15, in place of the wavelength conversion member 13 included in the light emitting device 10, has been described, the presently disclosed subject matter is not limited to this.

For example, a light emitting device similar to the light emitting device 10C can also be formed by using the wavelength conversion member 13, in which the partial range of the peripheral end surface 13c is covered by the light blocking structure 15, in place of the wavelength conversion member 13 included in the light emitting device 10A.

A light emitting device similar to the light emitting device 10C can also be formed by using the wavelength conversion member 13B, in which the partial range of the peripheral end surface 13c is covered by the light blocking structure 15, in place of the wavelength conversion member 13B included in the light emitting device 10B.

[Light Emitting Device 10D]

Next, a light emitting device 10D using a wavelength conversion member 13D, in which part of the peripheral end surface 13c is cut, and the cross section is covered by the light blocking structure, will be described as a modified example of the light emitting device 10.

Figure 14:
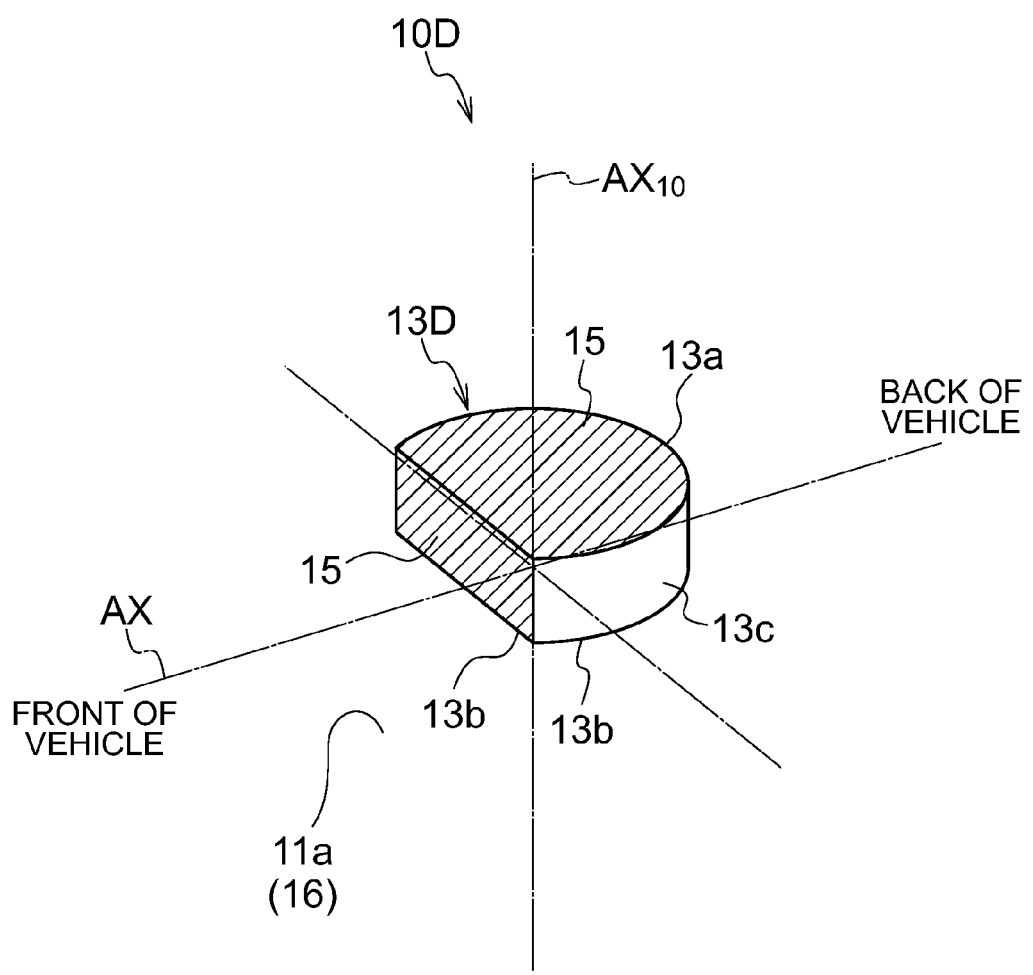
FIG. 14 is a perspective view of an exemplary wavelength conversion member.

FIG. 14 is a perspective view of the wavelength conversion member 13D.

The light emitting device 10D is different from the light emitting device 10 in that the wavelength conversion member 13D, in which part of the peripheral end surface 13c is cut, and the cross section is covered by the light blocking structure 15, is used in place of the wavelength conversion member 13.

Other than that, the configuration is the same as the light emitting device 10. Hereinafter, the difference from the light emitting device 10 will be mainly described. The same reference numerals are provided to the same components as the light emitting device 10, and the description will not be repeated.

As illustrated in FIG. 14, the wavelength conversion member 13D is an example in which a partial range of the peripheral end surface 13c, such as a range other than a range for emitting light to be incident on the main reflection surface 22 described later (for example, a range of 120° to the left and right of the optical axis AX (240° in total)), is cut, and the cross section is covered by the light blocking structure 15 (equivalent to third light blocking structure of the presently disclosed subject matter). If a reflection surface, such as a reflection layer and a reflection plate, is used as the light blocking structure 15 that covers the partial range of the peripheral end surface 13c, light to be emitted from the peripheral end surface 13c of the wavelength conversion member 13D of the light emitted by the wavelength conversion member 13D is reflected by the light blocking structure 15 and returned toward the wavelength conversion member 13D. Therefore, the extraction efficiency of the light emitted from the peripheral end surface 13c of the wavelength conversion member 13D can be improved.

Since the upper surface 13a and the cut cross section of the wavelength conversion member 13D are covered by the light blocking structure 15, the directional characteristics of the light emitting device 10D in the cross section cut by the vertical plane including the optical axis $AX_{10}$ indicate a distribution in one-half bidirectional pattern including an upper half of the bidirectional pattern (intensity in the horizontal plane including the optical axis AX is the largest) as illustrated by a solid line in (b) portion of FIG. 12.

Meanwhile, since the peripheral end surface 13c of the wavelength conversion member 13D is a ring-shaped surface, the directional characteristics viewed from the upper surface of the light emitting device 10D indicate a distribution spread in a radial fashion around the wavelength conversion member 13D as illustrated by an alternate long and two short dashes line in (b) portion of FIG. 12.

As described, the directional characteristics of the light emitting device 10D indicate a three-dimensional distribution substantially coinciding with a three-dimensional distribution in which the arc indicated by the solid line in (b) portion of FIG. 12 is rotated 120° to the left and right of the optical axis AX (240° in total) extending backward of the vehicle around the optical axis $AX_{10}$, that is, a distribution of a light distribution pattern in which the intensity in the horizontal plane including the optical axis AX is the largest, and the intensity decreases with an increase in the distance from the horizontal plane (for example, light distribution pattern for low beam).

As described, according to the light emitting device 10D of the present modified example, the light with a bidirectional distribution emitted from the peripheral end surface 13c of the wavelength conversion member 13D is reflected by the operation of the light blocking structure 15 and the reflection structure 16 arranged around the lower surface 13b of the wavelength conversion member 13D. This can form a light emitting device 10D that emits light with a distribution in one-half bidirectional pattern in which the bidirectional pattern is halved and that is suitable for reducing the thickness of the vehicle light fitting in the vertical direction.

Furthermore, according to the light emitting device 10D of the present modified example, the operation of the light blocking structure 15 (equivalent to the third light blocking structure of the presently disclosed subject matter) that covers the partial range of the peripheral end surface 13c of the wavelength conversion member 13D can prevent emission of light causing glare or the like from the peripheral end surface 13c of the wavelength conversion member 13D.

According to the light emitting device 10D of the present modified example, the setting range of the light blocking structure 15 relative to the peripheral end surface 13c of the wavelength conversion member 13D can be easily figured out based on the cut location.

According to the light emitting device 10D of the present modified example, an attachment direction and the like relative to an attachment partner (upper surface 11a of the ferrule 11 in the present modified example) of the wavelength conversion member 13D can be easily figured out based on the cut location.

Although the example of forming the light emitting device 10D by using the wavelength conversion member 13D, in which part of the peripheral end surface 13c is cut, and the cross section is covered by the light blocking structure 15, in place of the wavelength conversion member 13 included in the light emitting device 10, has been described, the presently disclosed subject matter is not limited to this.

For example, a light emitting device similar to the light emitting device 10D can also be formed by using the wavelength conversion member 13, in which part of the peripheral end surface 13c is cut, and the cross section is covered by the light blocking structure 15, in place of the wavelength conversion member 13 included in the light emitting device 10A.

A light emitting device similar to the light emitting device 10D can also be formed by using the wavelength conversion member 13B, in which part of the peripheral end surface 13c is cut, and the cross section is covered by the light blocking structure 15, in place of the wavelength conversion member 13B included in the light emitting device 10B.

[Light Emitting Device 10E]

Next, a light emitting device 10E using a triangular-prism wavelength conversion member 13E will be described as a modified example of the light emitting device 10.

Figure 15:
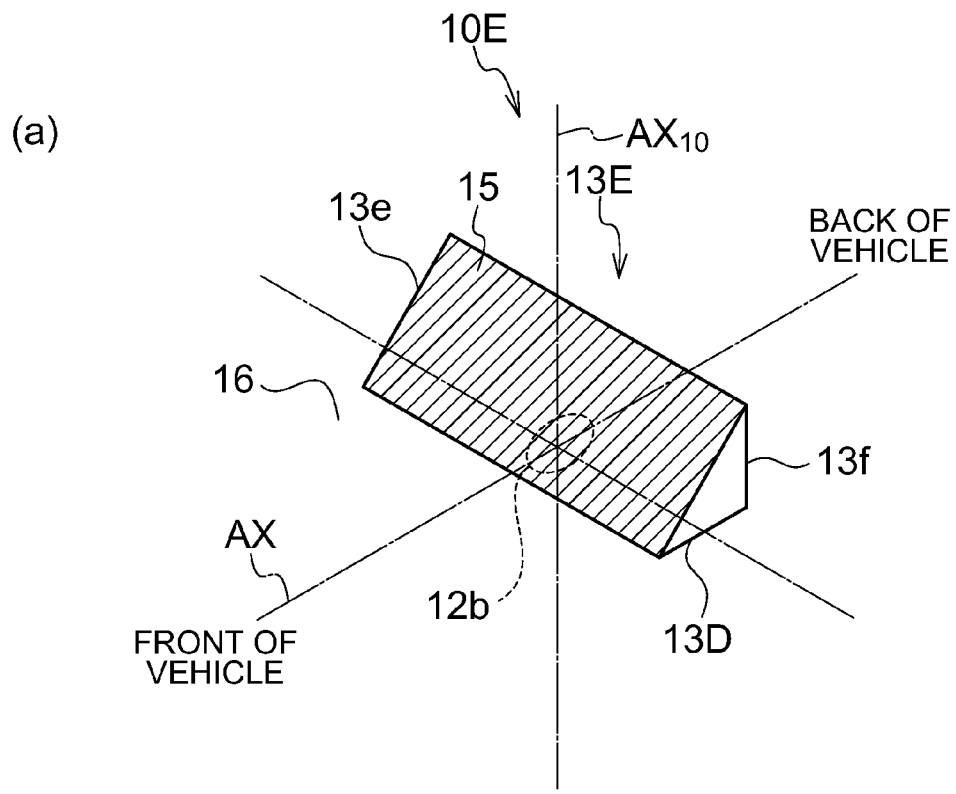
FIG. 15(a) is a perspective view of an exemplary wavelength conversion member.
FIG. 15(b) is a diagram for explaining directional characteristics of an exemplary light emitting device.
Figure 15:
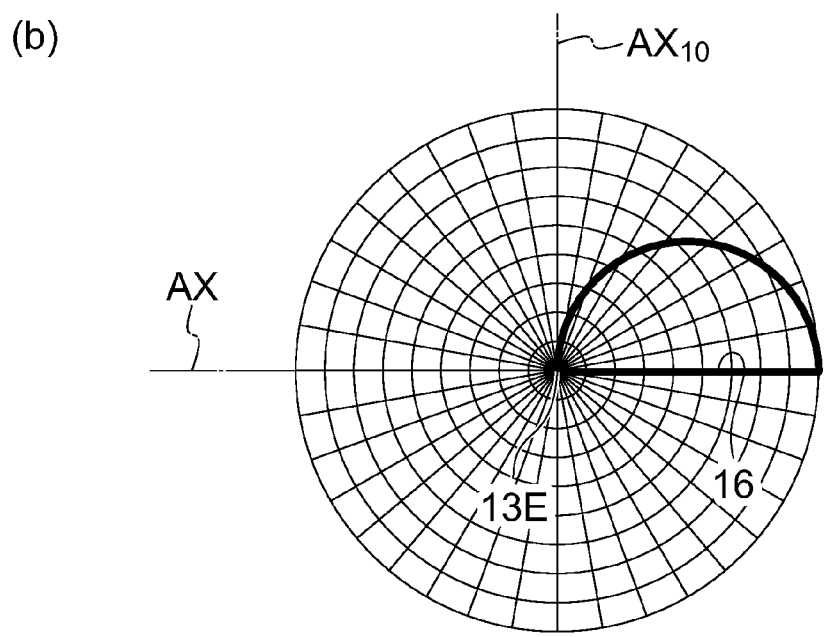

(a) portion of FIG. 15 is a perspective view of the wavelength conversion member 13E.

The light emitting device 10E is different from the light emitting device 10 in that the triangular-prism wavelength conversion member 13E is used in place of the disc-shaped wavelength conversion member 13. Other than that, the configuration is the same as the light emitting device 10. Hereinafter, the difference from the light emitting device 10 will be mainly described. The same reference numerals are provided to the same components as the light emitting device 10, and the description will not be repeated.

As illustrated in (a) portion of FIG. 15, the wavelength conversion member 13E is a triangular-prism fluorescent body of YAG or the like formed by extending a triangle (triangle with one side on the optical axis AX and one side on the optical axis $AX_{10}$) in the perpendicular direction and symmetrically with respect to a vertical plane including the optical axis AX and the optical axis $AX_{10}$. The wavelength conversion member 13E includes: a rectangular bottom surface 13d; an inclined surface 13e inclined to the horizontal plane so that the front side is positioned below the back side; and a vertical plane 13f closer to the back of the vehicle.

The inclined surface 13e of the wavelength conversion member 13E is covered by the light blocking structure 15. If a reflection surface, such as a reflection layer and a reflection plate, is used as the light blocking structure 15, light to be emitted from the inclined surface 13e of the wavelength conversion member 13E of the light emitted from the wavelength conversion member 13E is reflected by the light blocking structure 15 and returned toward the wavelength conversion member 13E. Therefore, the extraction efficiency of light emitted from the inclined surface 13e of the wavelength conversion member 13E can be improved.

The bottom surface 13d of the wavelength conversion member 13E is adhered to an area around the through hole 11c for light guide on the upper surface 11a (reflection structure 16) of the ferrule 11 to cover the through hole 11c for light guide (light emission surface 12b of the light guide 12).

According to the light emitting device 10E of the present modified example, the excitation light from the excitation light source 14 is guided into the light guide 12 from the light entering surface 12a of the light guide 12 and guided to the light emission surface 12b, and the light is emitted from the light emission surface 12b to irradiate the wavelength conversion member 13E.

The wavelength conversion member 13E that has received the excitation light from the excitation light source 14 emits white light based on a mixed color of the light excited by the excitation light from the excitation light source 14 and the excitation light from the excitation light source 14 transmitted through the wavelength conversion member 13E.

The white light emitted by the wavelength conversion member 13E is reflected by the light blocking structure 15 and/or the reflection structure 16 (or directly, without being reflected by the light blocking structure 15 or the reflection structure 16) and emitted from the vertical plane 13f of the wavelength conversion member 13E.

Since the inclined surface 13e of the wavelength conversion member 13E is covered by the light blocking structure 15, the directional characteristics of the wavelength conversion member 13E in the cross section cut by the vertical plane including the optical axis AX and the optical axis $AX_{10}$ (cross section of the vertical plane 13e of the wavelength conversion member 13E) indicate a vertically symmetric bidirectional distribution (intensity in the horizontal plane including the optical axis AX is the largest).

The white light emitted downward from the inclined surface 13e of the wavelength conversion member 13E is reflected and turned back by the reflection structure 16 arranged around the bottom surface 13d of the wavelength conversion member 13E, and the white light is directed upward.

As a result, the directional characteristics of the light emitting device 10E in the cross section cut by the vertical plane including the optical axis $AX_{10}$ indicate a distribution in one-half bidirectional pattern including an upper half of the bidirectional pattern as illustrated by an arc in (b) portion of FIG. 15 (intensity in the horizontal plane including the optical axis AX is the largest).

(b) portion of FIG. 15 is a diagram for explaining the directional characteristics of the light emitting device 10E. The arc in (b) portion of FIG. 15 indicates the directional characteristics of the light emitting device 10E in the cross section cut by the vertical plane including the optical axis AX and the optical axis $AX_{10}$.

As described, the directional characteristics of the light emitting device 10E indicate a three-dimensional distribution substantially coinciding with a three-dimensional distribution formed by extending the arc indicated by the solid line in (b) portion of FIG. 15 in the perpendicular direction and symmetrically with respect to the vertical plane including the optical axis AX and the optical axis $AX_{10}$, that is, a distribution in a light distribution pattern in which the intensity in the horizontal plane including the optical axis AX is the largest, and the intensity decreases with an increase in the distance from the horizontal plane (for example, light distribution pattern for low beam).

As described, according to the light emitting device 10E of the present embodiment, the light with a bidirectional distribution emitted from the vertical plane 13f of the wavelength conversion member 13E is reflected by the operation of the light blocking structure 15 and the reflection structure 16 arranged around the bottom surface 13d of the wavelength conversion member 13E. This can form a light emitting device 10E that emits light with a distribution in one-half bidirectional pattern in which the bidirectional pattern is halved and that is suitable for reducing the thickness of the vehicle light fitting in the vertical direction.

Although the example of forming the light emitting device 10E by using the triangular-prism wavelength conversion member 13E in place of the wavelength conversion member 13 included in the light emitting device 10 has been described, the presently disclosed subject matter is not limited to this.

For example, the triangular-prism wavelength conversion member 13E can be used in place of the wavelength conversion member 13 included in the light emitting device 10A to form a light emitting device similar to the light emitting device 10E.

Furthermore, the triangular-prism wavelength conversion member 13E can be used in place of the wavelength conversion member 13B included in the light emitting device 10B to form a light emitting device similar to the light emitting device 10E.

Configuration Example 1 of Vehicle Light Fitting Unit

Next, a configuration example of the vehicle light fitting unit 20 using the light emitting device 10 with the configuration will be described.

Figure 16:
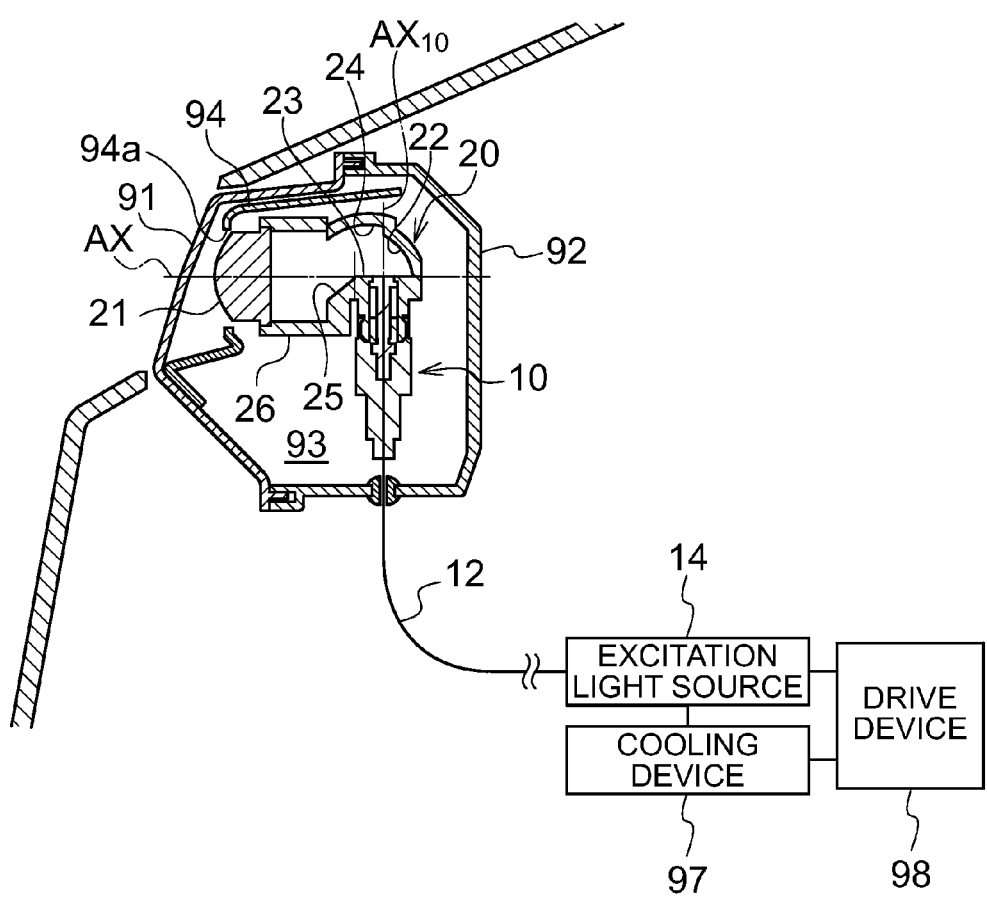
FIG. 16 is a configuration example of a vehicle light fitting unit using the light emitting device.
Figure 17:
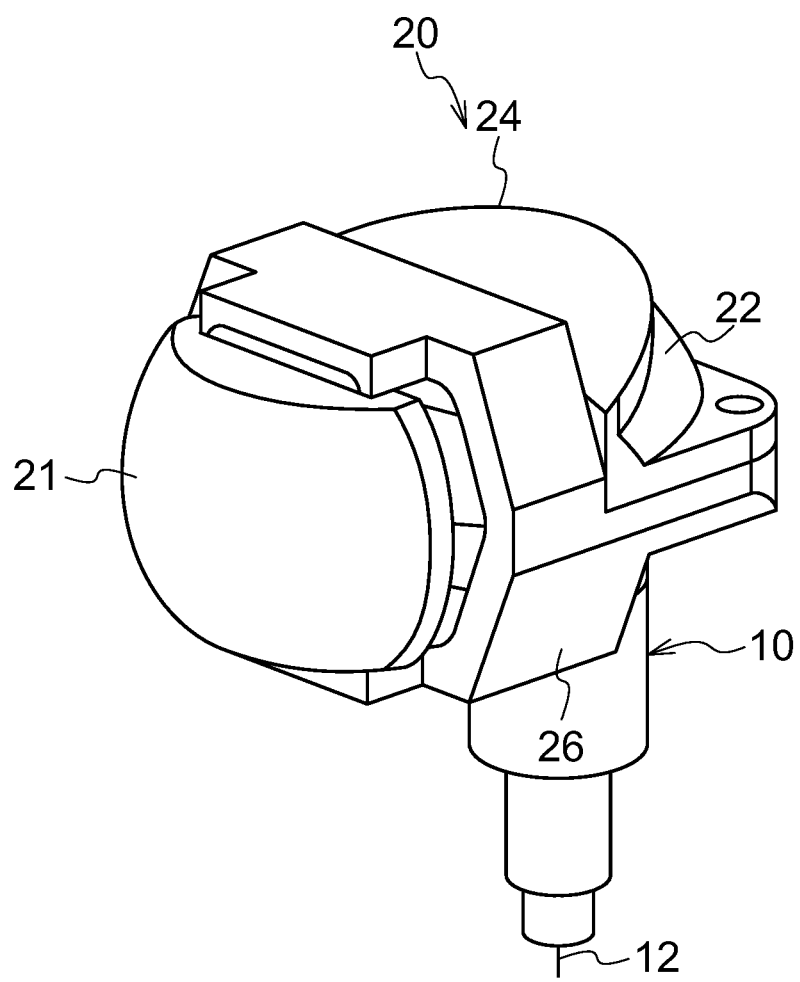
FIG. 17 is a perspective view of the vehicle light fitting unit of FIG. 16.
Figure 18:
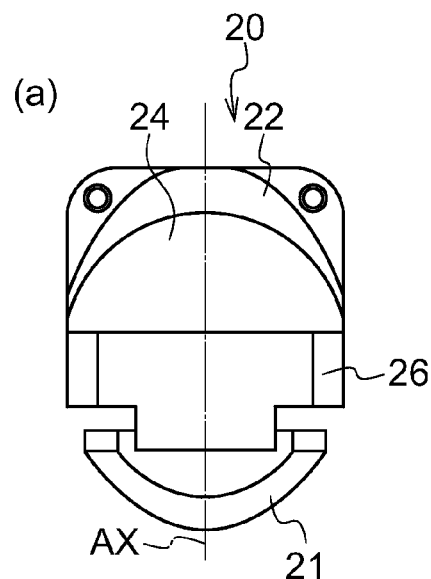
FIG. 18(a) is a top view of the vehicle light fitting unit.
FIG. 18(b) is a front view thereof.
FIG. 18(c) is a side view thereof.
Figure 18:
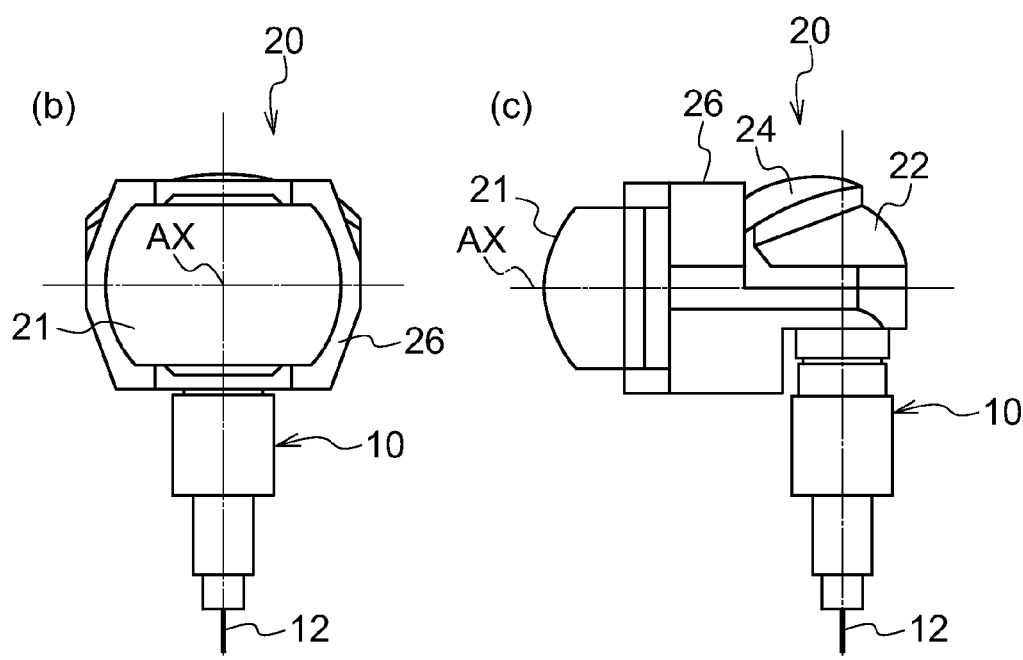

The vehicle light fitting unit 20 of the present embodiment is arranged on left and right sides of the front surface of a vehicle, such as a car, to form headlights for vehicle. FIG. 16 is a configuration example of the vehicle light fitting unit 20 using the light emitting device 10. FIG. 17 is a perspective view of the vehicle light fitting unit 20, (a) portion of FIG. 18 is a top view thereof, (b) portion of FIG. 18 is a front view thereof, and (c) portion of FIG. 18 is a side view thereof.

As illustrated in FIG. 16, the vehicle light fitting unit 20 is arranged in a light room 93 defined by a front surface lens 91 and a housing 92. A known aiming mechanism (not illustrated) is connected to the vehicle light fitting unit 20 to allow adjusting the optical axis of the vehicle light fitting unit 20.

As illustrated in FIGS. 1 and 16 to 18, the vehicle light fitting unit 20 is a projector-type light fitting unit configured to form a light distribution pattern for low beam, and the vehicle light fitting unit 20 includes a projection lens 21, the light emitting device 10, the main reflection surface 22, a shade 23, a first sub reflection surface 24, a second sub reflection surface 25, a mirror shade/holding member 26, and the like. The light emitting devices 10A to 10E or light emitting devices 10F to 10H described later may be used in place of the light emitting device 10.

As illustrated in FIG. 1, a connector 96 is screwed and fixed to the mirror shade/holding member 26 (or the connector 96 is engaged with the mirror shade/holding member 26) to removably fix the ferrule 11 included in the light emitting device 10. For example, a known connector, such as an FC connector and an SC connector of JIS standard, can be used as the connector 96.

As illustrated in FIG. 1, the projection lens 21 is held by the mirror shade/holding member 26 made of metal, such as aluminum, and is arranged on the optical axis AX extending in the front-back direction of the vehicle.

The projection lens 21 is, for example, a projection lens in which the surface closer to the front of the vehicle is a convex surface, and the surface closer to the back of the vehicle is a planar convex aspherical surface. As illustrated in FIG. 16, the projection lens 21 is exposed from an opening 94a formed on an extension 94, and the peripheral edge of the projection lens 21 is covered by the extension 94.

As illustrated in FIG. 1, the light emitting device 10 is fixed to the mirror shade/holding member 26 in a state that the reflection structure 16 of the light emitting device 10 is an upward horizontal plane including the optical axis AX. The optical axis AX passes through the center of the wavelength conversion member 13 (see FIGS. 3 and 4). Therefore, the directional characteristics of the light emitting device 10 indicate a distribution in a half bidirectional pattern in which the intensity in the horizontal plane including the optical axis AX is the largest as illustrated in (b) portion of FIG. 2.

As illustrated in FIG. 1, the main reflection surface 22 is a spheroidal reflection surface (spheroidal surface, free curved surface similar to the spheroidal surface, or the like) in which a first focal point $F1_{22}$ is set near the wavelength conversion member 13, and a second focal point $F2_{22}$ is set near a vehicle backside focal point $F_{21}$ of the projection lens 21.

Figure 19:
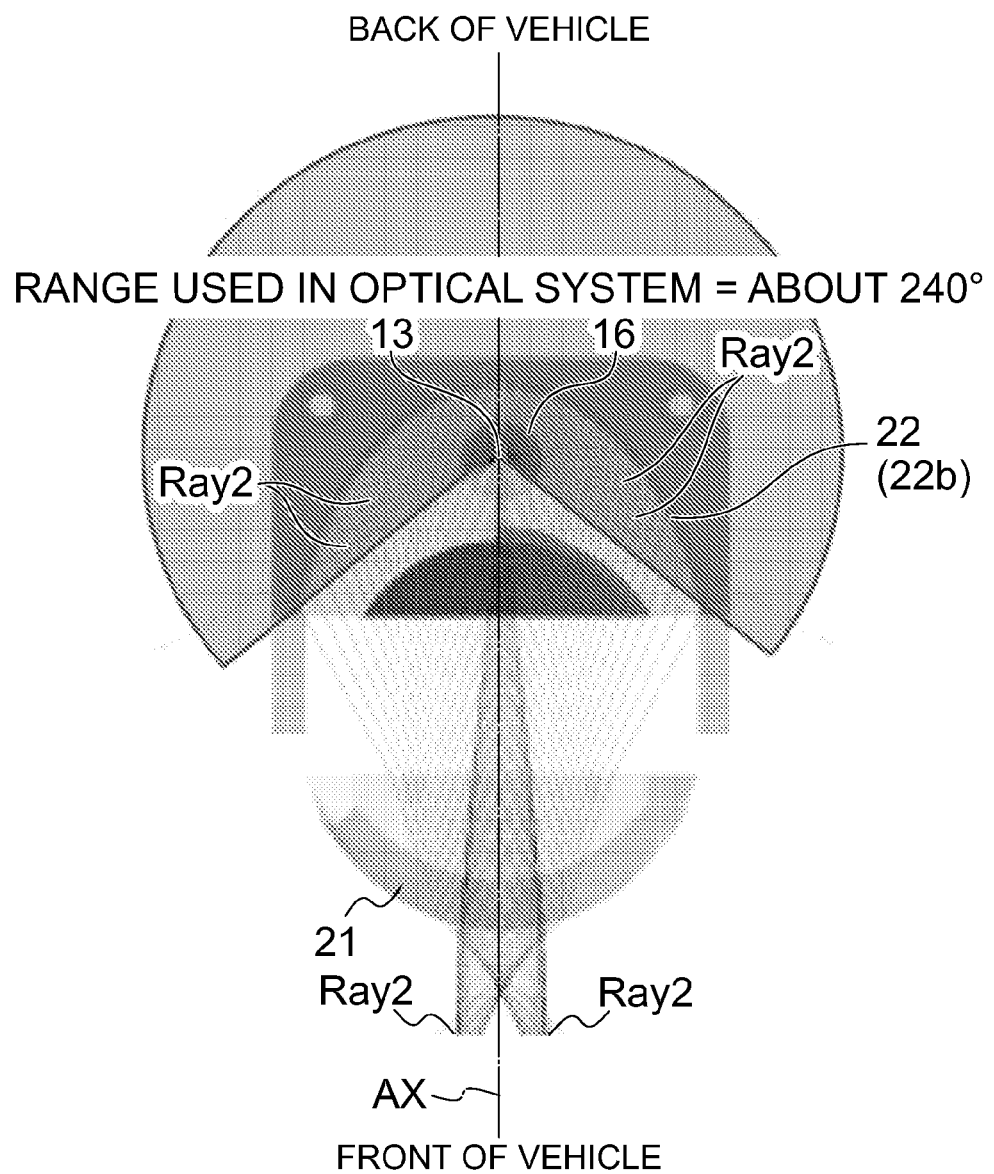
FIG. 19 is a cross-sectional view (including an optical path) in which the vehicle light fitting unit is cut by a horizontal plane including an optical axis AX thereof.
Figure 20:
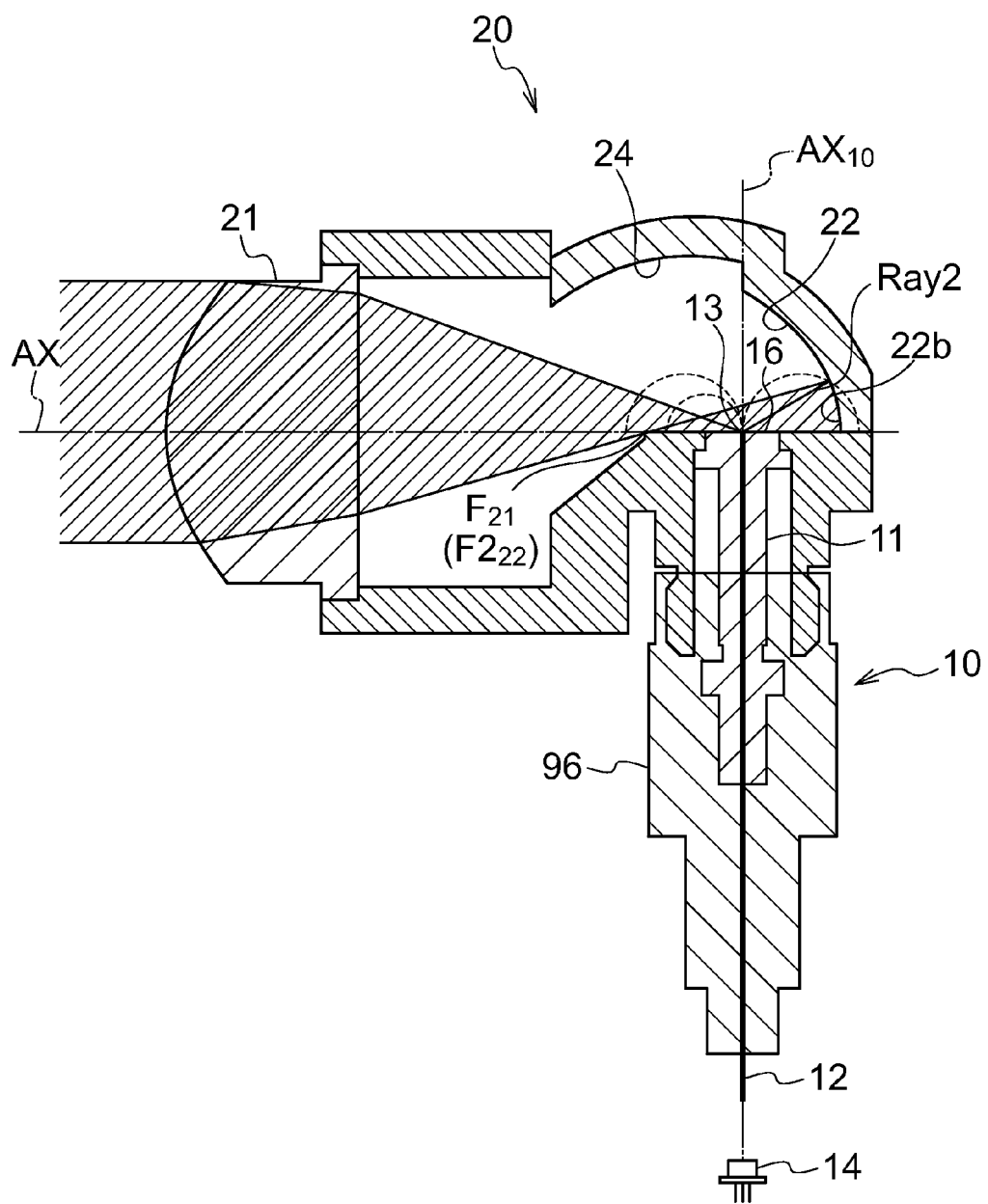
FIG. 20 is a cross-sectional view (including an optical path) in which the vehicle light fitting unit is cut by a vertical plane including the optical axis AX thereof.

FIG. 19 is a cross-sectional view (including the optical path) in which the vehicle light fitting unit 20 is cut by a horizontal plane including the optical axis AX of the vehicle light fitting unit 20. FIG. 20 is a cross-sectional view (including the optical path) in which the vehicle light fitting unit 20 is cut by a vertical plane including the optical axis AX of the vehicle light fitting unit 20.

The main reflection surface 22 covers the wavelength conversion member 13 (peripheral end surface 13c) so as to receive light from the light emitting device 10, such as light with a three-dimensional distribution in which the arc indicated by the solid line in (b) portion of FIG. 2 is rotated 120° around the optical axis $AX_{10}$ to the left and right (240° in total) of the optical axis AX extending backward of the vehicle. Specifically, the main reflection surface 22 extends upward from around the wavelength conversion member 13, such as from a range of 120° to the left and right of the optical axis AX (240° in total) extending backward of the vehicle (see FIG. 19), to cover the wavelength conversion member 13 (peripheral end surface 13c) (see FIG. 1, (a) and (c) portions of FIG. 18, and FIG. 19). A lower edge 22a of the main reflection surface 22 is positioned on the horizontal plane including the optical axis AX (see FIG. 1).

Therefore, the light Ray2 (for example, light inside of a half-value angle in which the rate of the luminous intensity is 50% (half bidirectional pattern)) with relatively high luminous intensity emitted from the peripheral end surface 13c of the wavelength conversion member 13 (range of 120° to the left and right of the optical axis AX (240° in total)) is incident on an area 22b of the main reflection surface 22 near the horizontal plane including the optical axis AX (see FIGS. 19 and 20).

Figure 21:
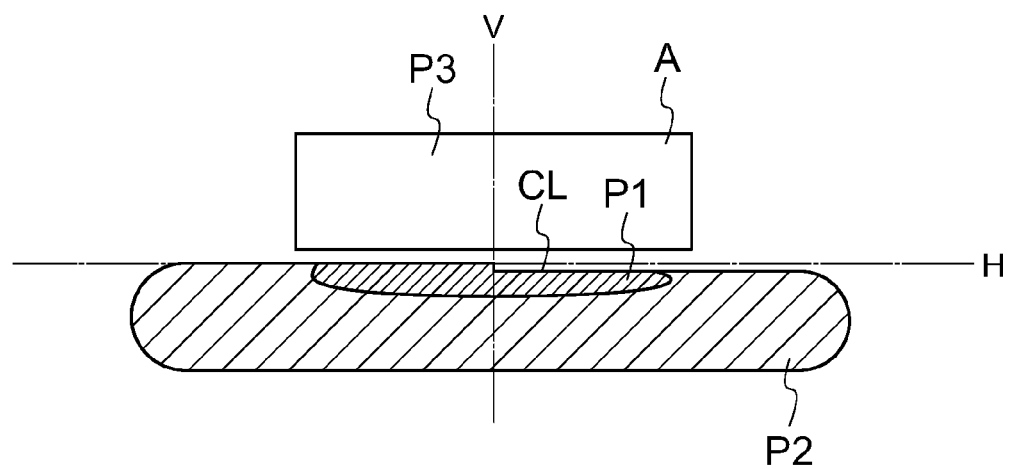
FIG. 21 is an example of light distribution patterns P1 and P2 formed by the vehicle light fitting unit.

Since the main reflection surface 22 (area 22b) is an ellipse in the vertical direction, the reflected light Ray2 with relatively high luminous intensity from the main reflection surface 22 (area 22b) is condensed at the second focal point $F2_{22}$ in the vertical direction and is substantially a parallel ray in the projection lens 21 (see FIG. 20). On the other hand, since the main reflection surface 22 (area 22b) is not an ellipse in the horizontal direction, the reflected light Ray2 with relatively high luminous intensity from the main reflection surface 22 (area 22b) transmitted through the projection lens 21 is once crossed in the horizontal direction and is diffused in the horizontal direction (see FIG. 19). As a result, a partial light distribution pattern P1 with high illuminance (high illuminance zone) that is thin in the vertical direction and that expands in the horizontal direction (longitudinal direction) is formed as illustrated in FIG. 21. FIG. 21 is an example of the partial light distribution pattern P1 formed by the vehicle light fitting unit 20.

The main reflection surface 22 only needs to be arranged around the wavelength conversion member 13, and the range is not limited to the range of 120° to the left and right of the optical axis AX (240° in total). The main reflection surface 22 can be arranged in an appropriate range.

As illustrated in FIG. 1, the shade 23 includes a mirror surface 23a extending from the vehicle backside focal point $F_{21}$ of the projection lens 21 toward the light emitting device 10 (wavelength conversion member 13). The front edge of the shade 23 is concavely curved along the focal plane of the projection lens 21 closer to the back of the vehicle. The light incident on the mirror surface 23a and reflected upward is refracted by the projection lens 21 and directed in the road direction. More specifically, the light incident on the mirror surface 23a is turned back at a cutoff line and superimposed on a light distribution pattern below the cutoff line. As a result, a cutoff line CL is formed at an upper edge of the light distribution pattern P1 for low beam as illustrated in FIG. 21.

The first sub reflection surface 24 is a spheroidal reflection surface (spheroidal surface, free curved surface similar to the spheroidal surface, or the like) in which a first focal point $F1_{24}$ is set near the wavelength conversion member 13, and a second focal point $F2_{24}$ is set at a predetermined position below the second sub reflection surface 25.

The first sub reflection surface 24 extends from near the tip of the main reflection surface 22 toward the projection lens 21 and is arranged between the projection lens 21 and the main reflection surface 22 so as to receive the light (half bidirectional pattern) emitted forward and upward from the light emitting device 10. The first sub reflection surface 24 is set to a length that prevents the tip of the first sub reflection surface 24 from blocking the reflected light from the main reflection surface 22 incident on the projection lens 21.

The main reflection surface 22 and the first sub reflection surface 24 are formed as one component by applying a mirror surface process, such as aluminum deposition, to a reflector base material integrally molded by using a metal mold. As a result, compared to a case of forming the reflection surfaces 22 and 24 as individual components, the number of components can be reduced, the assembly process of the reflection surfaces 22 and 24 can be simplified, and assembly errors of the reflection surfaces 22 and 24 can be reduced. The main reflection surface 22 and the first sub reflection surface 24 may be formed as individual components, without performing the integral molding.

The second sub reflection surface 25 is arranged between the projection lens 21 and the vehicle backside focal point $F_{21}$ of the projection lens 21 so as to receive the light reflected by the first sub reflection surface 24 and condensed at the second focal point $F2_{24}$.

The second sub reflection surface 25 is, for example, a planar mirror and is inclined to the horizontal plane so that a vehicle front side 25a is positioned below a vehicle back side 25b.

According to the vehicle light fitting unit 20 with the configuration, the light Ray2 with relatively high luminous intensity (for example, light in the half-value angle in which the rate of the luminous intensity is 50% (half bidirectional pattern)) of the light emitted from the light emitting device 10 is incident on the area 22b of the main reflection surface 22 near the horizontal plane including the optical axis AX (see FIGS. 19 and 20). Since the main reflection surface 22 (area 22b) is an ellipse in the vertical direction, the reflected light Ray2 with relatively high luminous intensity from the main reflection surface 22 (area 22b) is condensed at the second focal point $F2_{22}$ in the vertical direction and is substantially a parallel ray in the projection lens 21 (see FIG. 20). On the other hand, since the main reflection surface 22 (area 22b) is not an ellipse in the horizontal direction, the reflected light Ray2 with relatively high luminous intensity from the main reflection surface 22 (area 22b) transmitted through the projection lens 21 is once crossed in the horizontal direction and is diffused in the horizontal direction (see FIG. 19). As a result, the partial light distribution pattern P1 with high illuminance (high illuminance zone) that is thin in the vertical direction and that is expanded in the horizontal direction (longitudinal direction) is formed as illustrated in FIG. 21.

On the other hand, the light incident on the main reflection surface 22 other than the area 22b (light with relatively low luminous intensity, such as light outside of the half-value angle in which the rate of the luminous intensity is 50%) of the light emitted from the light emitting device 10 is reflected by the main reflection surface 22 other than the area 22b as described above to form the partial light distribution pattern P2 expanded in the vertical direction and the longitudinal direction on a virtual vertical screen (arranged about 25 m in front of the front surface of the vehicle).

In this way, a combined light distribution pattern with excellent long-distance visibility (light distribution pattern for low beam) including the partial light distribution pattern P1 (high illuminance zone) and the partial light distribution pattern P2 is formed.

The light emitted from the light emitting device 10 and incident on the first sub reflection surface 24 is reflected by the first sub reflection surface 24 and the second sub reflection surface 25, transmitted through the projection lens 21, and directed in a direction at an upward angle relative to the horizontal plane (for example, range of two to four degrees). As a result, as illustrated in FIG. 21, an overhead sign light distribution pattern P3 is formed in an overhead sign area A on the virtual vertical screen (for example, arranged about 25 m in front of the front surface of the vehicle).

A known aiming mechanism (not illustrated) adjusts the optical axis of the vehicle light fitting unit 20 so as to direct the light distribution patterns P1 to P3 to appropriate ranges on the virtual vertical screen.

According to the vehicle light fitting unit 20 of the present embodiment, the light with relatively high luminous intensity emitted from the light emitting device 10 (for example, light in the half-value angle in which the rate of the luminous intensity is 50% (half bidirectional pattern)) is incident on the area 22b of the main reflection surface 22 near the horizontal plane including the optical axis AX, instead of the area on the optical axis $AX_{10}$. This can form a vehicle light fitting unit 20 with a thin vertical dimension.

Next, a reason that the light emitting device 10 is a light emitting device suitable for reducing the thickness of the vehicle light fitting (such as the vehicle light fitting unit 20 of the present embodiment) in the vertical direction will be described in contrast with a vehicle light fitting unit 20'.

Figure 22:
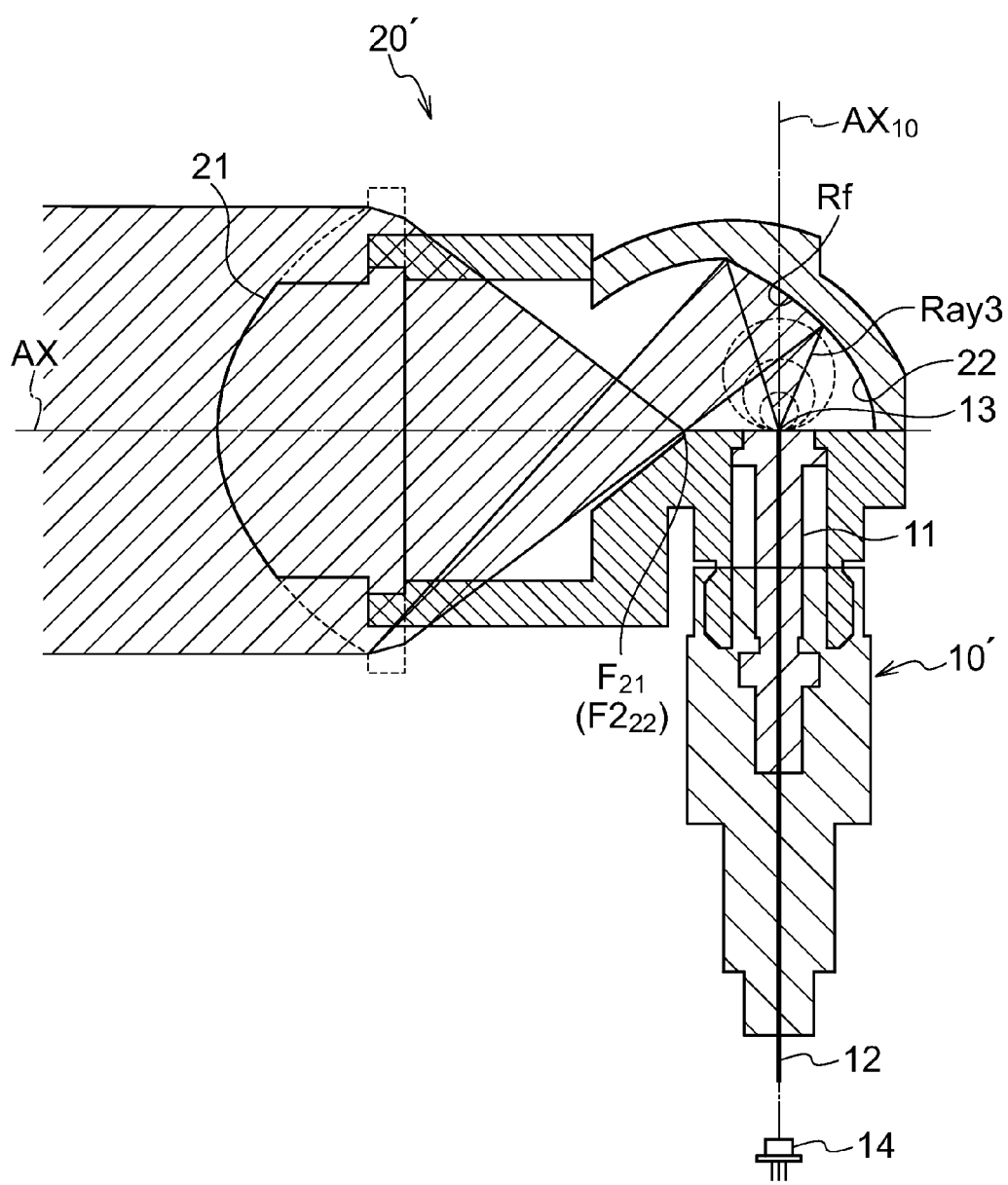
FIG. 22 is a cross-sectional view (including an optical path) in which another exemplary vehicle light fitting unit is cut by a horizontal plane including an optical axis AX of the vehicle light fitting unit.
Figure 23:
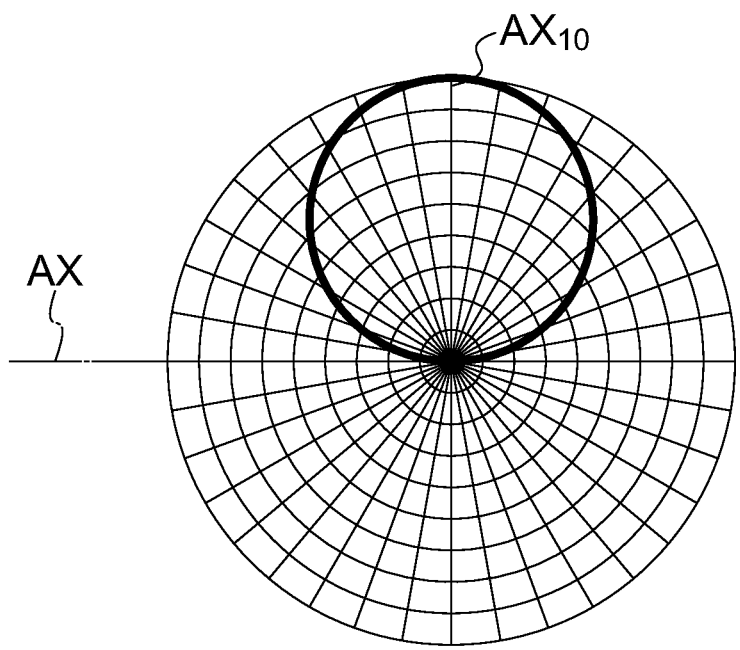
FIG. 23 is an example of directional characteristics (unidirectionality) of a light emitting device of the vehicle light fitting unit of FIG. 22.
Figure 24:
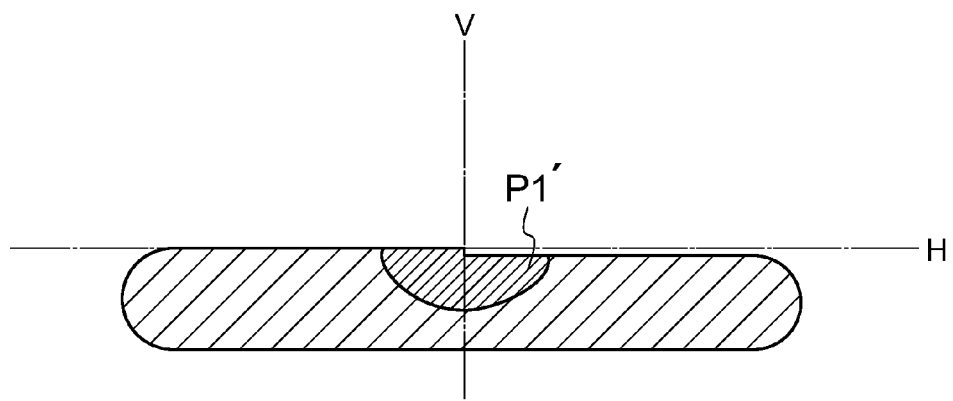
FIG. 24 is an example of a light distribution pattern P1' formed by the vehicle light fitting unit of FIG. 22.

FIG. 22 is a cross-sectional view (including the optical path) in which the vehicle light fitting unit 20' is cut by a horizontal plane including the optical axis AX of the vehicle light fitting unit 20'. FIG. 23 is an example of directional characteristics (unidirectionality) of a light emitting device 10' of the vehicle light fitting unit 20'. FIG. 24 is an example of a light distribution pattern P1' formed by the vehicle light fitting unit 20'.

The vehicle light fitting unit 20' is different from the vehicle light fitting unit 20 in that the light emitting device 10', in which the upper surface 13a of the wavelength conversion member 13 is not covered by the light blocking structure 15, is used in place of the light emitting device 10. Other than that, the configuration is the same as the vehicle light fitting unit 20. Hereinafter, the difference from the vehicle light fitting unit 20 will be mainly described. The same reference numerals are provided to the same components as the vehicle light fitting unit 20, and the description will not be repeated.

Since the upper surface 13a of the wavelength conversion member 13 is not covered by the light blocking structure 15, the light emitting device 10' has directional characteristics in which the intensity on the optical axis $AX_{10}$ is the largest, and the light in the horizontal plane including the optical axis AX is reduced (unidirectionality) as in a general LED or LD, as illustrated in FIG. 23.

As illustrated in FIG. 22, light with relatively high luminous intensity emitted from the light emitting device 10' (for example, light inside of the half-value angle in which the rate of the luminous intensity is 50%) is incident on an area Rf of the main reflection surface 22 on the optical axis $AX_{10}$.

An incident angle of light Ray3 with relatively high luminous intensity reflected in the area Rf on the optical axis $AX_{10}$ relative to the vehicle backside focal point $F_{21}$ of the projection lens 21 is relatively acute. Therefore, the reflected light with relatively high luminous intensity from the main reflection surface 22 cannot be sufficiently condensed near the horizontal line, and a light distribution pattern P1' with low illuminance that is thick in the vertical direction and that is not expanded to the left and right is formed (see FIG. 24).

In the vehicle light fitting unit 20' with the configuration, the reflected light with relatively high luminous intensity from the main reflection surface 22 can be condensed near the vehicle backside focal point $F_{21}$ of the projection lens 21 to form a light distribution pattern with high illuminance. However, as a result, the incident angle of the reflected light from the main reflection surface 22 relative to the vehicle backside focal point $F_{21}$ of the projection lens 21 is acute, and there is a problem that the dimension of the projection lens 21 in the vertical direction becomes large (resulting in an increase in the dimension of the vehicle light fitting unit 20' in the vertical direction).

On the other hand, the directional characteristics of the light emitting device 10 indicate a distribution in a half bidirectional pattern in which the intensity in the horizontal plane including the optical axis AX is the largest as illustrated in (b) portion of FIG. 2, by the operation of the light blocking structure 15 that covers the upper surface 13a of the wavelength conversion member 13 and the reflection structure 16 arranged around the lower surface 13b of the wavelength conversion member 13. Therefore, the light Ray2 with relatively high luminous intensity emitted from the light emitting device 10 (for example, light in the half-value angle in which the rate of the luminous intensity is 50% (half bidirectional pattern)) is incident on the area 22b of the main reflection surface 22 near the horizontal plane including the optical axis AX instead of the area Rf on the optical axis $AX_{10}$ (see FIGS. 19 and 20).

The incident angle of the light Ray2 with relatively high luminous intensity reflected by the main reflection surface 22 (area 22b) relative to the vehicle backside focal point $F_{21}$ of the projection lens 21 is relatively obtuse (see FIG. 20).

Therefore, even if the dimension of the projection lens 21 in the vertical direction is reduced in the vehicle light fitting unit 20 (even if this results in a reduction in the thickness of the vehicle light fitting unit 20 in the vertical direction), the reflected light with relatively high luminous intensity from the main reflection surface 22 (area 22*b*) can be sufficiently condensed near the horizontal line, and the partial light distribution pattern P1 with high illuminance (high illuminance zone) that is thin in the vertical direction and that is expanded in the horizontal direction (longitudinal direction) can be formed (see FIG. 21).

In FIG. 20, upper and lower ends in which the reflected light with relatively high luminous intensity from the main reflection surface 22 (area 22*b*) is not transmitted are cut from the projection lens 21 to reduce the dimension of the projection lens 21 in the vertical direction (as a result, the thickness of the vehicle light fitting unit 20 in the vertical direction is reduced). In this way, since the upper and lower ends of the projection lens 21 are not used (are cut), the dimension of the vehicle light fitting unit 20 in the vertical direction can be miniaturized compared to the vehicle light fitting unit 20'. Furthermore, the chromatic aberration of the projection lens 21 generated at the end portion of the shade 23 arranged near the focal point $F_{21}$ of the projection lens 21 can be reduced.

According to the vehicle light fitting unit 20 of the present embodiment, the following effects are further attained.

First, since the vehicle light fitting unit 20 and the excitation light source 14 are separated (see FIG. 16), the excitation light source 14 can be installed at a location in the vehicle or vehicle interior where the ambient temperature is stable. Therefore, the degree of freedom in the installation location of the excitation light source 14 is increased.

Second, since the vehicle light fitting unit 20 and the excitation light source 14 (as well as a cooling device 97, such as a heat sink, and a drive device 98, such as an ECU) are separated (see FIG. 16), the weight of the vehicle light fitting unit 20 can be reduced, and the aiming mechanism and the like can be simplified compared to when the excitation light source 14 and the like are arranged inside of the vehicle light fitting unit 20.

Third, since the weight of the vehicle light fitting unit 20 can be reduced as described above, a weight load on the aiming mechanism can be reduced when a known aiming mechanism is connected to the vehicle light fitting unit 20. This can reduce various failures caused by the weight load on the aiming mechanism. Furthermore, miniaturization and power saving of an actuator that forms the aiming mechanism can also be expected. There can be one or a plurality of vehicle light fitting units 20 to form the entire low beam.

Although the example of forming the vehicle light fitting unit 20 by using the light emitting device 10 has been described, the light emitting devices 10A to 10E or the light emitting devices 10F to 10H described later can be used in place of the light emitting device 10 to form, like the vehicle light fitting unit 20, a vehicle light fitting unit that has a thin vertical dimension and that can form a partial light distribution pattern with high illuminance (high illuminance zone) which is thin in the vertical direction and expanded in the horizontal direction.

[Light Emitting Device 10F]

Conventionally, proposed is a light emitting device using a wavelength conversion member that absorbs excitation light transmitted through a light guide, such as an optical fiber, to convert the wavelength to emit light in a predetermined wavelength region (for example, see Japanese Patent No. 4379531).

FIG. 37 is an example of a conventional light emitting device 300 using a wavelength conversion member that absorbs excitation light transmitted through a light guide, such as an optical fiber, to convert the wavelength to emit light in a predetermined wavelength region.

As illustrated in FIG. 37, the light emitting device 300 includes: a light guide 310 such as an optical fiber for transmitting excitation light emitted from an excitation light source; a wavelength conversion member 320 with reflection films 321 and 322 arranged on the end surface of the light guide 310; and the like.

In the light emitting device 300 with the configuration, the wavelength conversion member 320 absorbs the excitation light emitted from the end surface of the light guide 310 to convert the wavelength to emit light in a predetermined wavelength region.

However, the light emitting device 300 with the configuration is a light emitting device for endoscope, and application of this to a vehicle light fitting as well as a light emitting device with a structure of removably fixing the light guide to the vehicle light fitting are not proposed at all.

Hereinafter, a light emitting device 10F with a structure of removably fixing a light guide to a vehicle light fitting will be described as a modified example of the light emitting device 10.

Figure 25:
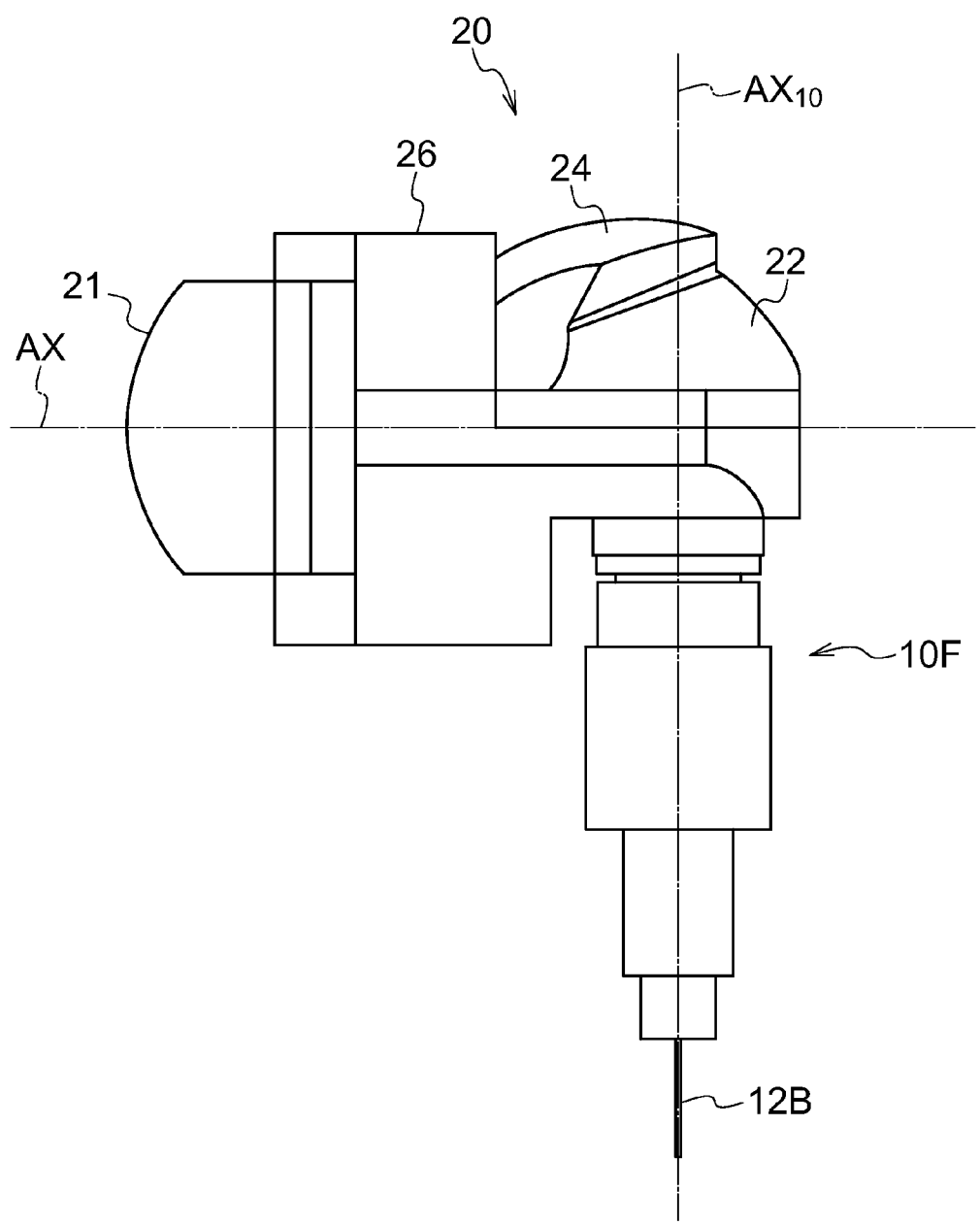
FIG. 25 is a side view of the vehicle light fitting unit using another exemplary light emitting device.
Figure 26:
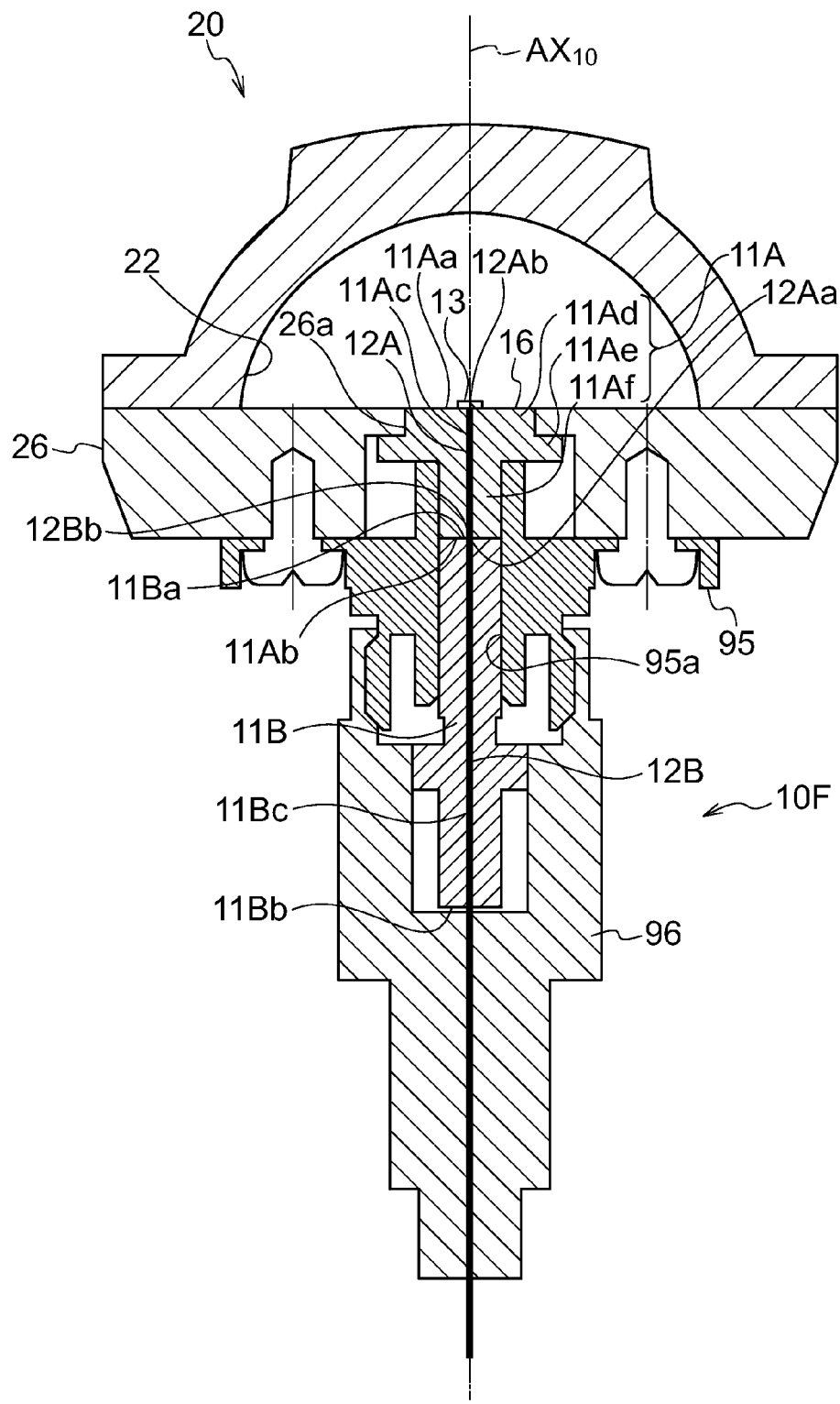
FIG. 26 is a cross-sectional view in which the vehicle light fitting unit using the light emitting device of FIG. 25 is cut by a vertical plane including an optical axis $AX_{10}$.

FIG. 25 is a side view of the vehicle light fitting unit 20 using the light emitting device 10F. FIG. 26 is a cross-sectional view in which the vehicle light fitting unit 20 using the light emitting device 10F is cut by a vertical plane including the optical axis $AX_{10}$.

The light emitting device 10F is different from the light emitting device 10 in that a stub 11A with flange and a ferrule 11B are used in place of the ferrule 11, and a first light guide 12A and a second light guide 12B are used in place of the light guide 12. Other than that, the configuration is the same as the light emitting device 10. Hereinafter, the difference from the light emitting device 10 will be mainly described. The same reference numerals are provided to the same components as the light emitting device 10, and the description will not be repeated.

As illustrated in FIGS. 25 and 26, the light emitting device 10F includes the stub 11A with flange, the ferrule 11B, the first light guide 12A, the second light guide 12B, and the like.

The stub 11A with flange is a member for holding the first light guide 12A and the wavelength conversion member 13 and is provided with a through hole 11Ac for light guide that links the center of an upper surface 11Aa and the center of a lower surface 11Ab. The first light guide 12A is inserted to the through hole 11Ac for light guide and held by the stub 11A.

The stub 11A with flange includes an upper stub 11Ad, a lower stub 11Af, and a flange 11Ae between the upper stub 11Ad and the lower stub 11Af.

The upper stub 11Ad is inserted to an opening 26*a* of the mirror shade/holding member 26 formed on the optical axis $AX_{10}$ until the flange 11Ae comes into contact with the mirror shade/holding member 26, and the upper stub 11Ad is fitted together with the mirror shade/holding member 26. The lower stub 11Af is inserted to one side of a sleeve 95*a* of an adapter 95 until the flange 11Ae comes into contact with the adapter 95, and the lower stub 11Af is fitted together with the adapter 95.

The adapter 95 is screwed and fixed to the mirror shade/holding member 26 to fix the fitted stub 11A with flange to the vehicle light fitting unit 20. As a result, the light emitting device 10 and the vehicle light fitting unit 20 can be accurately assembled.

The upper surface 11Aa of the stub 11A with flange is polished, and as a result, a first light emission surface 12Ab of the first light guide 12A and the upper surface 11Aa of the stub 11A with flange are in the same plane. Similarly, the lower surface 11Ab of the stub 11A with flange is polished, and as a result, a first light entering surface 12Aa of the first light guide 12A and the lower surface 11Ab of the stub 11A with flange are in the same plane.

The stub 11A with flange only needs to be able to hold the first light guide 12A, and the material is not particularly limited. For example, the stub 11A with flange may be made of stainless steel, nickel, or zirconia, or may be made of other metal, resin, or glass.

Figure 27:
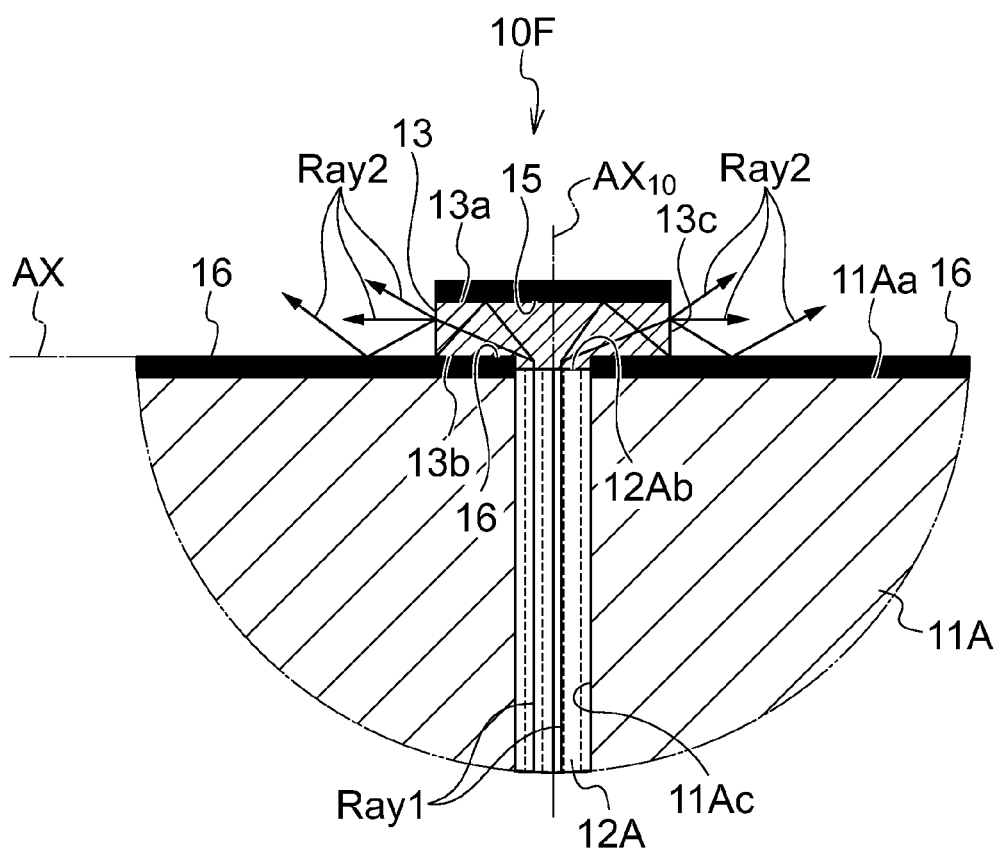
FIG. 27 is an enlarged view in which a circumference of a wavelength conversion member of the light emitting device of FIG. 25 is enlarged.
Figure 28:
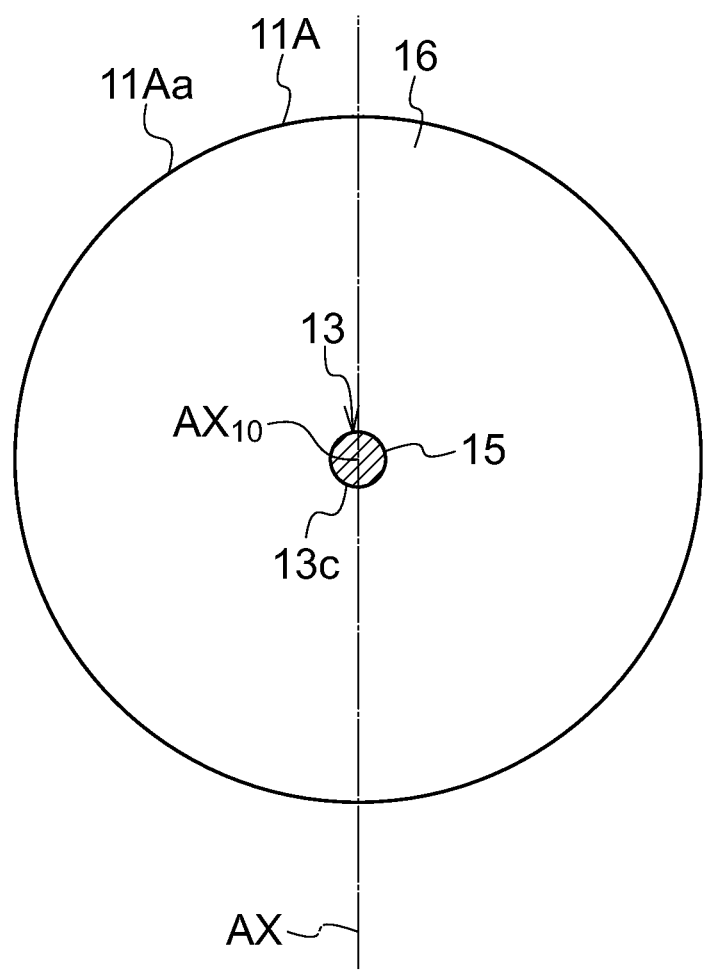
FIG. 28 is a top view of a stub with flange.

The upper surface 11Aa of the stub 11A with flange is, for example, round and is covered by the reflection structure 16 as illustrated in FIGS. 27 and 28. The reflection structure 16 only needs to be able to reflect light emitted by the wavelength conversion member 13 toward the wavelength conversion member 13, and for example, the reflection structure 16 may be a reflection layer (or a reflection surface) formed by applying metal deposition of aluminum, silver, or the like to the upper surface 11Aa of the stub 11A or may be a reflection layer (dielectric film) formed by plating the upper surface 11Aa of the stub 11A if the stub 11A is conductive. For example, a method described in Japanese Patent Laid-Open No. 2007-121502 can be used as a method of forming the reflection layer (or the reflection surface) on the upper surface 11Aa of the stub 11A. Alternatively, the reflection structure 16 may be a thin plate-like reflection member adhered to the upper surface 11Aa of the stub 11A (area of the upper surface 11Aa other than the first light emission surface 12Ab of the first light guide 12A) or may be a reflection surface formed by applying mirror surface polishing to the upper surface 11Aa of the stub 11A if the stub 11A is metallic.

It is desirable that the diameter of the stub 11A be greater than the diameter of the ferrule 11B. In this way, the reflection structure 16 that reflects the light emitted from the peripheral end surface 13c of the wavelength conversion member 13 can be arranged on the end surface (upper surface 11Aa) of the stub 11A with the diameter greater than the end surface of the ferrule 11B. More specifically, the area of the reflection structure 16 can be wider than when the reflection structure 16 is arranged on the end surface of the ferrule 11B, and this increases the light reflected and turned back by the reflection structure 16 to proceed upward. Therefore, the efficiency of the light emitting device 10F can be further improved.

The ferrule 11B is a member for holding the second light guide 12B and is provided with a through hole 11Bc for light guide that links the center of an upper surface 11Ba and the center of a lower surface 11Bb. The second light guide 12B is inserted to the through hole 11Bc for light guide and held by the ferrule 11B.

The tip portion of the ferrule 11B is inserted to the other end of the sleeve 95a of the adapter 95 until the upper surface 11Ba (second light emission surface 12Bb of the second light guide 12B) hits the lower surface 11Ab of the stub 11A with flange (first light entering surface 12Aa of the first light guide 12A), and the tip portion of the ferrule 11B is fitted together with the adapter 95. In this way, the first light entering surface 12Aa of the first light guide 12A and the second light emission surface 12Bb of the second light guide 12B are arranged on the same axis to face each other and come into contact with each other. It is desirable that the adapter 95 be able to accurately connect the stub 11A and the ferrule 11B based on the sleeve structure, wherein the connection loss is small, and the insertion-extraction reproducibility is excellent.

The stub 11A and the ferrule 11B are removably fixed by screwing and fixing the connector 96 to the adapter 95 (or by engaging the connector 96 with the adapter 95) in a state that the first light entering surface 12Aa of the first light guide 12A and the second light emission surface 12Bb of the second light guide 12B face each other as described above. A known connector, such as an FC connector and an SC connector of JIS standard, can be used as the connector 96.

The upper surface 11Ba of the ferrule 11B is polished, and as a result, the second light emission surface 12Bb of the second light guide 12B and the upper surface 11Ba of the ferrule 11B are in the same plane.

The ferrule 11B only needs to be able to hold the second light guide 12B, and the material is not particularly limited. For example, the ferrule 11B may be made of stainless steel, nickel, or zirconia, or may be made of other metal or resin.

The first light guide 12A is a light guide member that includes the first light entering surface 12Aa and the first light emission surface 12Ab and that guides (or propagates) the excitation light guided inside from the first light entering surface 12Aa to the first light emission surface 12Ab to emit the light from the first light emission surface 12Ab. The first light guide 12A is, for example, an optical fiber including a core at the center (for example, core diameter: 0.25 mm) and a clad covering around the core (they are not illustrated).

The second light guide 12B is a light guide member that includes the second light entering surface 12Ba and the second light emission surface 12Bb and that guides (or propagates) the excitation light guided inside from the second light entering surface 12Ba to the second light emission surface 12Bb to emit the light from the second light emission surface 12Bb. The second light guide 12B is, for example, an optical fiber including a core at the center (for example, core diameter: 0.2 mm) and a clad covering around the core (they are not illustrated).

The first light guides 12A and 12B only need to be able to guide the excitation light from the excitation light source 14, and the first light guides 12A and 12B may be single-line fibers or multiple-line fibers. The first light guides 12A and 12B may be single-mode fibers or multiple-mode fibers. The material of the first light guides 12A and 12B is not particularly limited. For example, the first light guides 12A and 12B may be made of quartz glass or may be made of plastic. Single-line fibers and multiple-mode fibers can be used.

The diameter (core diameter) of the first light guide 12A and the diameter (core diameter) of the second light guide 12B may be the same or may be different.

It is desirable that the diameter (core diameter) of the first light guide 12A be greater than the diameter (core diameter) of the second light guide 12B. In this way, if the area of the first light entering surface 12Aa of the first light guide 12A is greater than the area of the second light emission surface 12Bb of the second light guide 12B, the excitation light from the second light guide 12B can be guided (propagated) to the second light guide 12A without a loss even if the first light guide 12A and the second light guide 12B are a little dislocated from the same axis due to, for example, manufacturing (for example, dimension errors of the first light guides 12A and 12B, the sleeve 95a of the adapter 95, and the like). Therefore, Wiggle errors in manufacturing can be absorbed.

As illustrated in FIG. 27, the lower surface 13b of the wavelength conversion member 13 is adhered to an area around the through hole 11Ac for light guide on the upper surface 11Aa (reflection structure 16) of the stub 11A with flange to cover the through hole 11Ac for light guide (first light emission surface 12Ab of the first light guide 12A).

FIG. 28 is a top view of the stub 11A with flange. As illustrated in FIG. 28, the wavelength conversion member 13 is arranged at the center of the upper surface 11Aa of the stub 11A with flange. As illustrated in FIG. 27, the center of the lower surface 13b of the wavelength conversion member 13 coincides with the center of the through hole 11Ac for light guide (center of the first light emission surface 12Ab of the first light guide 12A). Therefore, the lower surface 13b of the wavelength conversion member 13 is covered by the reflection structure 16 except for the area where the through hole 11Ac for light guide (first light emission surface 12Ab of the first light guide 12A) faces the lower surface 13b (see FIG. 27). Therefore, the light to be emitted from the lower surface 13b of the wavelength conversion member 13 of the light emitted by the wavelength conversion member 13 is reflected by the reflection structure 16 and returned toward the wavelength conversion member 13. This improves the extraction efficiency of light.

The first light emission surface 12Ab of the first light guide 12A is in the same plane as the upper surface 11Aa of the stub 11A with flange. Therefore, the lower surface 13b of the wavelength conversion member 13 and the first light emission surface 12Ab of the first light guide 12A are closely attached. A little gap may exist between the lower surface 13b of the wavelength conversion member 13 and the first light emission surface 12Ab of the first light guide 12A. The wavelength conversion members 13B to 13E may be used in place of the wavelength conversion member 13.

According to the light emitting device 10F with the configuration, the excitation light from the excitation light source 14 is guided from the second light entering surface 12Ba of the second light guide 12B into the second light guide 12B and guided to the second light emission surface 12Bb to be emitted from the second light emission surface 12Bb. The light is further guided from the first light entering surface 12Aa of the first light guide 12A into the first light guide 12A and guided to the first light emission surface 12Ab to be emitted from the first light emission surface 12Ab to irradiate the wavelength conversion member 13.

The wavelength conversion member 13 that has received the excitation light from the excitation light source 14 emits the white light Ray2 based on a mixed color of the light excited by the excitation light from the excitation light source 14 and the excitation light from the excitation light source 14 transmitted through the wavelength conversion member 13.

The white light Ray2 emitted by the wavelength conversion member 13 is reflected by the light blocking structure 15 and/or the reflection structure 16 (or directly, without being reflected by the light blocking structure 15 or the reflection structure 16) and emitted from the whole circumference of the peripheral end surface 13c of the wavelength conversion member 13.

Since the upper surface 13a of the wavelength conversion member 13 is covered by the light blocking structure 15, the directional characteristics of the wavelength conversion member 13 in the cross section cut by the vertical plane including the optical axis $AX_{10}$ (central axis of the through hole 11c for light guide) indicate a vertically symmetric bidirectional distribution (intensity in the horizontal plane including the optical axis AX is the largest) as illustrated by the solid line in FIG. 5.

Meanwhile, since the peripheral end surface 13c of the wavelength conversion member 13 is a ring-shaped surface, the directional characteristics viewed from the upper surface 13a of the wavelength conversion member 13 indicate a distribution spread in a radial fashion around the wavelength conversion member 13 as illustrated by the alternate long and two short dashes line in FIG. 5.

The white light Ray2 emitted downward from the whole circumference of the peripheral end surface 13c of the wavelength conversion member 13 is reflected and turned back by the reflection structure 16 arranged around the lower surface 13b of the wavelength conversion member 13, and the white light Ray2 is directed upward (see FIG. 27).

As a result, the directional characteristics of the light emitting device 10F in a cross section cut by a vertical plane including the optical axis $AX_{10}$ indicate a distribution in a half bidirectional pattern including an upper half of the bidirectional pattern (intensity in the horizontal plane including the optical axis AX is the largest) as illustrated by the solid line in (b) portion of FIG. 2.

Meanwhile, since the peripheral end surface 13c of the wavelength conversion member 13 is a ring-shaped surface, the directional characteristics viewed from the upper surface of the light emitting device 10F indicate a distribution spread in a radial fashion around the wavelength conversion member 13 as illustrated by the alternate long and two short dashes line in (b) portion of FIG. 2.

As described, the directional characteristics of the light emitting device 10F indicate a three-dimensional distribution substantially coinciding with a three-dimensional distribution in which the arc indicated by the solid line in (b) portion of FIG. 2 is rotated 360° around the optical axis $AX_{10}$, that is, a distribution in a light distribution pattern in which the intensity in the horizontal plane including the optical axis AX is the largest, and the intensity decreases with an increase in the distance from the horizontal plane (for example, light distribution pattern for low beam).

As described, according to the light emitting device 10F of the present modified example, the operation of the stub 11A holding the first light guide 12A and the wavelength conversion member 13 and the operation of the ferrule 12B and the connector 96 holding the second light guide 12B can form a light emitting device 10F that can removably fix the second light guide 12B (ferrule 11B holding the second light guide 12B) to the attachment partner, such as the vehicle light fitting unit 20.

According to the light emitting device 10F of the present modified example, the light with a bidirectional distribution emitted from the peripheral end surface 13c of the wavelength conversion member 13 is reflected by the operation of the light blocking structure 15 and the reflection structure 16 arranged around the lower surface 13b of the wavelength conversion member 13. This can form a light emitting device 10F that emits light with a distribution in a half bidirectional pattern (one-half bidirectional pattern) in which the bidirectional pattern is halved and that is suitable for reducing the thickness of the vehicle light fitting in the vertical direction.

Although the example of forming the light emitting device 10F by using the wavelength conversion member 13 has been described, the wavelength conversion members 13B to 13E can be used in place of the wavelength conversion member 13 to form a light emitting device with a light guide mounting structure for removably mounting the light guide, like the light emitting device 10F.

According to the light emitting device 10F with the configuration, the following effects can be further attained.

First, since the stub 11A and the ferrule 11B are separated to form individual components, the stub 11A and the ferrule 11B can be manufactured in individual processes. Therefore, the light guide 12 is not an obstacle in the process of attaching the wavelength conversion member 13, and the assembly is easy.

Second, since the stub 11A and the ferrule 11B are separated to form individual components, exchange of only one of the stub 11A and the ferrule 11B is possible.

Third, since the stub 11A and the ferrule 11B are combined by the sleeve structure of the adapter 95, the light emitting device 10F and the vehicle light fitting unit 20 can be accurately combined.

Fourth, the reflection structure 16 for reflecting the light emitted from the wavelength conversion member 13 can be arranged on the end surface (upper surface 11Aa) of the stub 11A with a greater diameter than the end surface of the ferrule 11B. Therefore, the area of the reflection structure 16 can be wider than when the reflection structure 16 is arranged on the end surface of the ferrule 11B, and this increases the light reflected and turned back by the reflection structure 16 to proceed upward. Therefore, the efficiency of the light emitting device 10F can be further improved.

Fifth, degradation caused by heat generation of the wavelength conversion member 13 can be suppressed. More specifically, the stub 11A can be formed by metal or the like to efficiently release the generated heat of the wavelength conversion member 13, and this can suppress thermal degradation of the wavelength conversion member 13.

Configuration Example 2 of Vehicle Light Fitting Unit

Next, a configuration example of a vehicle light fitting unit 30 using the light emitting device 10 with the configuration described above will be described.

Figure 29:
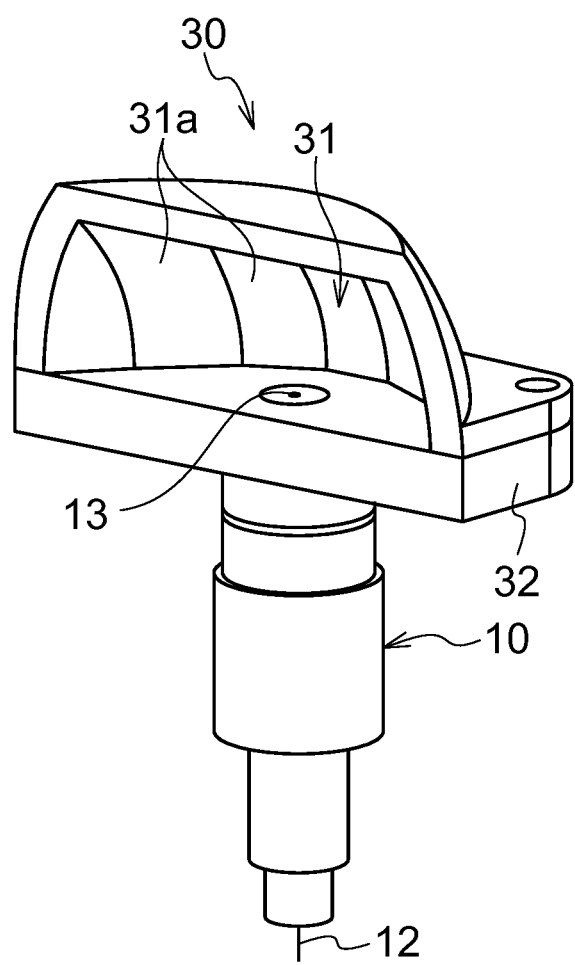
FIG. 29 is a perspective view of a vehicle light fitting unit.
Figure 30:
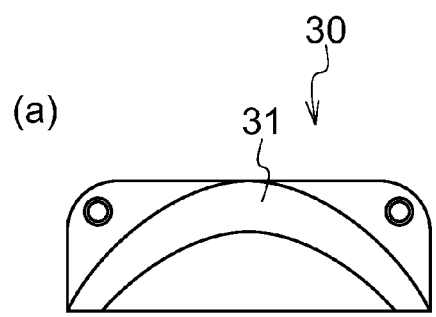
FIG. 30(a) is a top view of an exemplary vehicle light fitting unit.
FIG. 30(b) is a front view thereof.
FIG. 30(c) is a side view thereof.
Figure 30:
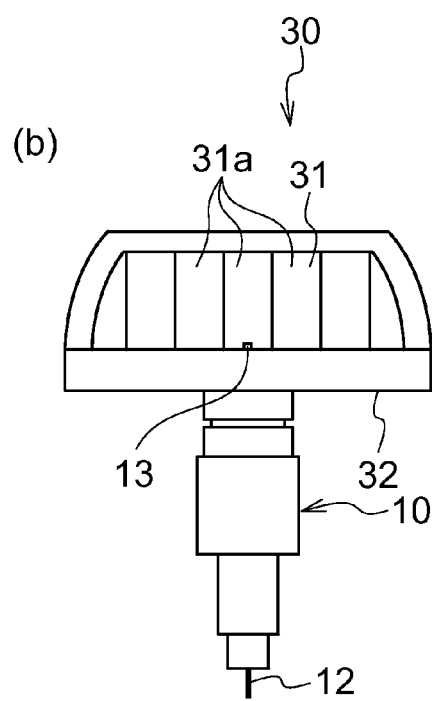
Figure 30:
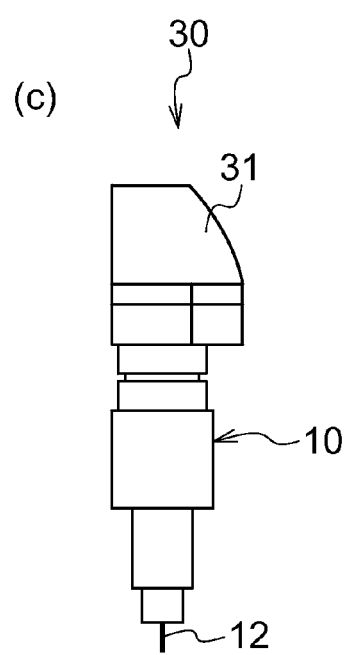
Figure 31:
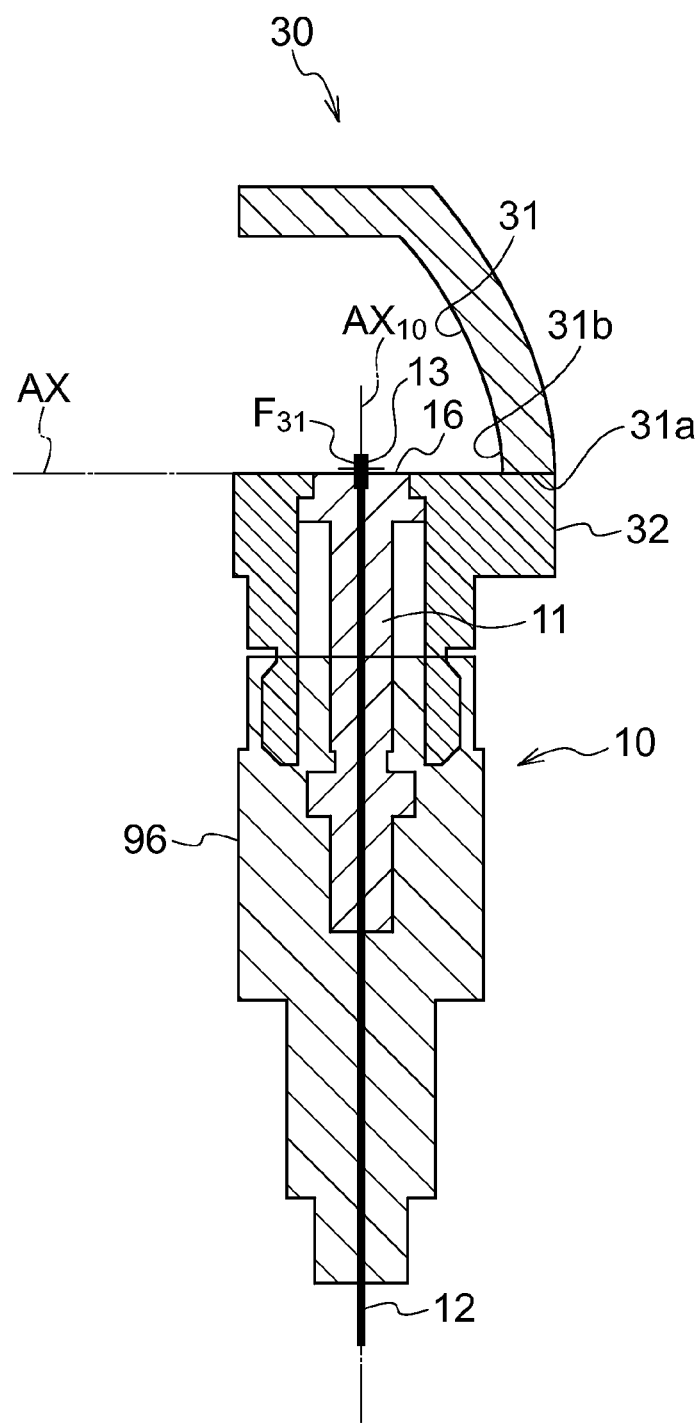
FIG. 31 is a cross-sectional view in which the vehicle light fitting unit of FIG. 29 is cut by a vertical plane including an optical axis AX of the vehicle light fitting unit.
Figure 32:
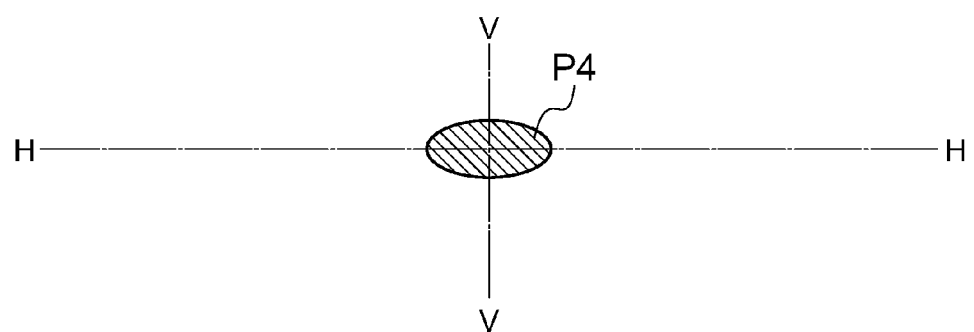
FIG. 32 is an example of a light distribution pattern P4 formed by the vehicle light fitting unit of FIG. 29.

The vehicle light fitting unit 30 of the present embodiment is arranged on left and right sides of the front surface of a vehicle, such as a car, to form headlights for vehicle. FIG. 29 is a perspective view of the vehicle light fitting unit 30, (a) portion of FIG. 30 is a top view thereof, (b) portion of FIG. 30 is a front view thereof, and (c) portion of FIG. 30 is a side view thereof. FIG. 31 is a cross-sectional view in which the vehicle light fitting unit 30 is cut by the vertical plane including the optical axis AX of the vehicle light fitting unit 30. FIG. 32 is an example of a light distribution pattern P4 formed by the vehicle light fitting unit 30.

A known aiming mechanism (not illustrated) is connected to the vehicle light fitting unit 30 to allow adjusting the optical axis of the vehicle light fitting unit 30.

As illustrated in FIGS. 29 to 31, the vehicle light fitting unit 30 is a reflector-type light fitting unit configured to form a light distribution pattern for high beam, and the vehicle light fitting unit 30 includes a reflection surface 31, the light emitting device 10, a holding member 32, and the like. The light emitting devices 10A to 10F or the light emitting devices 10G and 10H described later may be used in place of the light emitting device 10.

As illustrated in FIG. 31, the light emitting device 10 is fixed to the holding member 32 in a state that the reflection structure 16 of the light emitting device 10 is an upward horizontal plane including the optical axis AX. The optical axis AX passes through the center of the wavelength conversion member 13. Therefore, the directional characteristics of the light emitting device 10 indicate a distribution in a half bidirectional pattern in which the intensity in the horizontal plane including the optical axis AX is the largest as illustrated in (b) portion of FIG. 2.

As illustrated in FIG. 31, the reflection surface 31 is a parabolic reflection surface (rotational parabolic surface, free curved surface similar to the rotational parabolic surface, or the like) with the optical axis AX (rotation axis) extending in the front-back direction of the vehicle, in which a focal point $F_{31}$ is set near the wavelength conversion member 13 of the light emitting device 10. As illustrated in FIG. 29 and (b) portion of FIG. 30, the reflection surface 31 includes a plurality of small division reflection surfaces 31b. The reflection surface 31 (each small division reflection surface 31b) is designed to reflect (distribute) the light entered from the light emitting device 10 in a predetermined direction to form a light distribution pattern P4 for high beam illustrated in FIG. 32 on the virtual vertical screen facing the front surface of the vehicle (for example, arranged about 25 m in front of the vehicle).

The reflection surface 31 covers around the wavelength conversion member 13 (peripheral end surface 13c) so as to receive light from the light emitting device 10, such as light with a three-dimensional distribution in which the arc indicated by the solid line in (b) portion of FIG. 2 is rotated 120° around the optical axis $AX_{10}$ to the left and right (240° in total) of the optical axis AX extending backward of the vehicle around the optical axis $AX_{10}$. Specifically, the reflection surface 31 extends upward from around the wavelength conversion member 13, such as from a range of 120° to the left and right of the optical axis AX (240° in total) extending backward of the vehicle (see FIG. 19), to cover the wavelength conversion member 13 (peripheral end surface 13c) (see FIGS. 29 to 31). A lower edge 31a of the main reflection surface 31 is positioned on the horizontal plane including the optical axis AX (see FIG. 31).

Therefore, the light (for example, light inside of a half-value angle in which the rate of the luminous intensity is 50% (half bidirectional pattern)) with relatively high luminous intensity emitted from the peripheral end surface 13c of the wavelength conversion member 13 (range of 120° to the left and right of the optical axis AX (240° in total)) is incident on an area 31b of the reflection surface 31 near the horizontal plane including the optical axis AX.

The reflection surface 31 only needs to be arranged around the wavelength conversion member 13, and the range is not limited to the range of 120° to the left and right of the optical axis AX (240° in total). The main reflection surface 31 can be arranged in an appropriate range.

According to the vehicle light fitting unit 30 with the configuration, the light with relatively high luminous intensity (for example, light inside of the half-value angle in which the rate of the luminous intensity is 50% (half bidirectional pattern)) of the light emitted from the light emitting device 10 is incident on the area 31b of the reflection surface 31 near the horizontal plane including the optical axis AX. The light is reflected in the area 31b and directed forward. As a result, as illustrated in FIG. 32, the light distribution pattern P4 for high beam is formed on the virtual vertical screen facing the front surface of the vehicle (arranged about 25 m in front of the front surface of the vehicle).

A known aiming mechanism (not illustrated) adjusts the optical axis of the vehicle light fitting unit 30 so as to direct the light distribution pattern P4 for high beam to an appropriate range on the virtual vertical screen.

According to the vehicle light fitting unit 30 of the present embodiment, like the vehicle light fitting unit 20, the light with relatively high luminous intensity emitted from the light emitting device 10 (for example, light in the half-value angle in which the rate of the luminous intensity is 50% (half bidirectional pattern)) is incident on the area 31b of the reflection surface 31 near the horizontal plane including the optical axis AX, instead of the area on the optical axis $AX_{10}$. This can form a vehicle light fitting unit 30 with a thin vertical dimension.

Although the example of forming the vehicle light fitting unit 30 by using the light emitting device 10 has been described, a vehicle light fitting unit similar to the vehicle light fitting unit 30 can also be formed by using the light emitting devices 10A to 10F or the light emitting devices 10G and 10H described later in place of the light emitting device 10.

[Light Emitting Device 10G]

Next, a light emitting device 10G using a plurality of light guides and a plurality of excitation light sources will be described as a modified example of the light emitting device 10.

Figure 33:
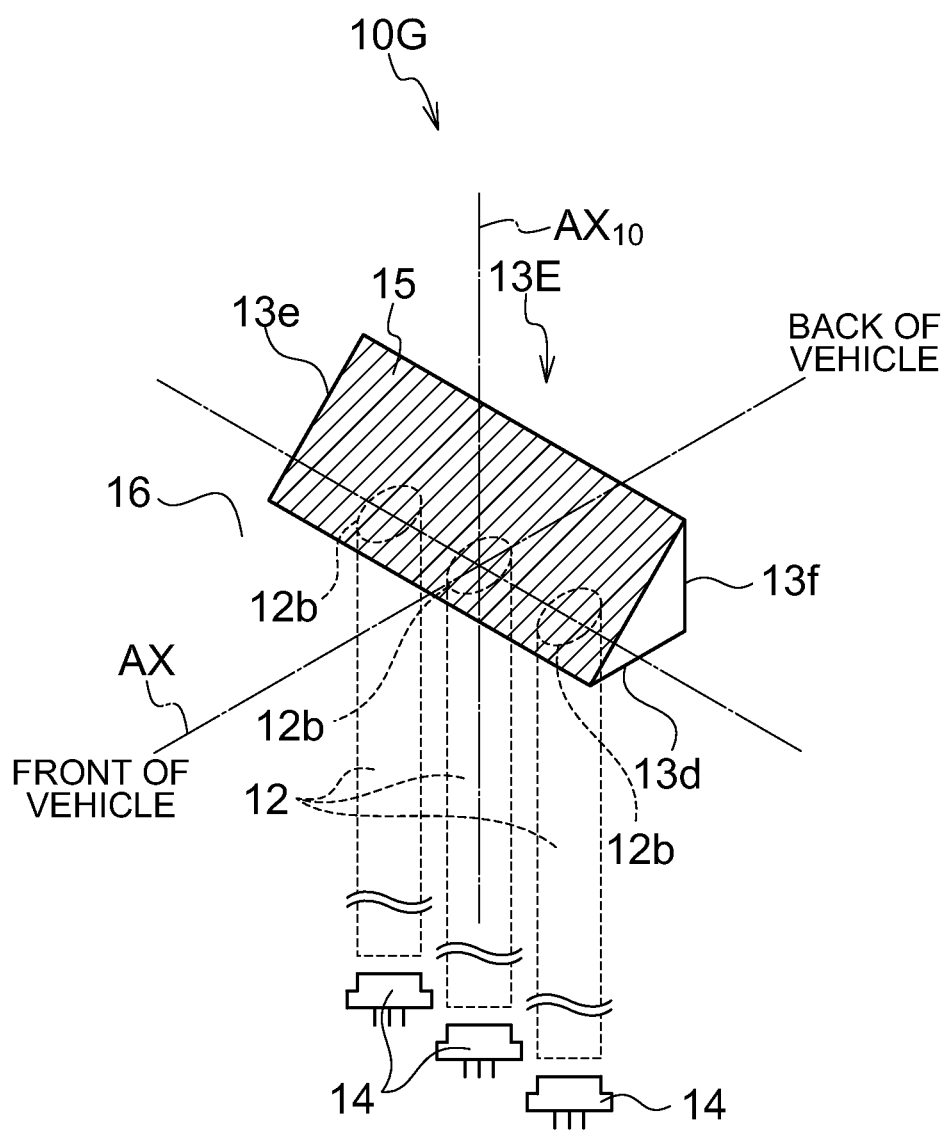
FIG. 33 is a perspective view of an exemplary light emitting device using a plurality of light guides and a plurality of excitation light sources.

FIG. 33 is a perspective view of the light emitting device 10G using a plurality of light guides and a plurality of excitation light sources.

The light emitting device 10G is different from the light emitting device 10E in that a plurality of light guides 12 and a plurality of excitation light sources 14 are used.

Other than that, the configuration is the same as the light emitting device 10E. Hereinafter, the difference from the light emitting device 10E will be mainly described. The same reference numerals are provided to the same components as the light emitting device 10E, and the description will not be repeated.

As illustrated in FIG. 33, the bottom surface 13$d$ of the wavelength conversion member 13E is adhered to areas around a plurality of through holes 11$c$ for light guide on the upper surface 11$a$ (reflection structure 16) of the ferrule 11 to cover the plurality of through holes 11$c$ for light guide (light emission surfaces 12$b$ of a plurality of light guides 12). The plurality of through holes 11$c$ for light guide (light emission surfaces 12$b$ of the plurality of light guides 12) are arranged in a line in the vehicle width direction. It is only necessary that there are a plurality of light guides 12 and a plurality of excitation light sources 14, and the numbers of the light guides 12 and the excitation light sources 14 are not limited to three.

According to the light emitting device 10G of the present modified example, the excitation light from the plurality of excitation light sources 14 is guided into the plurality of light guides 12 from the light entering surfaces 12$a$ of the light guides 12 and is guided to the light emission surfaces 12$b$. The light is emitted from the light emission surfaces 12$b$ to irradiate the wavelength conversion member 13E.

The wavelength conversion member 13E that has received the excitation light from the excitation light sources 14 emits white light based on a mixed color of the light excited by the excitation light from the excitation light sources 14 and the excitation light from the excitation light sources 14 transmitted through the wavelength conversion member 13E.

The white light emitted by the wavelength conversion member 13E is reflected by the light blocking structure 15 and/or the reflection structure 16 (or directly, without being reflected by the light blocking structure 15 or the reflection structure 16) and emitted from the vertical plane 13$f$ of the wavelength conversion member 13E.

Since the inclined surface 13$e$ of the wavelength conversion member 13E is covered by the light blocking structure 15, the directional characteristics of the wavelength conversion member 13E in the cross section cut by the vertical plane including the optical axis AX and the optical axis AX$_{10}$ (cross section of the vertical plane 13$e$ of the wavelength conversion member 13E) indicate a vertically symmetric bidirectional distribution (intensity in the horizontal plane including the optical axis AX is the largest).

The white light emitted downward from the inclined surface 13$e$ of the wavelength conversion member 13E is reflected and turned back by the reflection structure 16 arranged around the bottom surface 13$d$ of the wavelength conversion member 13E, and the white light is directed upward.

As a result, the directional characteristics of the light emitting device 10G in the cross section cut by the vertical plane including the optical axis AX$_{10}$ indicate a distribution in one-half bidirectional pattern including an upper half of the bidirectional pattern as illustrated by the arc in (b) portion of FIG. 15 (intensity in the horizontal plane including the optical axis AX is the largest).

As described, the directional characteristics of the light emitting device 10G indicate a three-dimensional distribution substantially coinciding with a three-dimensional distribution formed by extending the arc indicated by the solid line in (b) portion of FIG. 15 in the perpendicular direction and symmetrically with respect to the vertical plane including the optical axis AX and the optical axis AX$_{10}$, that is, a distribution in a light distribution pattern in which the intensity in the horizontal plane including the optical axis AX is the largest, and the intensity decreases with an increase in the distance from the horizontal plane (for example, light distribution pattern for low beam).

As described, according to the light emitting device 10G of the present embodiment, the light with a bidirectional distribution emitted from the vertical plane 13$f$ of the wavelength conversion member 13E is reflected by the operation of the light blocking structure 15 and the reflection structure 16 arranged around the bottom surface 13$d$ of the wavelength conversion member 13E. This can form a light emitting device 10G that emits light with a distribution in one-half bidirectional pattern in which the bidirectional pattern is halved and that is suitable for reducing the thickness of the vehicle light fitting in the vertical direction.

[Light Emitting Device 10H]

Next, a light emitting device 10H not using a light guide will be described as a modified example of the light emitting device 10.

Figure 34:
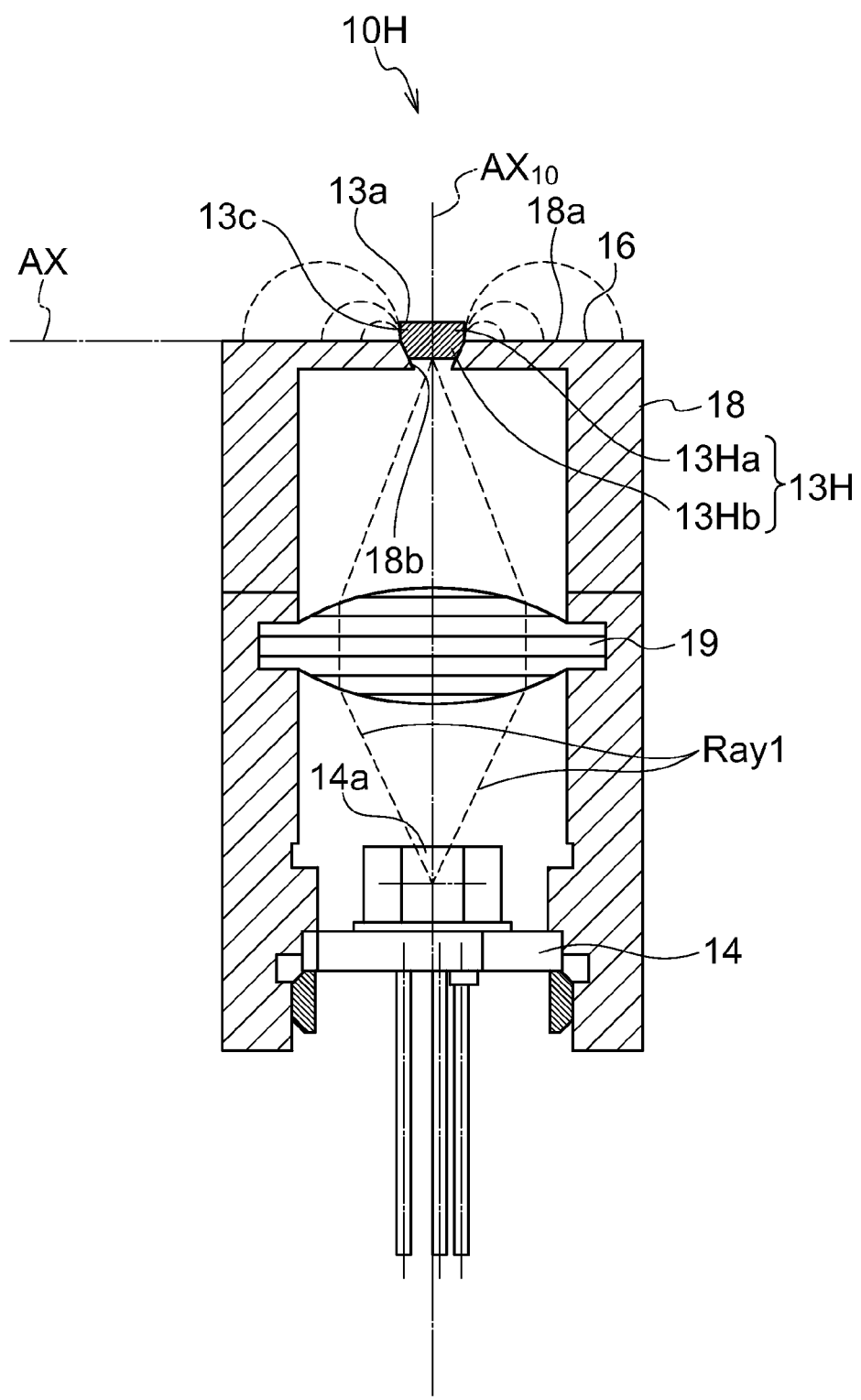
FIG. 34 is a cross-sectional view in which an exemplary light emitting device not using a light guide is cut by a vertical plane including an optical axis $AX_{10}$ thereof.
Figure 35:
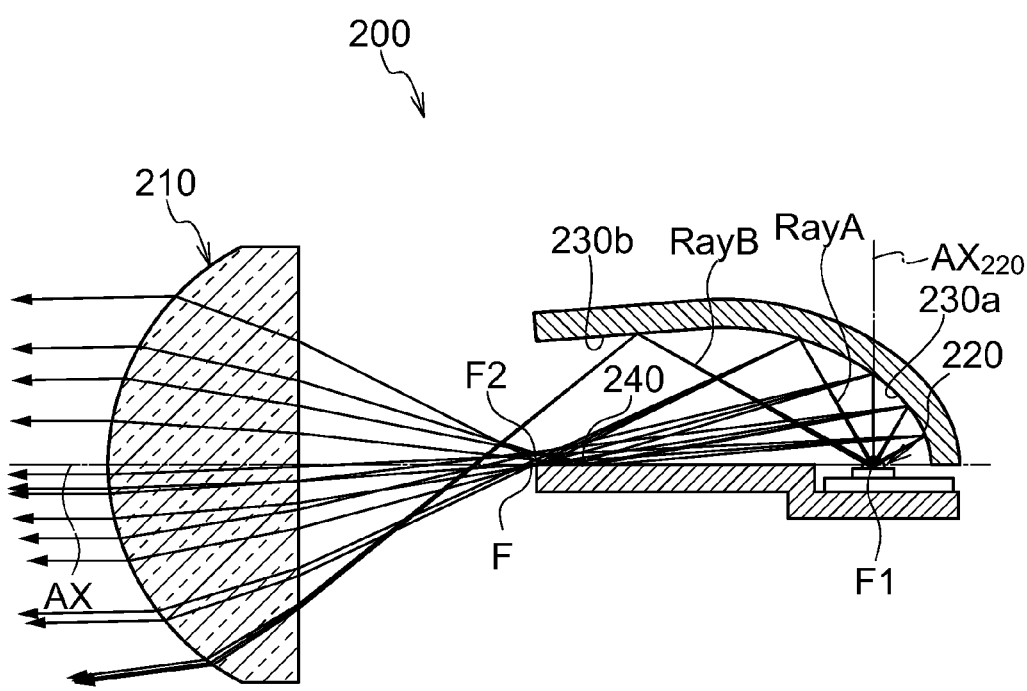
FIG. 35 is an example of a conventional vehicle light fitting using a semiconductor light emitting element such as an LED.
Figure 36:
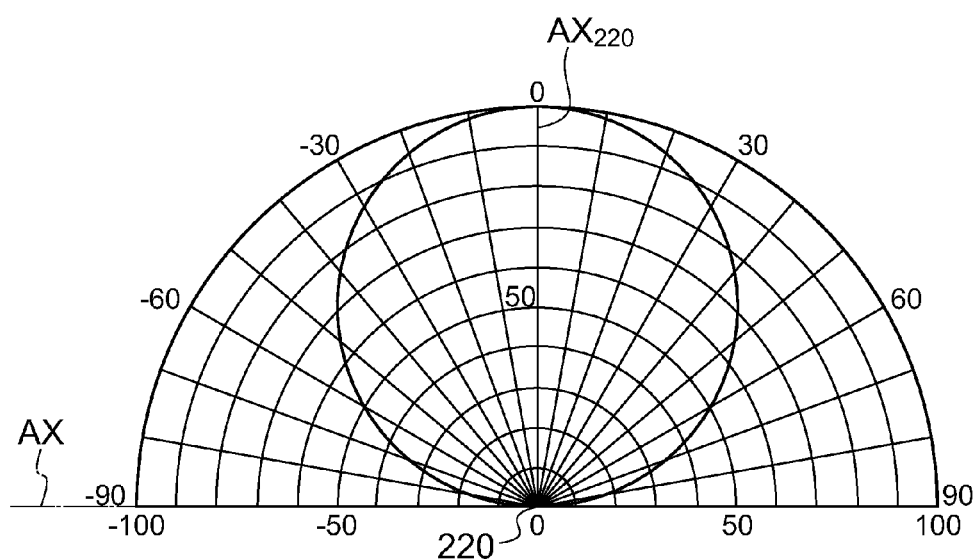
FIG. 36 is a diagram for explaining directional characteristics of a semiconductor light emitting element of FIG. 35.

FIG. 34 is a cross-sectional view in which the light emitting device 10H not using the light guide is cut by a vertical plane including the optical axis AX$_{10}$ of the light emitting device 10H.

The light emitting device 10H is different from the light emitting device 10 in that the light guide 12 is not used. Other than that, the configuration is the same as the light emitting device 10. Hereinafter, the difference from the light emitting device 10 will be mainly described. The same reference numerals are provided to the same components as the light emitting device 10, and the description will not be repeated.

As illustrated in FIG. 34, the light emitting device 10H includes a laser holder 18, a wavelength conversion member 13H, a condensing lens 19, the excitation light source 14, and the like.

The laser holder 18 is a member for holding the wavelength conversion member 13H, the condensing lens 19, and the excitation light source 14 and is, for example, a cylindrical portion made of metal such as aluminum. The laser holder 18 includes a plate portion 18$a$ that closes an upper opening end of the laser holder 18. The wavelength conversion member 13H, the condensing lens 19, and the excitation light source 14 are held by the laser holder 18 and arranged on the optical axis AX$_{10}$ (central axis of the laser holder 18). A tapered through hole 18$b$ is formed on the optical axis AX$_{10}$ in the plate portion 18$a$.

The upper surface of the plate portion 18$a$ is, for example, round and is covered by the reflection structure 16 as illustrated in FIG. 34. The reflection structure 16 only needs to be able to reflect light emitted by the wavelength conversion member 13H toward the wavelength conversion member 13H, and for example, the reflection structure 16 may be a reflection layer (or a reflection surface) formed by applying metal deposition of aluminum, silver, or the like to the upper surface of the plate portion 18a or may be a reflection layer (dielectric film) formed by plating the upper surface of the plate portion 18a if the plate portion 18a is conductive. For example, a method described in Japanese Patent Laid-Open No. 2007-121502 can be used as a method of forming the reflection layer (or the reflection surface) on the upper surface of the plate portion 18a. Alternatively, the reflection structure 16 may be a thin plate-like reflection member adhered to the upper surface of the plate portion 18a (area of the upper surface other than the wavelength conversion member 13) or may be a reflection surface formed by applying mirror surface polishing to the upper surface of the plate portion 18a if the plate portion 18a is metallic.

The wavelength conversion member 13H is a fluorescent body of YAG or the like (fluorescent substance such as Ce:YAG or the like is desirable) including a disc-shaped portion 13Ha formed by extending a round shape in the perpendicular direction of the upper surface of the plate portion 18a and including a tapered portion 13Hb that is a lower portion of the disc-shaped portion 13Ha. The disc-shaped portion 13Ha includes the round upper surface 13a and the ring-shaped peripheral end surface 13c (for example, thickness: 0.2 mm, diameter: 1.0 mm).

The disc-shaped portion 13Ha may be a disc-shaped fluorescent body of YAG or the like formed by extending a polygon or another shape in the perpendicular direction of the upper surface of the plate portion 18a. In the wavelength conversion member 13H, the concentration of a yellow fluorescent body (for example, dosage of Ce) is adjusted so that the emission color satisfies a white range in a CIE chromaticity diagram defined by a regulation.

The tapered portion 13Hb is inserted and adhered to a through hole 18b formed on the plate portion 18a to cover the through hole 18b. The wavelength conversion member 13H is arranged at the center of the upper surface of the plate portion 18a. The center on the lower surface of the wavelength conversion member 13H coincides with the center of the through hole 18b.

The upper surface 13a of the wavelength conversion member 13H is covered by the light blocking structure 15.

The reflection structure 16 (upper surface of the plate portion 18a) is arranged around the wavelength conversion member 13H. Therefore, the reflection structure 16 reflects and turns back the light emitted downward from the whole circumference of the peripheral end surface 13c of the wavelength conversion member 13H, and the light is directed upward. This forms a light emitting device 10H that emits light with a distribution in a half bidirectional pattern in which a bidirectional pattern is halved (see (b) portion of FIG. 2).

The excitation light source 14 is fixed to the lower side of the laser holder 18 in a state that the optical axis of the excitation light source 14 coincides with the optical axis $AX_{10}$, and the light emitting surface 14a faces the plate portion 18a.

The condensing lens 19 is arranged between the excitation light source 14 and the wavelength conversion member 13H so that the light Ray1 from the excitation light source 14 efficiently enters the wavelength conversion member 13H.

According to the light emitting device 10H of the present modified example, the light Ray1 from the excitation light source 14 is condensed by the condensing lens 19 to irradiate the wavelength conversion member 13H.

The wavelength conversion member 13H that has received the excitation light from the excitation light source 14 emits white light based on a mixed color of the light excited by the excitation light from the excitation light source 14 and the excitation light from the excitation light source 14 transmitted through the wavelength conversion member 13H.

The white light emitted by the wavelength conversion member 13H is reflected by the light blocking structure 15 and/or the reflection structure 16 (or directly, without being reflected by the light blocking structure 15 or the reflection structure 16) and emitted from the whole circumference of the vertical plane 13c of the wavelength conversion member 13H.

Since the upper surface 13a of the wavelength conversion member 13H is covered by the light blocking structure 15, the directional characteristics of the wavelength conversion member 13H in the cross section cut by the vertical plane including the optical axis $AX_{10}$ (cross section of the peripheral end surface 13c of the wavelength conversion member 13) indicate a vertically symmetric bidirectional distribution (intensity in the horizontal plane including the optical axis AX is the largest) as illustrated by the solid line in FIG. 5.

Meanwhile, since the peripheral end surface 13c of the wavelength conversion member 13H is a ring-shaped surface, the directional characteristics viewed from the upper surface 13a of the wavelength conversion member 13H indicate a distribution spread in a radial fashion around the wavelength conversion member 13 as illustrated by the alternate long and two short dashes line in FIG. 5.

The white light emitted downward from the whole circumference of the peripheral end surface 13c of the wavelength conversion member 13H is reflected and turned back by the reflection structure 16 arranged around the wavelength conversion member 13H, and the white light is directed upward.

As a result, the directional characteristics of the light emitting device 10H in the cross section cut by the vertical plane including the optical axis $AX_{10}$ indicate a distribution in one-half bidirectional pattern including an upper half of the bidirectional pattern as illustrated by the solid line in (b) portion of FIG. 2 (intensity in the horizontal plane including the optical axis AX is the largest).

Meanwhile, since the peripheral end surface 13c of the wavelength conversion member 13H is a ring-shaped surface, the directional characteristics viewed from the upper surface of the light emitting device 10H indicate a distribution spread in a radial fashion around the wavelength conversion member 13H as illustrated by the alternate long and two short dashes line in (b) portion of FIG. 2.

As described, the directional characteristics of the light emitting device 10H indicate a three-dimensional distribution substantially coinciding with a three-dimensional distribution in which the arc indicated by the solid line in (b) portion of FIG. 2 is rotated 360° around the optical axis $AX_{10}$, that is, a distribution of a light distribution pattern in which the intensity in the horizontal plane including the optical axis AX is the largest, and the intensity decreases with an increase in the distance from the horizontal plane (for example, light distribution pattern for low beam).

Although the example of forming the light emitting device 10H by using the wavelength conversion member 13H including the disc-shaped portion 13Ha and the tapered portion 13Hb that is a lower portion of the disc-shaped portion 13Ha has been described, a light emitting device similar to the light emitting device 10H can also be formed by using the wavelength conversion members 13 and 13B to 13E in place of the wavelength conversion member 13H.

According to the light emitting device 10H of the present modified example, the light with a bidirectional distribution emitted from the peripheral end surface 13c of the wavelength conversion member 13 is reflected by the operation of the light blocking structure 15 and the reflection structure 16 arranged around the wavelength conversion member 13. This can form a light emitting device 10H that emits light with a distribution in a half bidirectional pattern in which the bidirectional pattern is halved and that is suitable for reducing the thickness of the vehicle light fitting in the vertical direction.

The embodiments are only illustrative in all aspects. The presently disclosed subject matter should not be construed as being limited to the description. The presently disclosed subject matter can be implemented in various other forms without departing from the spirit and main features of the presently disclosed subject matter.

The invention claimed is:

1. A light emitting device for use in a vehicle light, the light emitting device comprising:
   an excitation light source configured to generate excitation light;
   a wavelength conversion member configured to absorb the excitation light and convert a wavelength of the excitation light to emit light in a predetermined wavelength region; and
   a first optical system configured to direct the excitation light from the excitation light source to the wavelength conversion member,
   wherein the wavelength conversion member includes at least a first surface, a second surface facing the first surface, and a peripheral end surface located between the first surface and the second surface,
   the first optical system is configured to direct the excitation light from the excitation light source to the first surface,
   at least part of the second surface is covered by a first light blocking structure; and
   a third reflection structure is configured to reflect light emitted from the peripheral end surface and is located around the first surface.

2. The light emitting device according to claim 1, wherein the first light blocking structure is a first reflection structure.

3. The light emitting device according to claim 1, wherein the wavelength conversion member is a disc-shaped wavelength conversion member including the first surface, the second surface, and the peripheral end surface.

4. The light emitting device according to claim 1, wherein at least part of the peripheral end surface is covered by a second light blocking structure.

5. The light emitting device according to claim 1, wherein at least part of the peripheral end surface is cut, and a cross section of the peripheral end surface is covered by a third light blocking structure.

6. The light emitting device according to claim 1, wherein the wavelength conversion member is a triangular-prism wavelength conversion member including the first surface, the second surface, and the peripheral end surface.

7. The light emitting device according to claim 1, wherein at least part of the first surface is covered by a second reflection structure.

8. A vehicle light for a vehicle, comprising:
   the light emitting device according to claim 1; and
   a second optical system configured to direct light emitted from the peripheral end surface of the light emitting device forward from the vehicle.

9. A vehicle provided with the vehicle light according to claim 8.

10. A light emitting device configured for use in a vehicle light, the light emitting device comprising:
    an excitation light source configured to generate excitation light;
    a light emitting unit including:
       a wavelength conversion member configured to absorb the excitation light and convert a wavelength of the excitation light to emit light in a predetermined wavelength region; and
       a light deflection structure configured to change a travelling direction of the excitation light from the excitation light source to emit the excitation light to the wavelength conversion member; and
    a first optical system configured to direct the excitation light from the excitation light source to the light deflection structure;
       wherein the wavelength conversion member is a ring-shaped wavelength conversion member, and
       the light deflection structure is located inside of a ring of the ring-shaped wavelength conversion member and is configured to change the travelling direction of the excitation light from the excitation light source to direct the excitation light to an inner ring surface of the wavelength conversion member.

11. A light emitting device configured for use in a vehicle light, the light emitting device comprising:
    an excitation light source configured to generate excitation light;
    a light emitting unit including:
       a wavelength conversion member configured to absorb the excitation light and convert a wavelength of the excitation light to emit light in a predetermined wavelength region; and
       a light deflection structure configured to change a travelling direction of the excitation light from the excitation light source to emit the excitation light to the wavelength conversion member;
    a first optical system configured to direct the excitation light from the excitation light source to the light deflection structure; and
    a third reflection structure is configured to reflect light emitted from the light emitting unit and is located around a lower surface of the light emitting unit.

12. The light emitting device according to claim 11, wherein the light deflection structure is configured to reduce light density of the excitation light from the excitation light source and change the travelling direction to direct the excitation light to the wavelength conversion member.

13. The light emitting device according to claim 11, wherein at least part of an upper surface of the light emitting unit is covered by a light blocking structure.

14. The light emitting device according to claim 13, wherein the light blocking structure is a first reflection structure.

15. The light emitting device according to claim 11, wherein at least part of a lower surface of the light emitting unit is covered by a second reflection structure.

16. A vehicle light for a vehicle, comprising:
    the light emitting device according to claim 11; and
    a second optical system configured to direct the light emitted from the light emitting unit of the light emitting device forward from the vehicle.

17. A vehicle provided with the vehicle light according to claim 16.

18. A light emitting device configured for use in a vehicle light, the light emitting device comprising:
a first holding member holding:
   a first light guide including a first light entering surface and a first light emission surface, the first light guide configured to guide excitation light from the first light entering surface to the first light emission surface to emit the excitation light from the first light emission surface; and
   a wavelength conversion member configured to absorb the excitation light emitted from the first light emission surface and to convert a wavelength of the excitation light to emit light in a predetermined wavelength region;
a second holding member holding:
   a second light guide including a second light entering surface and a second light emission surface, the second light guide configured to guide the excitation light from the second light entering surface to the second light emission surface to emit the excitation light from the second light emission surface;
an excitation light source configured to generate the excitation light to be guided inside of the second light guide from the second light entering surface; and
a fixation structure including an adapter and a connector,
wherein the first holding member includes a flange formed between the first light entering surface and the first light emission surface,
the adapter includes a sleeve formed thereon,
a lower side of the first holding member is inserted to one side of the sleeve of the adapter until the flange comes into contact with the adapter and the first holdin member is fitted together with the adapter,
an upper surface of the second light emission surface of the second holding member is inserted to other end of the sleeve of the adapter until the upper surface hits a lower surface of the first light entering surface of the first light guide, and the second holding member is fitted together with the adapter, and
the connector removably fix the first holding member and the second holding member in a state in which the first light entering surface and the second light emission surface face each other.

19. The light emitting device according to claim 18, wherein an area of the first light entering surface is greater than an area of the second light emission surface.

20. The light emitting device according to claim 18, wherein the first holding member is a stub having a stub outer diameter,
the second holding member is a ferrule having a ferrule outer diameter, and
the outer diameter of the stub is greater than the outer diameter of the ferrule.

21. A vehicle light for a vehicle, comprising:
the light emitting device according to claim 18;
a second optical system configured to direct light emitted from the wavelength conversion member held by the first holding member forward from the vehicle.

* * * * *